United States Patent
Painchaud et al.

(10) Patent No.: US 10,663,663 B2
(45) Date of Patent: *May 26, 2020

(54) SPOT-SIZE CONVERTER FOR OPTICAL MODE CONVERSION AND COUPLING BETWEEN TWO WAVEGUIDES

(71) Applicant: Ciena Corporation, Hanover, MD (US)

(72) Inventors: Yves Painchaud, Quebec (CA); Marie-Josee Picard, Quebec (CA); Ian Betty, Hanover, MD (US); Christine Latrasse, Quebec (CA); Michel Poulin, Quebec (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,222

(22) Filed: Aug. 2, 2019

(65) Prior Publication Data

US 2019/0384003 A1 Dec. 19, 2019

Related U.S. Application Data

(63) Continuation-in-part of application No. 15/943,165, filed on Apr. 2, 2018, now Pat. No. 10,371,895,
(Continued)

(51) Int. Cl.
*G02B 6/14* (2006.01)
*G02B 6/30* (2006.01)
(Continued)

(52) U.S. Cl.
CPC .............. *G02B 6/14* (2013.01); *G02B 6/00* (2013.01); *G02B 6/124* (2013.01); *G02B 6/125* (2013.01);
(Continued)

(58) Field of Classification Search
None
See application file for complete search history.

(56) References Cited

U.S. PATENT DOCUMENTS 6,697,551 B2  2/2004 Lee et al.
6,975,798 B2  12/2005 Blauvelt et al.
(Continued)

FOREIGN PATENT DOCUMENTS

EP  1293811 A3  4/2004
EP  2610657 A1  7/2013

OTHER PUBLICATIONS

Hatori, N. et al, A Hybrid Integrated Light Source on a Silicon Platform Using a Trident Spot-Size Converter; Journal of Lightwave Technology, vol. 32, No. 7, Apr. 1, 2014 (8 pages).
(Continued)

*Primary Examiner* — Michelle R Connelly
(74) *Attorney, Agent, or Firm* — Clements Bernard Walker; Christopher L. Bernard; Lawrence A. Baratta, Jr.

(57) ABSTRACT

A spot-size converter includes a first part of a waveguiding structure to couple to a first waveguide to receive light from or transmit light to the first waveguide in a first propagation mode, wherein the first part of the waveguiding structure has a lower waveguiding structure with a varying effective refractive index that decreases away from the first waveguide; and a second part of the waveguiding structure to couple to a second waveguide to transmit light to or receive light from the second waveguide in a second propagation mode, the second part of the waveguiding structure includes an upper waveguiding structure with a plurality of high-index elements arranged therein, an overlap region is between the first part and the second part, the first propagation mode progressively transforms into the second propagation mode in the overlap region.

18 Claims, 44 Drawing Sheets

Related U.S. Application Data which is a continuation of application No. 15/680,384, filed on Aug. 18, 2017, now Pat. No. 10,197,734, which is a continuation of application No. 15/282,965, filed on Sep. 30, 2016, now Pat. No. 9,759,864, which is a continuation-in-part of application No. 14/635,602, filed on Mar. 2, 2015, now Pat. No. 9,703,047.

(60) Provisional application No. 61/946,068, filed on Feb. 28, 2014, provisional application No. 61/974,140, filed on Apr. 2, 2014.

(51) Int. Cl.
| | | |
|---|---|---|
| *G02B 6/122* | | (2006.01) |
| *G02B 6/125* | | (2006.01) |
| *G02B 6/124* | | (2006.01) |
| *G02B 6/12* | | (2006.01) |
| *G02B 6/00* | | (2006.01) |

(52) U.S. Cl.
CPC ........... *G02B 6/1228* (2013.01); *G02B 6/305* (2013.01); *G02B 2006/12152* (2013.01)

(56) References Cited

U.S. PATENT DOCUMENTS

| | | | |
|---|---|---|---|
| 7,146,087 | B2 | 12/2006 | Heideman et al. |
| 7,317,853 | B2 | 1/2008 | Laurent-Lund et al. |
| 7,577,327 | B2 | 8/2009 | Blauvelt et al. |
| 7,646,957 | B2 | 1/2010 | Blauvelt et al. |
| 7,668,416 | B2 | 2/2010 | Li |
| 7,783,146 | B2 | 8/2010 | Blauvelt et al. |
| 7,853,103 | B2 | 12/2010 | Blauvelt et al. |
| 7,885,499 | B2 | 2/2011 | Blauvelt et al. |
| 8,320,721 | B2 | 11/2012 | Cevini et al. |
| 8,483,528 | B2 | 7/2013 | Socci et al. |
| 8,503,839 | B2 | 8/2013 | Cheben et al. |
| 9,128,240 | B2 | 9/2015 | Hatori et al. |
| 9,195,001 | B2 | 11/2015 | Hatori et al. |
| 9,703,047 | B2 * | 7/2017 | Painchaud ............. G02B 6/305 |
| 9,759,864 | B2 * | 9/2017 | Painchaud ............... G02B 6/14 |
| 10,197,734 | B2 * | 2/2019 | Painchaud ............... G02B 6/14 |
| 10,371,895 | B2 * | 8/2019 | Painchaud ............. G02B 6/124 |
| 2010/0150494 | A1 | 6/2010 | Prosyk et al. |
| 2013/0170807 | A1 | 7/2013 | Hatori et al. |
| 2013/0188910 | A1 | 7/2013 | Tokushima et al. |
| 2013/0322813 | A1 | 12/2013 | Grondin et al. |
| 2014/0233881 | A1 * | 8/2014 | Hatori .................. G02B 6/1228 385/14 |
| 2014/0233901 | A1 | 8/2014 | Hatod et al. |
| 2014/0294341 | A1 | 10/2014 | Hatori et al. |

OTHER PUBLICATIONS

Hatori, N. et al, "A Novel Spot Size Converter for Hybrid Integrated Light Sources on Photonics-Electronics convergence System", IEEE, 2012, pp. 171-173 (3 pages).

Roeloffzen et al., "Silicon Nitride Microwave Photonic Circuits,"Optical Society of America, 2013, Optics Express, vol. 21, No. 19, pp. 22937-22961 (25 pages).

Bakir et al., "Low-Less (<1dB) and Polarization-Insensitive Edge Fiber Couplers Fabricated on 200-mm Silicon-on-Insulator Wafers" 2010, IEEE Photonics Technology Letters, vol. 22, No. 11, pp. 739-741 (3 pages).

Morichetti et al. "Box-Shaped Dielectric Waveguides: A New Concept in Integrated Optics?" Journal of Lightwave Technology, 2007, vol. 25, No. 9, pp. 2579-2589 (11 pages).

Cheben et al. "Subwavelength Waveguide Grating for Mode Conversion and Light Coupling in Integrated Optics", Optical Society of America, 2006, Optics Express, vol. 14, No. 11, pp. 4695-4702 (8 pages).

Loh et al., "Ultra-compact Multilayer Si/SIO2 GRIN Lens Mode-Size Converter for Coupling Single-Mode Fiber to Si-wire Waveguide", Optical Society of America, 2010, Optics Express, vol. 18, No. 21, pp. 21519-21533 (15 pages).

Shoji et al., "Low Loss Mode Size Converter from 0.3pm Square Si wire Waveguides to Singlemode Fibres", Electronic Letters, 2002, vol. 38, No. 25, pp. 1669-1670 (2 pages).

Tolstikhin, "Multi-Guide Vertical Integration in InP-A Regrowth-Free PIC Technology for Optical Communications", CA MANTECH Conference, May 13-16, 2013, New Orleans, Louisiana, USA, pp. 23-26 (4pages).

Lionix, "Platform Triplex TM Design Manual High Contrast", Phoenix Software-Solutions for Micro and Nano Technologies, 2013, pp. 1-14 (14 pages).

Urino et al., "First Demonstration of Athermal Silicon Optical Interposers with Quantum Dot Lasers Operating up to 125 degrees C", IEEE, 2013, pp. 1-8 (8 pages).

* cited by examiner

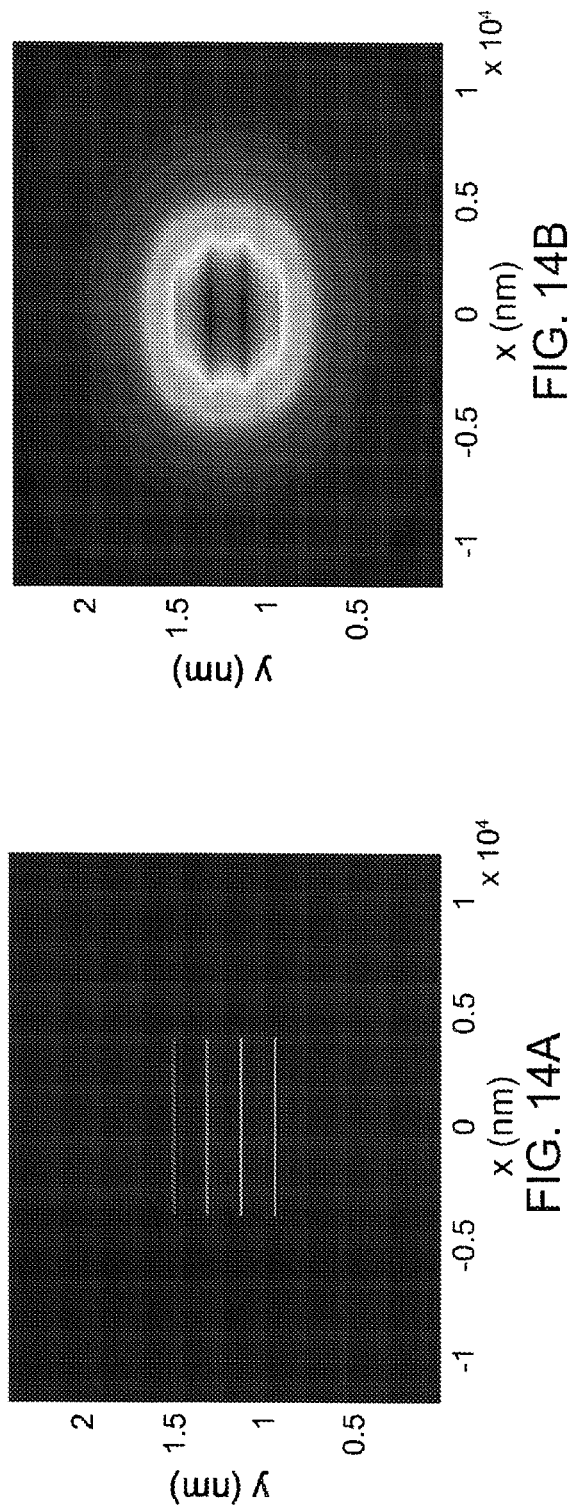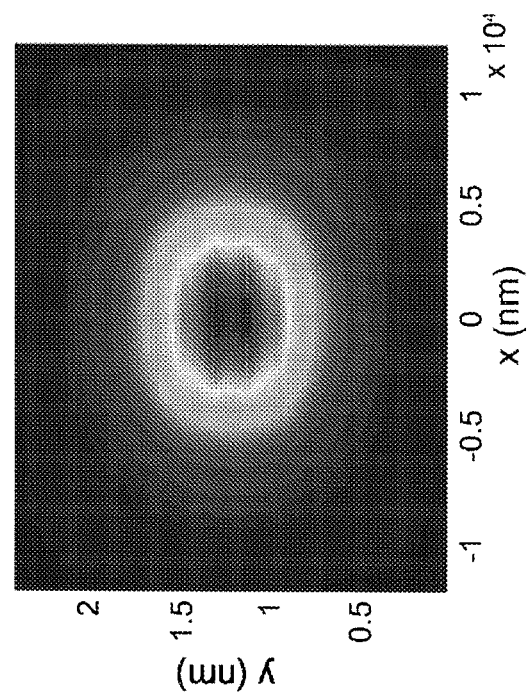
FIG. 14A
FIG. 14B
FIG. 14C

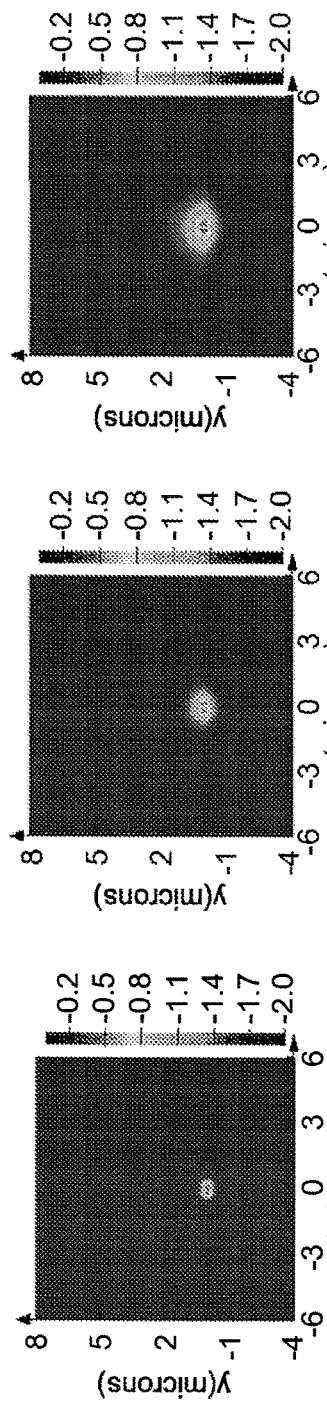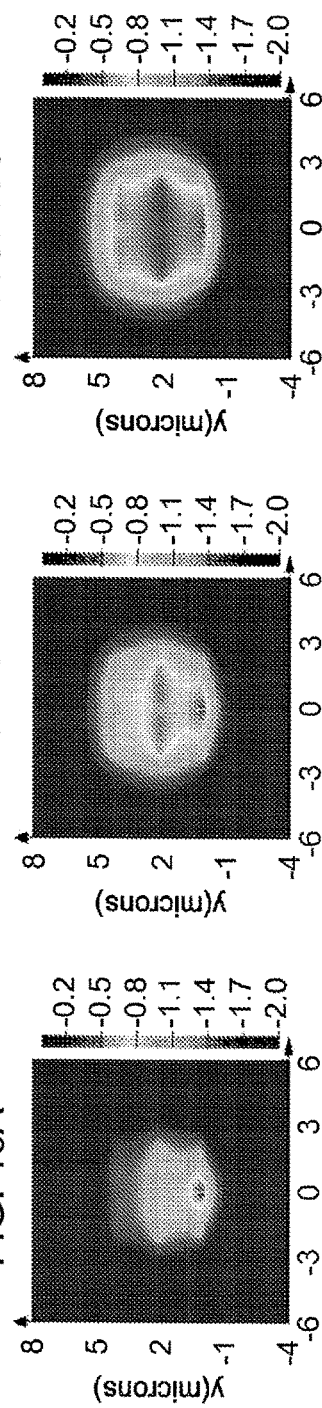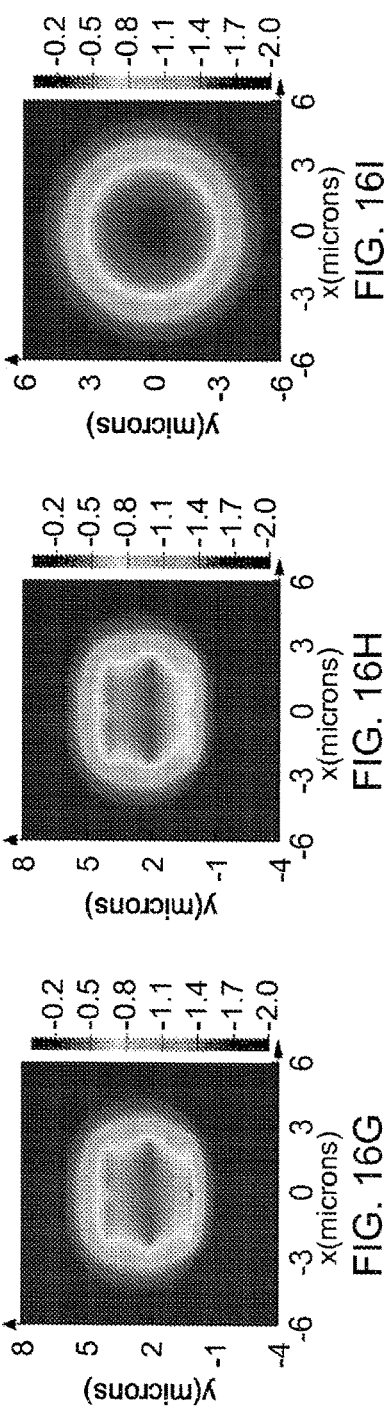
FIG. 16A  FIG. 16B  FIG. 16C  FIG. 16D  FIG. 16E  FIG. 16F  FIG. 16G  FIG. 16H  FIG. 16I

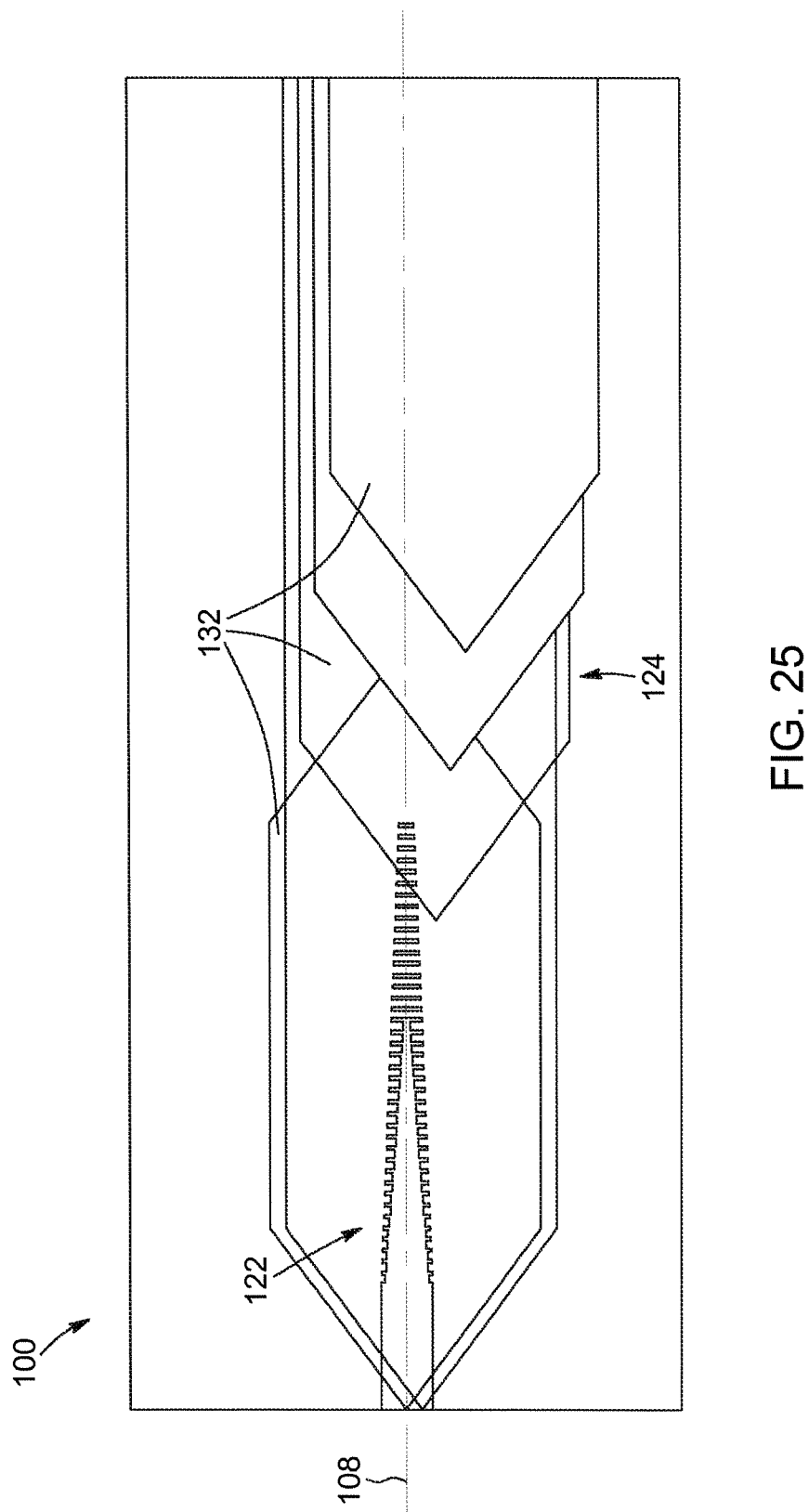

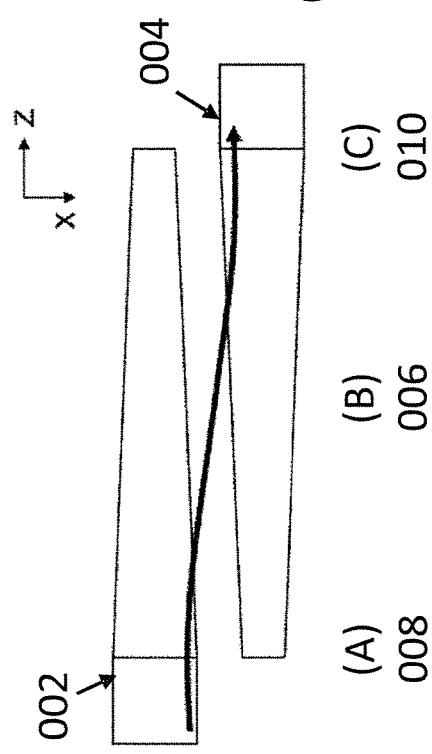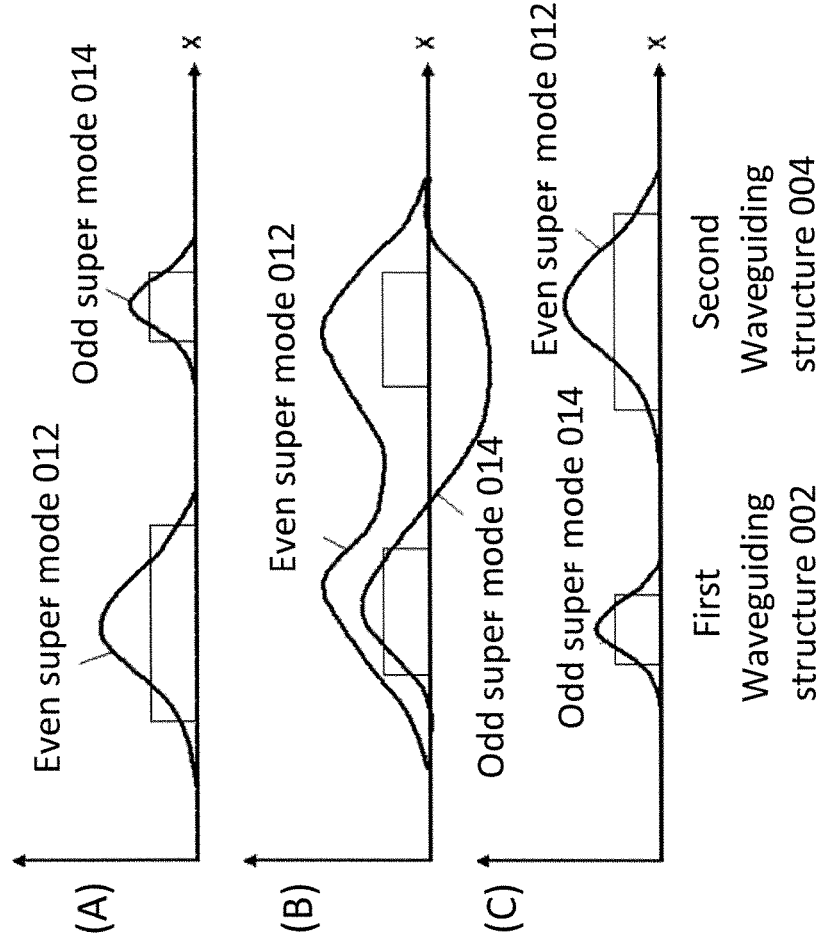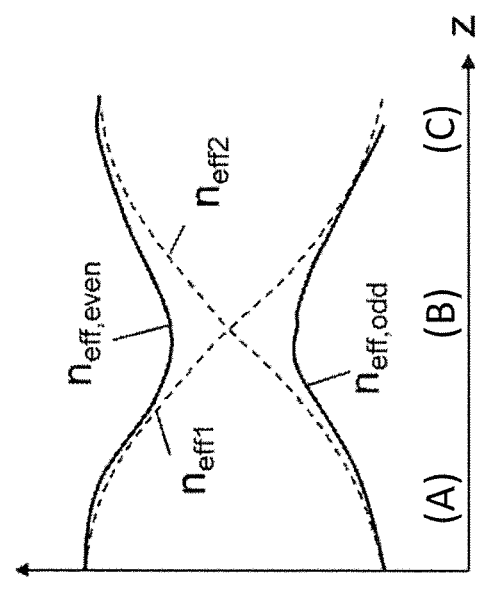

SPOT-SIZE CONVERTER FOR OPTICAL MODE CONVERSION AND COUPLING BETWEEN TWO WAVEGUIDES

CROSS-REFERENCE TO RELATED PATENT APPLICATION(S)

This present disclosure is a continuation-in-part of U.S. patent application Ser. No. 15/943,165, filed on Apr. 2, 2018, which is a continuation of U.S. patent application Ser. No. 15/680,384, filed on Aug. 18, 2017, which is a continuation of U.S. patent application Ser. No. 15/282,965, filed Sep. 30, 2016, which is a continuation-in-part of U.S. patent application Ser. No. 14/635,602, filed Mar. 2, 2015, which claims priority to U.S. Provisional Patent Application No. 61/946, 068, filed Feb. 28, 2014, and to U.S. Provisional Patent Application No. 61/974,140 filed, Apr. 2, 2014. Each of these applications is incorporated by reference herein in its entirety.

FIELD OF THE DISCLOSURE

The present invention relates generally to integrated photonic waveguides and, in particular, to spot-size converters providing mode conversion between two waveguides supporting propagation modes of different dimensions.

BACKGROUND OF THE DISCLOSURE

Integration of optical components into a silicon-on-insulator (SOI) platform allows for the fabrication of a small size device, down to a submicron level, compatible with silicon electronic components and standard fabrication processes. Such optical components may have propagation modes of different dimensions (used interchangeably herein with "spot-sizes") and shapes. For example, components such as waveguides, splitters and electro-optic modulators typically have a small spot-size of about 0.5 µm. Optical fibers have a larger spot-size of about 10 µm. These photonic components are coupled with each other via a spot-size converter to avoid energy loss due to their spot-size mismatch during the propagation from one optical component to another.

An existing spot-size converter that converts the spot-size of a first waveguide into the spot-size of a second waveguide simply involves a longitudinal transitional waveguiding structure between the two waveguides. When the waveguiding structure is large enough, the waveguiding structure confines light substantially all along the structure. The light confined in the first waveguide, having a spot-size similar to the size of the first waveguide, may gradually change the spot-size, as the light propagates through a transitional waveguiding structure, up to a size similar to the size of the second waveguide when the light reaches the second waveguide. The transitional waveguiding structure region may include changes in the width, height, or both. Such a simple waveguiding structure may be referred to as a tapered waveguiding structure. Typically, this type of a spot-size converter with a tapered waveguiding structure has a limited capability for converting a spot-size and is not sufficient to convert the spot-size from about 0.5 µm up to about 10 µm.

Another existing spot size converter involves a transitional waveguiding structure including a tapered region and a region where the waveguiding structure is not large enough to substantially confine the light. Similarly, to the existing spot-size converter with a tapered waveguiding structure discussed above, the light confined in a first waveguide may pass through the transitional waveguiding structure where the width, height or both are decreased such that the waveguiding structure confines the light significantly less. Consequently, instead of decreasing, the spot-size rather increases and most of the light extends outside of the core of the waveguiding structure when the light reaches the second waveguide. This type of a waveguiding structure may be referred to as an inverted-taper waveguiding structure. Again here, this type of a spot-size converter with an inverted taper waveguiding structure has a limited capability for converting a spot-size and is not sufficient to convert the spot-size from about 0.5 µm up to about 10 µm.

Yet another type of a spot size converter may be composed of two such inverted taper waveguiding structures. Due to the poor confining capability at the tip of an inverted taper waveguiding structure, an interaction with another inverted taper waveguide in close lateral proximity, for example, placed side-by-side with their tapered tips in opposite directions, as illustrated in FIG. 1A, may cause exchange of energy. Thus, the light from a first inverted taper waveguiding structure may be transferred in a second inverted taper waveguiding structure. A condition for an efficient exchange of energy between the two waveguiding structure is that their mode overlap is sufficiently large. Another condition for an efficient exchange of energy is that phase velocities (i.e. the effective refractive indices) in the two waveguiding structures substantially match. Due to the use of two different waveguides, this type of a spot-size converter with two inverted taper waveguiding structures may offer a better capability for converting a spot-size.

Fabrication of silicon optical devices involves successive deposition, treatment and partial etching of different materials on top of each other. In the etching process, chemicals may be used to preferentially etch one material while leaving another one virtually intact. Specifically, an etching process of the first material may be accurately controlled to stop when reaching the second material. The second material act as a so-called "etch stop" for the first material. In particular, a dielectric material such as silicon nitride can act as an etch stop for another dielectric material such as silicon oxide. As a result, thin layers of silicon nitride are often used as etch stop for silicon oxide within a stack of different layers containing different levels of metal circuits.

BRIEF SUMMARY OF THE DISCLOSURE

In one aspect, one or more embodiments of the invention relate to a spot-size converter for coupling light between a first waveguide and a second waveguide extending along a longitudinal waveguiding axis and including a transition region. The transition region includes a first part of waveguiding structure, which is coupled to the first waveguide, and a second part of waveguiding structure, which is coupled to the second waveguide. The second part of waveguiding structure includes high-index elements arranged in multiple vertically spaced rows and horizontally spaced columns, and extends along the longitudinal waveguiding axis at least partially over the first part of waveguiding structure so as to define a low-index region, where the mode of the first waveguide progressively transforms into the mode of the second waveguide, thereby enabling light propagation via a mode of the combined system of the first and second parts of waveguiding structures.

In another aspect, one or more embodiments of the invention relate to a silicon photonic spot-size converter for coupling light between a first waveguide and a second waveguide, respectively supporting a first and a second propagation modes having substantially different dimensions, and extending along a longitudinal waveguiding axis. The silicon photonic spot-size converter includes silicon substrate, an insulating layer formed on the silicon substrate, and a silicon core formed on the insulating layer, which is coupled to the first waveguide. The silicon core is characterized by a longitudinally varying first effective refractive index that decreases toward the second end along the longitudinal waveguiding axis. The silicon photonic spot-size converter further includes high-index rods arranged in multiple vertically spaced rows and horizontally spaced columns, extending along the longitudinal waveguiding axis partially over the first part of waveguiding structure so as to define a low-index region where the mode of the first waveguide progressively transforms into the mode of the second waveguide, thereby enabling light propagation via a mode of the combined system of the first part of and second part of waveguiding structures.

Other aspects and advantages of the invention will be apparent from the following description and the appended claims.

BRIEF DESCRIPTION OF THE DRAWINGS

Embodiments of the invention will be described with reference to the accompanying drawings. However, the accompanying drawings illustrate only certain aspects or implementations of one or more embodiments of the invention by way of example and are not meant to limit the scope of the claims.

In FIG. 10A, the lower and upper waveguiding structures have respectively a uniform cross-sectional profile and a longitudinally tapered profile. In FIG. 10B, both the lower and upper waveguiding structures have longitudinally tapered profiles. In FIG. 10C, the high-index elements of the upper waveguiding structure have longitudinally tapered profiles.

FIG. 14A depicts the index profile of a multi-sheet upper waveguiding structure formed of four vertically spaced high-index sheets members made of a material having a refractive index of 1.58 and embedded in a low-index surrounding medium. FIGS. 14B and 14C are simulated representations of the cross-sectional mode profiles of the TE and TM propagation modes of the upper waveguiding structure of FIG. 14A.

FIGS. 16A to 16I are the mode profiles calculated with a mode solver (intensity distribution in logarithmic scale) of the TE mode of the spot-size converter of FIG. 3 at different locations along the waveguiding axis going from the lower to the upper waveguiding structure up to the second waveguide.

FIG. 17B: 180 nm; and FIG. 17A: 220 nm).

In FIG. 24B, the rows of high-index sheets are slightly shifted laterally from one another to better illustrate the configuration of the upper waveguiding structure.

FIG. 25 illustrates a variant of the spatially varying multi-sheet upper waveguiding structure FIGS. 24A and 24B, according to which the high-index sheets are tapered at their end overlying the lower waveguiding structure. It is noted that the rows of high-index sheets are slightly shifted laterally from one another to better illustrate the configuration of the upper waveguiding structure.

FIG. 31A shows two inverted taper waveguiding structures placed side-by-side in accordance with one or more embodiments of the invention.

FIG. 31B shows effective refractive indices of individual propagation modes of the waveguiding structures, even and odd super-modes.

FIG. 31C shows spatial distribution of the even and odd super-modes.

DETAILED DESCRIPTION OF THE DISCLOSURE

Figure 1A:
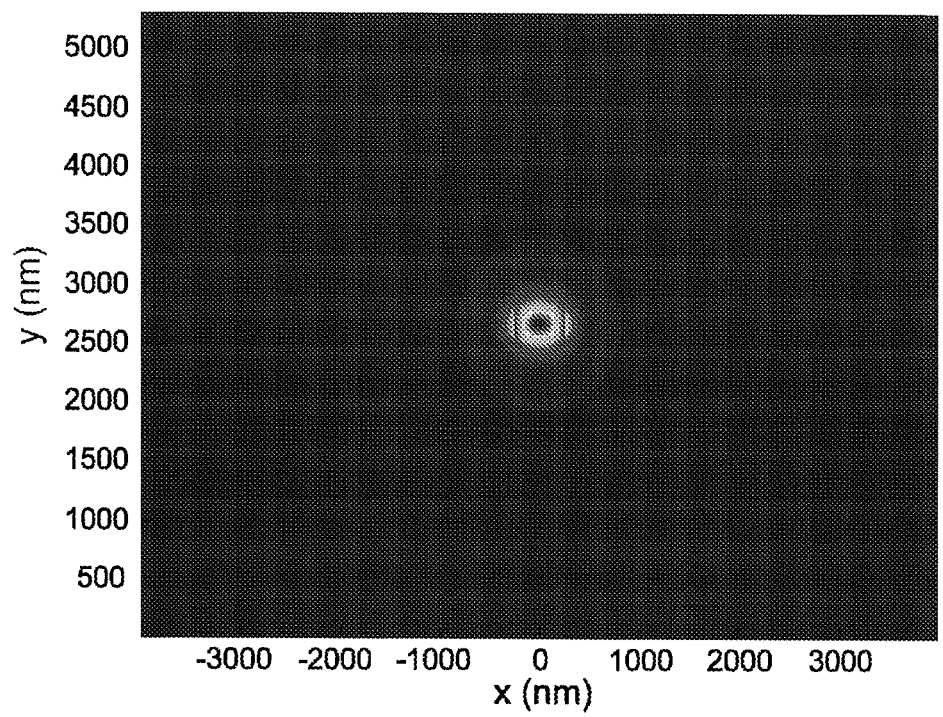
FIGS. 1A and 1B are representations of the mode profiles (real part of electrical field) of the TE and TM propagation modes at 1550 nm of a 450 nm×0.220 nm strip silicon waveguide, obtained using a mode solver.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the claimed invention relate to integrated photonic waveguides and, in particular, to spot-size converters providing mode conversion between two waveguides supporting propagation modes of different dimensions.

Overview of Spot-Size Converter

The present description generally relates to spot-size converters for coupling light between a first waveguide supporting a first propagation mode and a second waveguide supporting a second propagation mode, where the first and second propagation modes having substantially different dimensions.

As discussed in greater detail below, the spot-size converters described herein generally include a lower waveguiding structure coupled to the first waveguide and an upper waveguiding structure coupled to the second waveguide. The upper waveguiding structure, which is formed of a plurality of high-index elements arranged in multiple vertically spaced rows, extends at least partially over the lower waveguiding structure to define a coupling region in which a vertical evanescent coupling of light is established between the lower and upper waveguiding structures.

As used herein, the term "spot-size converter" refers to a transitional light-guiding and transforming element configured to change or convert the mode size of a light beam to be transmitted between two waveguides carrying optical modes of different dimensions. Spot-size converters according to embodiments of the invention may be useful in silicon-based photonic integrated circuits or other high-index-contrast photonics applications where it is desired to match the spot size of light in a silicon-based or another high-index-contrast photonic waveguide to the spot size of light in another, usually larger, optical component, or vice versa.

As used herein, the term "waveguide" refers to a structure that is designed to confine and direct the propagation of light such that the electromagnetic energy of the one or more guided modes supported by the structure remains substantially confined therein. Of course, as one skilled in the art will readily understand, guided modes generally present an evanescent field that extends partially outside of the waveguide.

As used herein, the terms "light" and "optical" are understood to refer to electromagnetic radiation in any appropriate region of electromagnetic spectrum, and are not limited to visible light but also generally include the microwave, infrared and ultraviolet ranges. For example, in embodiments of the invention for use in the telecommunications industry, the term "light" and "optical" may encompass electromagnetic radiation with a wavelength ranging from about 1260 nm to 1675 nm, including the O-band, C-band and L-band transmission windows for telecommunication applications.

As used herein, the term "high-index" when referring to an element of the upper or lower waveguiding structure of the spot-size converter refers to an element (e.g., a rod or a sheet) having an refractive index which is sufficiently higher than a refractive index of the medium surrounding this element for the upper or lower waveguiding structure to behave as an overall waveguiding structure. In other words, the term "high-index" is to be interpreted as a relative term indicating that the refractive index of the high-index element is higher than that of its surrounding environment, and not as an absolute term implying a specific numerical range of refractive index. By way of example only, and without limitation, in an implementation where a high-index element is surrounded by silica having a refractive index of about 1.44 at 1550 nm, the material forming the high-index element may have a refractive index higher than about 1.50 at 1550 nm.

In some embodiments, the spot-size converter may be based on silicon photonic device and implemented on an SOI platform. As known in the art, SOI technology refers to an integrated circuit technology that uses a layered silicon-insulator-silicon substrate rather than conventional silicon substrates. The thin layer of silicon formed on top of the insulating layer, typically silica, can be patterned to define one or more waveguides, as required by a given circuit design. Compared to technologies for photonic integration based on other combinations of materials, SOI is particularly attractive as it can provide very compact optical circuits. Such optical circuits are usually made by etching part of a thin layer of silicon (e.g., 220 nm thick) lying on top of a buried silicon oxide insulating layer (e.g., 1-3 µm thick), itself formed on top of a thick silicon substrate (e.g., several hundreds of µm). The provision of the buried silicon oxide insulating layer within the wafer can allow light to be highly confined in the waveguides forming the optical circuits. Of course, it is to be understood that the spot-size converters described herein are not limited to the SOI technology but may be based on various other types of materials such as, for example, silicon nitride ($Si_3N_4$), silicon carbide (SiC), silicon oxynitride ($SiO_xN$), silicon oxide ($SiO_x$), indium phosphide (InP), gallium arsenide (GaAs), polymers and the like.

The first and second waveguides may be embodied by various pairs of dissimilar waveguides which are to be optically coupled via the spot-size converter.

Figure 1B:
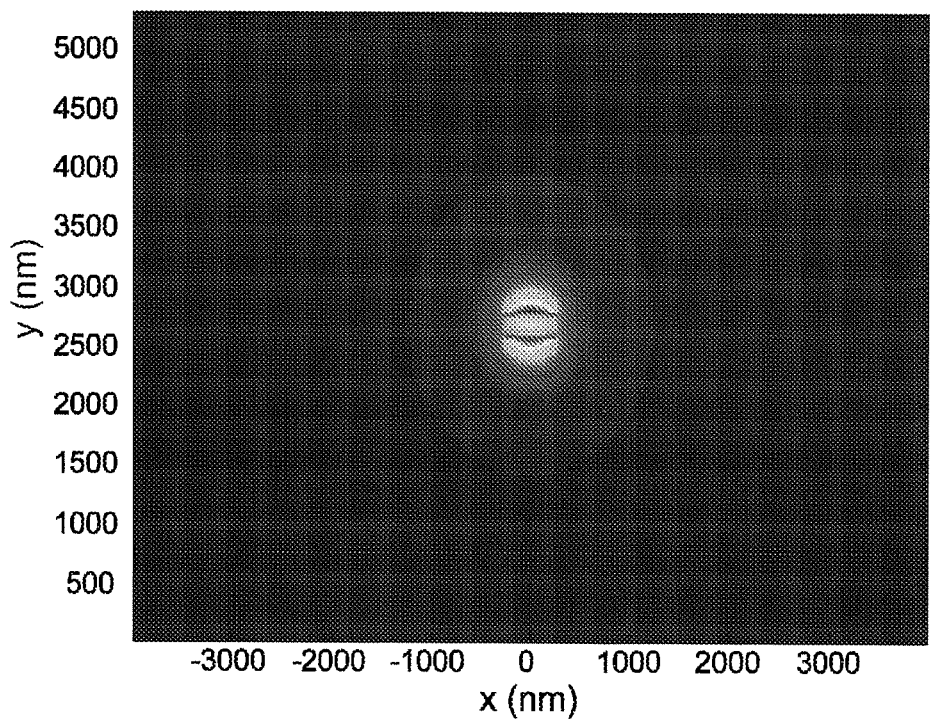

In one implementation, the first waveguide may be embodied by a submicron strip silicon waveguide, such as used on silicon photonics chips. The first waveguide may be optically connected to a first end of the spot-size converter (e.g., physically butt coupled or adiabatically coupled). For example, referring to FIGS. 1A and 1B, there are shown simulated representations of the mode profiles (real part of electrical field) of the TE and TM modes at 1550 nm of an exemplary 450-nm-wide by 220-nm-high strip silicon waveguide. In other implementations, the first waveguide may be embodied by another type of planar waveguide structure such as, for example, a rib, a ridge or a slot waveguide, which are also commonly found in silicon photonics. As used herein, the term "planar waveguide" is understood to refer to a waveguide provided in a substantially integrated configuration, such as in a planar light circuit, and including a light guiding path supported by a suitable substrate. However, while the term "planar" may suggest a flat structure, the term "planar waveguide" is also meant to encompass structures made of a plurality of flat layers stacked on a substrate, one of these layers defining the light-guiding path, as for SOI-based structures.

The second waveguide may be embodied by various structures carrying an optical mode of different dimensions than the optical mode carried by the first waveguide it is coupled to through the spot-size converter. The term "dimensions" when referring to an optical mode supported by the first or second waveguide is intended to refer to at least one parameter (e.g., the mode size or shape) characterizing the cross-sectional profile of the mode. More specifically, the cross-sectional profile of a mode refers to the spatial profile of the mode along a plane transverse to the propagation direction. It is to be noted that depending on the application, the first and second modes respectively supported by the first and second waveguide may be different in size, shape or both.

Figure 2:
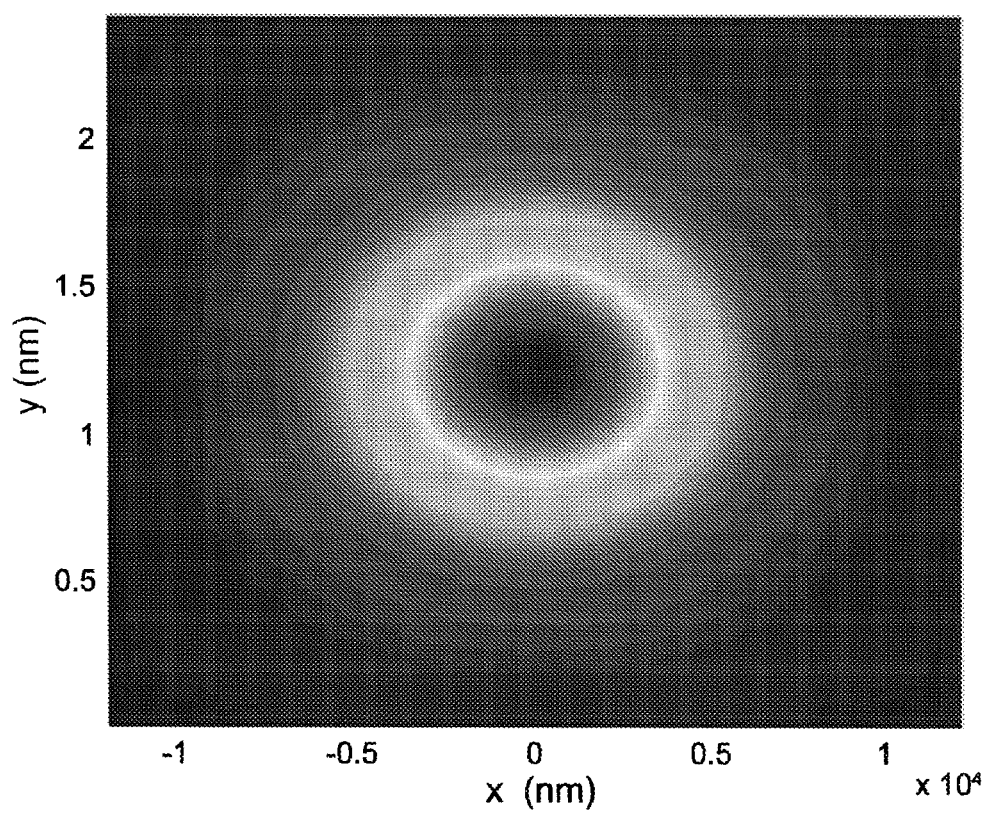
FIG. 2 is a representation of the mode profile of the real part of the electrical field of the fundamental mode of a SMF-28™ single-mode optical fiber manufactured by Coming Incorporated, obtained using a mode solver.

In some implementations, the second waveguide may be a larger SOI structure or the like or an optical fiber used to couple light in or out of an SOI chip. Optical fibers usually have light guiding cores of dimensions of the order of 5-10 µm, which are much greater than those of typical submicron silicon photonic waveguides. By way of example, FIG. 2 illustrates the 1550 nm cross-sectional mode profile of the fundamental mode of a SMF-28™ single-mode optical fiber (Corning Incorporated). By comparison to FIG. 1A, it will be observed that the optical fiber mode depicted in FIG. 2 is about 400 times larger than the guided mode supported by a typical submicron silicon waveguide.

In other implementations, the second waveguide may be a strip waveguide, a rib waveguide, a slot waveguide, a ridge waveguide or another planar waveguide implemented in a silicon photonics chip, an indium phosphide chip or another chip design. Depending on the application, the second waveguide can be optically coupled to one end of the spot-size converter (e.g., physically butt coupled) or to the top of the spot-size converter to facilitate evanescent light coupling. In further implementations, the coupling between the second waveguide and the spot-size converter may be a free-space coupling to couple a laser beam from a laser source into the first waveguide or to couple a free-space beam into the first waveguide, or to generate a free-space beam out of the spot-size converter, via a lens or appropriate optics, if necessary.

It will be readily understood that the designation of "first" and "second" in reference to the waveguides coupled through the spot-size converter is used merely for clarity and convenience, namely to differentiate the two waveguides. In particular, the use of the terms "first" and "second" is not meant to convey or imply a particular light propagation direction between the two waveguides. Accordingly, light may travel from the first to the second waveguide or from the second to the first waveguide, without departing from the scope of the present invention.

Exemplary Embodiment of a Spot-Size Converter

Referring to FIGS. 3 to 6, there is illustrated an exemplary embodiment of a spot-size converter 100 for coupling light between a first waveguide 102 and a second waveguide 104 respectively supporting a first and a second propagation mode. The first and second waveguides 102, 104, as well as the respective propagation modes carried thereby, have substantially different dimensions. The spot-size convertor 100 extends between a first end 106a and an opposite second end 106b along a longitudinal waveguiding axis 108 so as to define a light path between the first and second waveguides 102, 104.

In this embodiment, the first waveguide 102 is a conventional SOI-based strip waveguide having a width of 450 nm and a height of 220 nm. The first waveguide 102 is optically connected to the first end 106a of the spot-size converter 100 (physically butt coupled in this embodiment). In this configuration, the first waveguide 102 is found to be single-mode for both TE and TM modes. Of course, this configuration for the first waveguide 102 is provided by way of example only, since various other structures, geometrical dimensions and coupling arrangement to the spot-size converter could be used. For example, in other embodiments, the first waveguide 102 may be embodied by any other appropriate types of single-mode or multimode planar waveguides including, but not limited to, a rib waveguide, a slot waveguide and a ridge waveguide.

The second waveguide 104 is embodied by a single-mode optical fiber which is optically connected to the second end 106b of the spot-size converter 100 (physically butt coupled in this embodiment). The optical fiber includes a fiber core 110 having an MFD of about 6.6 µm and defining a light-guiding path of the second waveguide 104. The fiber core 110 is surrounded by a fiber cladding 112. It will be understood that embodiments of the present invention are not limited to a particular type or size of optical fiber. In particular, the optical fiber may be made of plastic, glass, quartz, silica or the like, and may include, without being limited to single-mode fibers, multimode fibers, polarization-maintaining fibers, microstructured fibers, multicore fibers, single-cladding fibers, multi-cladding fibers, doped fibers, high or ultra-high numerical aperture fibers, fiber arrays, or any other non-typical or customized fibers.

The spot-size converter 100 in FIGS. 3 to 6 is an SOI-based spot-size converter including a silicon substrate 114, an insulating layer 116 made of silica or another suitable material deposited on the silicon substrate 114, and a waveguiding region 118 provided on top of the insulating layer 116 and embedded in a cladding structure 120. As discussed further below, the cladding structure 120 may be formed of one or more cladding layers, each of which can be made of silica or another suitable material.

It is to be noted that while the insulating layer 116 and the cladding structure 120 may both be made of the same material (e.g., silica), their refractive indices may differ slightly due to the use of different deposition techniques. It is also to be noted that, in the illustrated embodiment, the spot-size converter 100 and the first waveguide 102 are formed from the same SOI wafer, so that they share the same silicon substrate 114, insulating layer 116 and cladding structure 120. As mentioned above, in other embodiments, the spot-size converter 100 need not be based on SOI technology.

The waveguiding region 118 of the spot-size converter 100 is responsible for converting the mode size of light propagating along the waveguiding axis 108 between the first and second waveguides 102, 104. The waveguiding region 118 generally includes a lower waveguiding structure 122 and an upper waveguiding structure 124. The lower waveguiding structure 122 has a first end 126a and an opposed second end 126b, the first end 126a being coupled to the first waveguide 102 to receive light therefrom or transmit light thereto in the first propagation mode. Similarly, the upper waveguiding structure 124 has a first end 128a and an opposed second end 128b, the first end 128a being coupled to the second waveguide 104 to receive light therefrom or transmit light thereto in the second propagation mode. Depending on the application, each of the lower and upper waveguiding structures 122, 124 can be made of various materials including, but not limited to, silicon, silicon oxynitride, silicon oxide, silicon nitride, silicon carbide, indium phosphide, gallium arsenide, a polymer or a combination thereof.

Lower Waveguiding Structure

Referring still to FIGS. 3 to 6, the lower waveguiding structure 122 may consist of a single waveguide element made of silicon and extending along the longitudinal waveguiding axis 108. The lower waveguiding structure 122 is formed on the insulating layer 116 of the SOI wafer and is patterned from the same thin silicon layer as the first waveguide 102. In the illustrated embodiment, the lower waveguiding structure 122 is single-mode for both TE and TM modes, but this need not be the case in other embodiments.

In some implementations, the lower waveguiding structure 122 can include a longitudinally tapered portion 130 tapering down toward the second end 126b thereof. It is noted that in the embodiment of FIGS. 3 to 6, the longitudinally tapered portion 130 of the lower waveguiding structure 122 extends over its entire length, but this need not be the case in other embodiments. More specifically, in FIGS. 3 to 6, the lower waveguiding structure 122 has a length of 500 µm, a constant height of 220 nm and a width that tapers from 450 nm at the first end 126a to 120 nm at the second end 126b. In some implementations, the width of the lower waveguiding structure 122 at the second end 126b is ideally as small as possible and is generally limited by the manufacturing process.

It is noted that in some implementations, the lower waveguiding may have a first longitudinally tapered portion tapering from the first end down to an intermediate location and a second longitudinally tapered portion tapering from the intermediate location down to the second end, where the profile (e.g., the slope) of the first longitudinally tapered portion is different (e.g., steeper) than the profile (e.g., the shape) of the second longitudinally tapered portion. Such an arrangement may contribute to reduce the overall length of the lower waveguiding structure.

As use herein, the terms "length" and variants thereof are used to refer to a dimension of a waveguide or waveguiding structure in the light propagation direction and along a longitudinal axis. The terms "width" and variants thereof are herein to refer to a dimension of a waveguide perpendicular to the light propagation and parallel the conventional plane or surface of the substrate on which the waveguide is formed. The terms "height" and variants thereof refer to a dimension of a waveguide perpendicular to both the length and width and also to the conventional plane or surface of the substrate. In some instances, the term "height" may be used substituted by the term "thickness". In this regard, it is noted that throughout the present description, the terms "vertical" and variants thereof refer to a direction perpendicular to a plane parallel to the conventional plane or surface of the substrate, that is, along the "height" (or "thickness") direction. Likewise, the terms "horizontal" and variants thereof are used to refer to directions lying in a plane which is perpendicular to the vertical direction as just defined, that is, encompassing the "width" and "length" directions.

The lower waveguiding structure 122 is characterized by an effective refractive index. As used herein, the term "effective refractive index", or simply "effective index", refers to a property of a waveguide that quantifies the decrease in the local phase velocity of light propagating in the waveguide compared to its phase velocity in vacuum. The effective refractive index represents the refractive index of a uniform material in which light would propagate with the same phase velocity as in the waveguide. As known in the art, the effective refractive index of a waveguide depends not only on its material properties, on the temperature and on the wavelength of light propagating therein, but also on its geometrical parameters (e.g., its cross-sectional profile) and, for multimode waveguides, on the mode in which light propagates. For this reason, the effective refractive index is also referred to as a "modal index". Additionally, the effective refractive index of a waveguide can vary along the propagation direction, as a result, for example, of a longitudinally varying cross-sectional profile. It is to be noted that in the present description, the effective refractive index values are given at 1550 nm, unless stated otherwise.

Referring still to FIGS. 3 to 6, it will be understood that in order to ensure good mode overlap between the lower waveguiding structure 122 and the first waveguide 102, it is desirable that the mode size and effective refractive index of the lower waveguiding structure 122 at the first end 126a thereof substantially coincide with those of the first propagation mode carried in the first waveguide 102. For example, for the tapered lower waveguiding structure 122 illustrated in FIGS. 3 to 6, the effective refractive index for the single TE mode varies from about 2.35 at the first end 126a (which matches the value of the effective refractive index of the first waveguide 102) to about 1.46 at the second end 126b, as depicted by the solid curve in FIG. 7 where the origin along the horizontal axis corresponds to the first end of the lower waveguiding structure. It will be understood that the narrower the tip of the taper, the closer the effective refractive index at the tip will be to the refractive index of the low-index medium surrounding the taper, which corresponds to the cladding structure 120 in FIGS. 3 to 6.

In the embodiment of FIGS. 3 to 6, as the lower waveguiding structure 122 tapers down toward the second end 126b, the mode guided in the lower waveguiding structure 122 becomes less confined so as to gradually expand in the cladding structure 120. In the illustrated embodiment, the mode evolution of light propagating along the lower waveguiding structure 122 is preferably adiabatic, or close to adiabatic. As known in the field of optical waveguides, the term "adiabatic" is intended to mean that variations in the cross-sectional profile of a waveguide are sufficiently slow and smooth to render coupling to other modes and radiative losses negligible or below some operationally acceptable level. As will be discussed below, the provision of an adiabatically tapering lower waveguiding structure 122 can favor and enhance the coupling of light between the lower and upper waveguiding structures 122, 124.

It is to be understood that the configuration for the lower waveguiding structure 122 illustrated in FIGS. 3 to 6 is provided by way of example only, as various other structural arrangements, optical properties, geometrical dimensions and materials could be used in other embodiments. For example, the longitudinally tapered portion 130 in FIGS. 3 to 6 is a taper having a constant height profile, but it may alternatively or additionally have a height profile that tapers longitudinally down toward the second end 126b of the lower waveguiding structure 122. Also, the slope of the longitudinally tapered portion 130 may be constant or not along its length (i.e., the longitudinally tapered portion 130 may form a linear or a non-linear taper), and may or may not form an adiabatic taper. More regarding other possible configurations for the lower waveguiding structure 122 will be discussed further below.

Upper Waveguiding Structure

Referring still to FIGS. 3 to 6, in the illustrated embodiment the upper waveguiding structure 124 includes a plurality of high-index elements 132 embodied by a plurality of optically coupled high-index rods extending along the waveguiding axis 108 and arranged in a two-dimensional array in a plane transverse to the waveguiding axis 108. The high-index rods can for example be made of various materials including, but not limited to, silicon, silicon oxynitride, silicon oxide, silicon nitride, silicon carbide, indium phosphide, gallium arsenide, a polymer, a combination thereof or other suitable materials.

The multi-rod array is embedded in the cladding structure 120 and includes, by way of example, three vertically spaced rows 134a to 134c and four horizontally spaced columns 136a to 136d of high-index rods. The high-index elements 132 can have a height of about 50 to 500 nm, a width of about 100 to 1000 nm, a length of several hundreds of microns, and a longitudinally uniform cross-section. The vertical spacing between adjacent rows can be a few microns while the horizontal spacing between adjacent columns can be in the range of one to a few microns. Of course, these dimensions are provided by way of example only and can be varied in other embodiments. It is also noted that in the illustrated embodiment, the separation between the high-index elements is substantially larger than their corresponding lateral dimensions (i.e., width and height), but this need not be the case in other embodiments.

Figure 6:
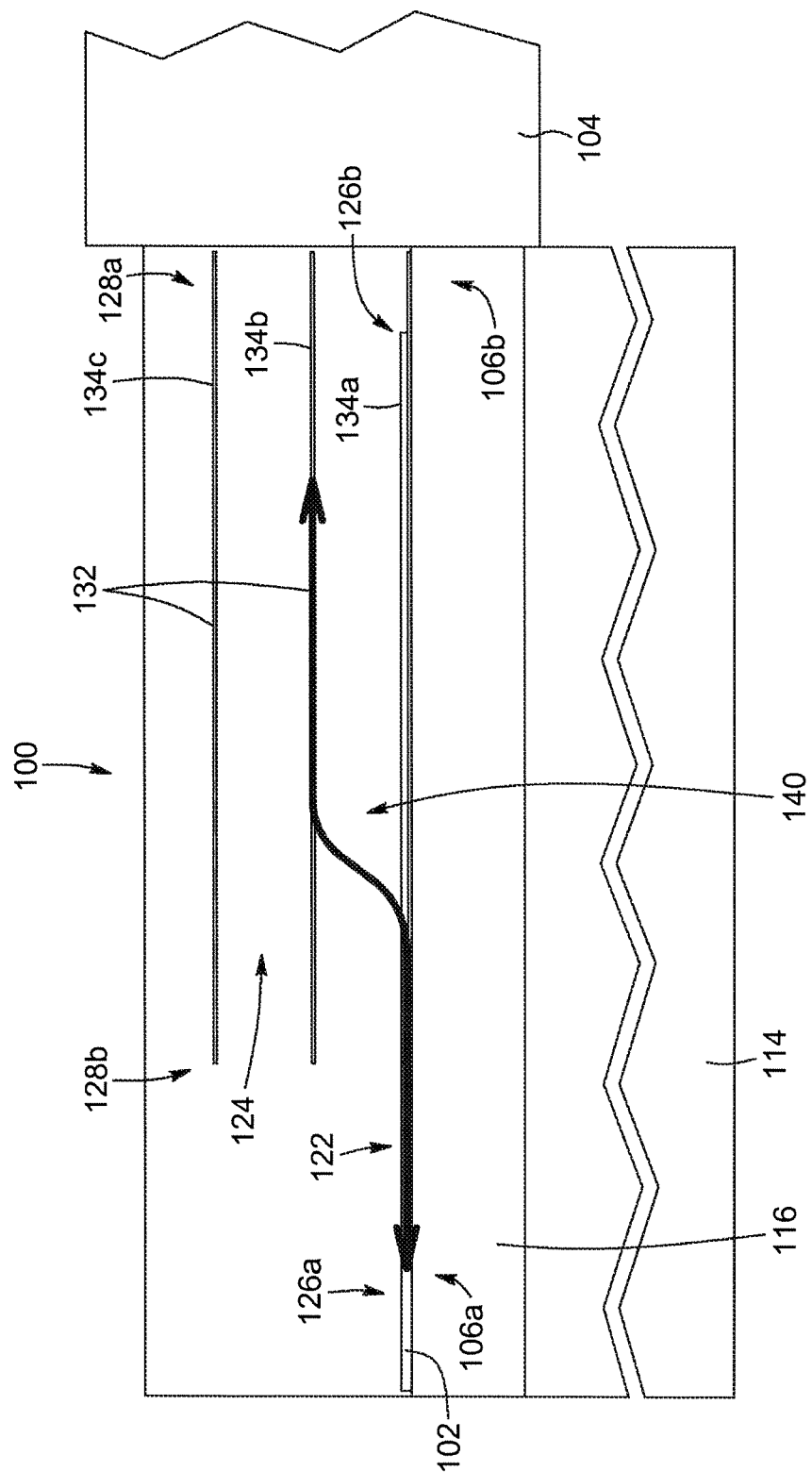
FIG. 6 is a side view of the spot-size converter of FIG. 3.

As better depicted in FIG. 6, in the illustrated embodiment, the lowest-lying row 134a of the plurality of high-index elements 132 is formed on the insulating layer 116 and thus lies in a same horizontal plane as the tapered lower waveguiding structure 122. It is to be noted that in implementations where the lowest-lying row 134a of the plurality of high-index elements 132 and the lower waveguiding structure are coplanar, it may be advantageous that the high-index elements 132 in the lowest-lying row 134a be fabricated at the same time and that they be made of same material as the lower waveguiding structure 122. Of course, any change in the optical properties of the upper waveguiding structure resulting from having different rows of high-index elements 132 made of different materials could be compensated by adjusting the geometrical parameters of the array.

Figure 8A:
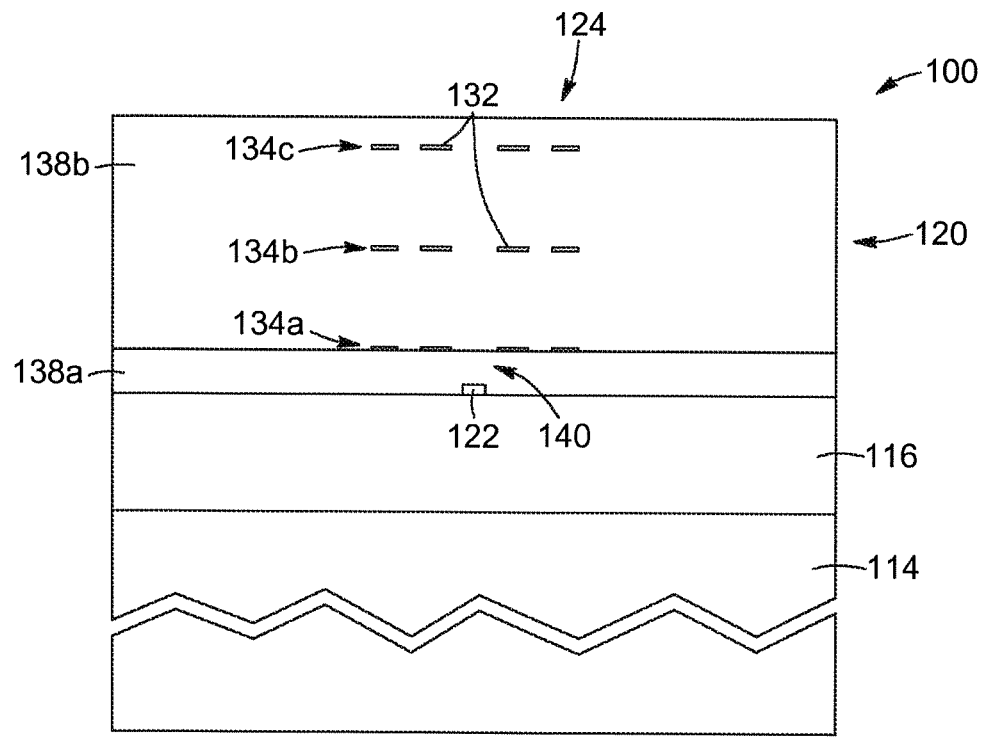
FIGS. 8A and 8B are schematic front views of a spot-size converter for coupling light between two dissimilar waveguides, in accordance with two other embodiments, illustrating different arrangements of the high-index elements of the upper waveguiding structure.
Figure 8B:
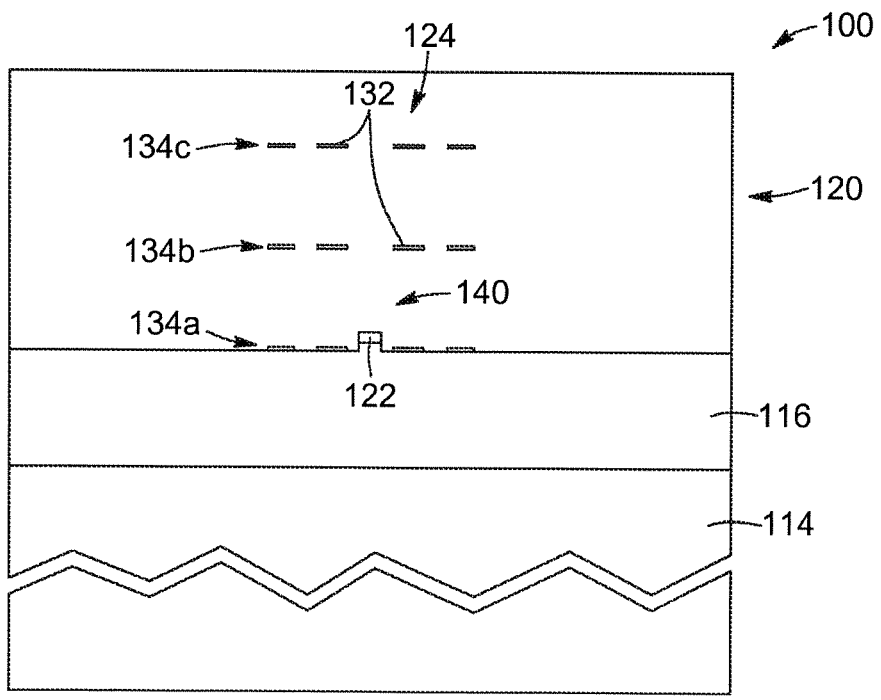

Turning briefly to FIGS. 8A and 8B, in other embodiments, the lowest-lying row 134a of high-index elements 132 could alternatively be provided slightly above or below the lower waveguiding structure 122. First, in FIG. 8A, the cladding structure 120 includes a first cladding 138a formed over the insulating layer 116 and sufficiently thick to surround the lower waveguiding structure 122, and a second cladding 138b formed on the first cladding 138a and embedding the plurality of the high-index elements 132 (e.g., the array of high-index rods). It is noted that, in practice, the second cladding 138b may itself be made of multiple sublayers, for example three in FIG. 8A. In this scenario, the high-index elements 132 in the lowest-lying row 134a of the array are patterned on top of the first cladding 138a and lie slightly above the lower waveguiding structure 122. It is to be noted that while the insulating layer, the first cladding 138a and the second cladding 138b can all be made of the same material (e.g., silica), their refraction indices may differ due to the use of different materials and/or deposition techniques. Second, in FIG. 8B, the lower waveguiding structure 122 is patterned on the insulating layer 116 and, following selective etching of the upper surface of the insulating layer 116, the high-index elements 132 in the lowest-lying row 134a are subsequently patterned. In this scenario, the lowest-lying row 134a of high-index elements 132 lies slightly below the lower waveguiding structure 122.

Referring back to FIGS. 3 to 6, the upper waveguiding structure 124 is also characterized by an effective refractive index. In order to ensure good mode overlap between the upper waveguiding structure 124 and the second waveguide 104, it is desirable that the mode size and the effective refractive index of the upper waveguiding structure 124 at the first end 128a thereof substantially coincide with those of the propagation mode guided in the second waveguide 104. In particular, this means that, in some embodiments of the spot-size converter 100, it is desirable that the upper waveguiding structure 124 be able to support modes as large as those carried in standard telecommunication optical fibers with MFDs ranging from about 8 to 10 µm or in high numerical aperture (HNA) fibers with MFDs ranging from about 3 to 8 µm and fusion-spliced to standard fibers.

It will be understood that an upper waveguiding structure 124 such as in FIGS. 3 to 6, which has relatively large lateral dimensions and is formed of a plurality of high-index elements 132, can provide an efficient way to form an overall waveguiding structure capable of carrying a mode whose size and effective refractive index can match, for example, those of a standard or HNA optical fiber. It will also be understood that when the upper waveguiding structure 124 of FIGS. 3 to 6 behaves as an overall waveguiding structure, light guided there along travels mainly in the cladding structure 120 embedding the high-index elements 132, rather than in the high-index elements 132 themselves.

As a result, the effective refractive index of the upper waveguiding structure 124 as a whole may be significantly lower than the effective refractive index of the individual high-index elements 132 and closer to the effective refractive index of a standard optical fiber or another larger waveguide embodying the second waveguide 104. For example, the effective refractive index for the single TE mode of the multi-rod upper waveguiding structure 124 of FIGS. 3 to 6 has a constant value of about 1.48 along its length, as depicted by the dashed curve in FIG. 7. It will be understood that the effective refractive index of the upper waveguiding structure 124 will generally depend on the material properties of the high-index elements 132 and low-index cladding structure 120 and on the geometry of the high-index element array.

It will be understood that the configuration for the upper waveguiding structure 124 illustrated in FIGS. 3 to 6 is provided by way of example only, as various other structural arrangements, optical properties, geometrical dimensions and materials could be used in other embodiments. For example, while the plurality of high-index elements 132 forms a two-dimensional linear array of high-index rods in FIGS. 3 to 6, this need not be the case in other embodiments as long as the plurality of high-index elements 132 are arranged in multiple vertically spaced rows and in one or more columns. Indeed, in some embodiments, the plurality of high-index elements 132 can form of a stack of vertically spaced high-index sheets, as discussed further below and illustrated in FIG. 9. Also, while in FIGS. 3 to 6 the upper waveguiding structure 124 is arranged symmetrically with respect to the waveguiding axis 108, this need not be the case in other embodiments.

Figure 28:
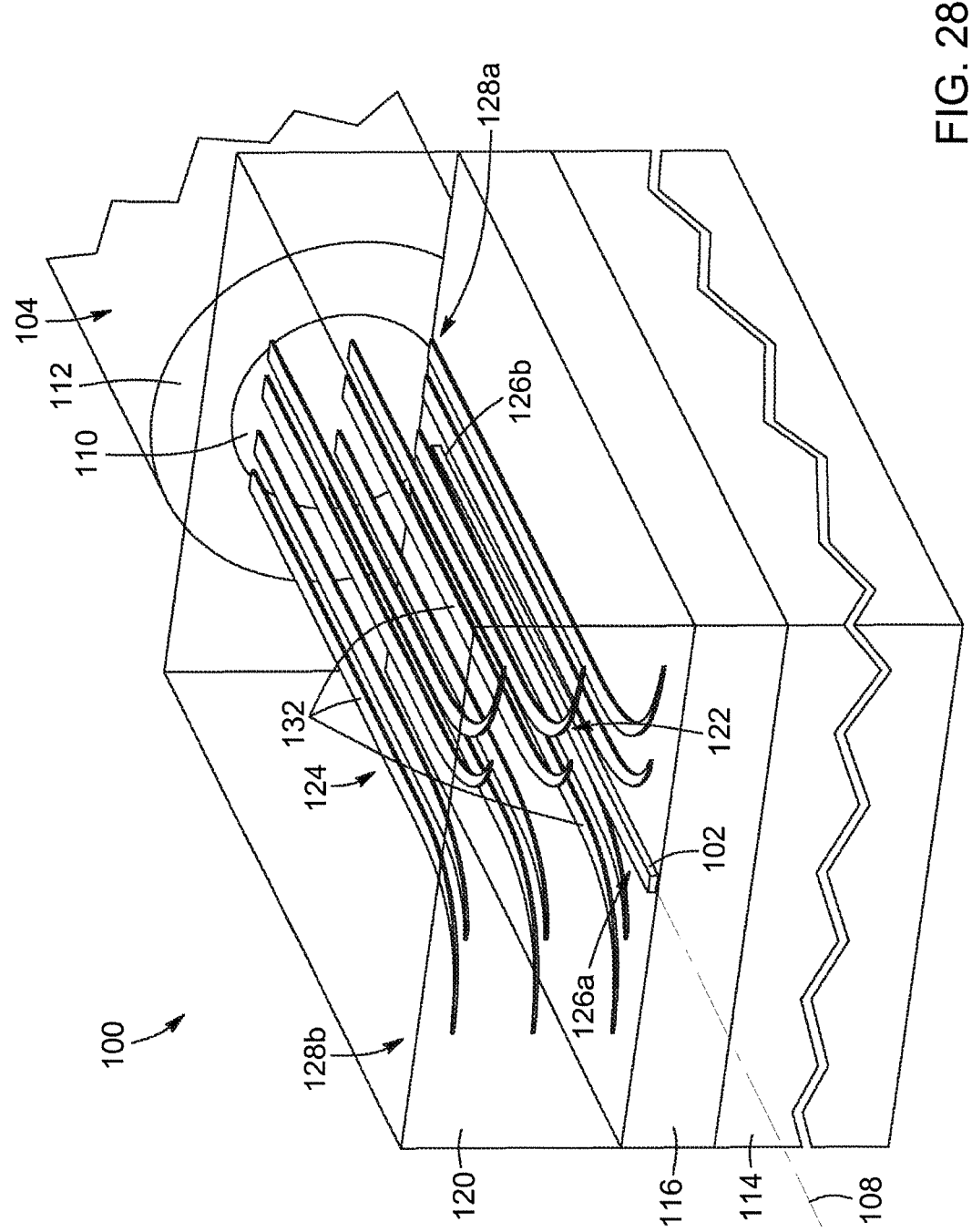
FIG. 28 is a schematic perspective view of a spot-size converter for coupling light between two dissimilar waveguides, in accordance with another embodiment.

Furthermore, referring to FIG. 28, in some embodiments, the high-index rods in FIGS. 3 to 6 may be formed so as to extend further above the lower waveguiding structure 122 while also gradually laterally diverging away from the waveguiding axis 108 as they get closer to the first end 126a of the lower waveguiding structure 122. Such a configuration may provide a smoother transition between the lower and upper waveguiding structures 122, 124.

It will also be understood that the high-index elements 132 need not be configured as a linear array but may be provided at arbitrary locations that do not conform to a specific pattern. Likewise, the cross-sectional profile of the individual high-index elements 132 need not be rectangular and may vary in size and/or shape along the waveguiding axis 108. Also, while the effective refractive index of the upper waveguiding structure 124 is substantially constant along its length in the embodiment of FIGS. 3 to 6, this need not be the case in other embodiments. More regarding other possible configurations for the upper waveguiding structure 124 will be discussed further below.

Coupling Between the Lower and Upper Waveguiding Structures

It will be understood that because the first and second waveguides carry modes with substantially different effective indices and mode sizes, so do the lower and upper waveguiding structures at their respective first ends. Therefore, in order for the spot-size converter described herein to provide a smooth and efficient transition for light propagating therein, it is desirable that the lower and upper waveguiding structures establish a coupling region therebetween, where their modes overlap and crossing of their effective refractive indices occurs. Fulfilling these conditions generally implies that the lower and upper waveguiding structures are positioned sufficiently close to each other and that the effective refractive index of at least one of the lower and upper waveguiding structures varies longitudinally inside the coupling region. More regarding the coupling between the lower and upper waveguiding structures will now be described.

Referring back to FIGS. 3 to 6, the multiple vertically spaced rows 134a to 134c of high-index elements 132 are positioned in a manner such that at least part of the upper waveguiding structure 124 extends above the lower waveguiding structure 122. For example, in FIGS. 3 to 6, the two highest-lying rows 134b, 134c extend above the lower waveguiding structure 122 while the lowest-lying row 134a is formed on a same horizontal plane as the lower waveguiding structure 122 (see FIGS. 8A and 8B introduced above for alternative configurations).

This vertical overlap of the upper waveguiding structure 124 with the lower waveguiding structure 122 defines a coupling region 140 therebetween. As used herein, the term "coupling region" refers to a region of the spot-size converter in which light propagating in lower waveguiding structure is transferred or coupled to the upper waveguiding structure, and vice versa. In the illustrated embodiment, the lower and upper waveguiding structures 122, 124 are configured such that their modes overlap and a crossing of their effective refractive indices occurs in the coupling region 140. It will be understood that these conditions can enable or promote the establishment of a vertical evanescent coupling of light between the lower and upper waveguiding structures 122, 124.

As known in the art, evanescent optical coupling between two waveguiding structures is a coupling technique in which the evanescent field associated with light propagating in one waveguiding structure is used to couple the light in the other waveguiding structure when the two waveguiding structures are brought into close enough proximity. Evanescent coupling involves a spatial overlap between the modes guided in the two waveguiding structures, that is, a coincidence or crossing of the effective refractive indices of the two waveguiding structures at some location along the waveguiding axis. It is to be noted that when two waveguiding structures are made of different materials, which is the case for the lower and upper waveguiding structures illustrated in FIGS. 3 to 6, it may be indeed advantageous to use a vertical evanescent coupling between the two waveguiding structures.

Figure 7:
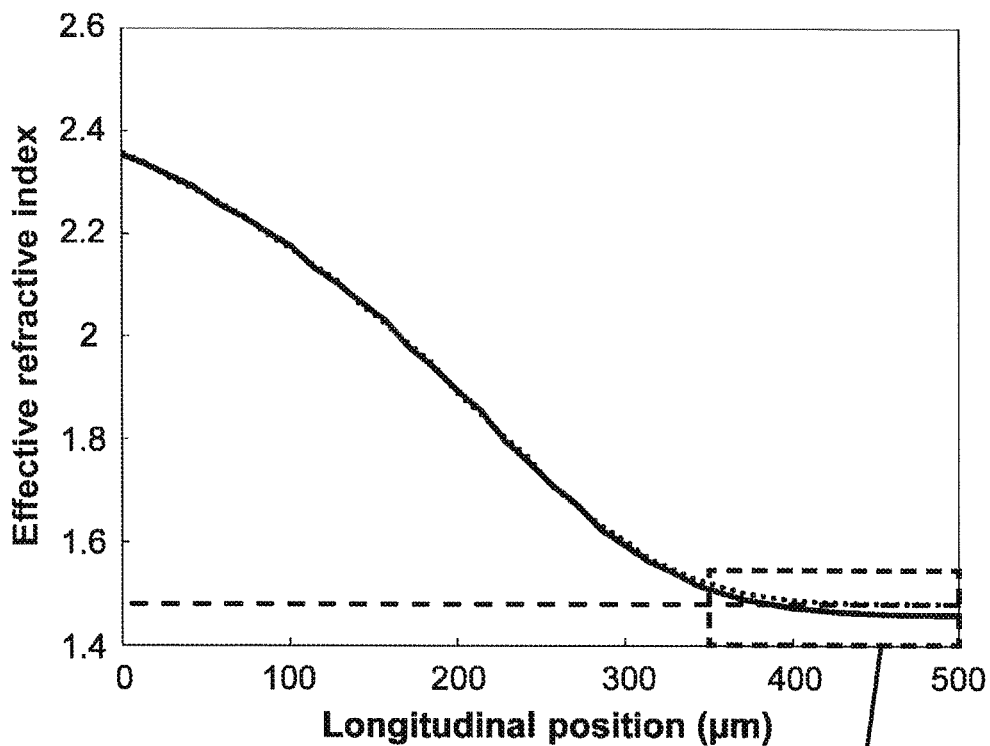
FIG. 7 depicts numerical calculations of effective refractive index curves for the TE mode plotted as a function of position along the waveguiding axis of the spot-size converter of FIG. 3. The solid and dashed curves represent respectively the effective refractive indices of the lower and upper waveguiding structures considered separately. The dotted curve represents the effective refractive index of the spot-size converter as a whole resulting from the coupling of the lower and upper waveguiding structures. The origin along the horizontal axis corresponds to the first end of the lower waveguiding structure of the spot-size converter.

In the embodiment of FIGS. 3 to 6, the crossing of the effective refractive indices of the lower and upper waveguiding structures 122, 124 to establish a vertical evanescent coupling therebetween is achieved by longitudinally tapering the lower waveguiding structure 122 to reduce its effective refractive index from about 2.35 at the first end 126a to about 1.46 at the second end 126b, as depicted in FIG. 7. As mentioned above, the longitudinal tapering of the lower waveguiding structure 122 may be done adiabatically, such that the cross-sectional profile of optical mode gradually changes in a substantially lossless manner so as to correspond to the fundamental guided mode at each location along the waveguiding axis 108.

Figure 7A:
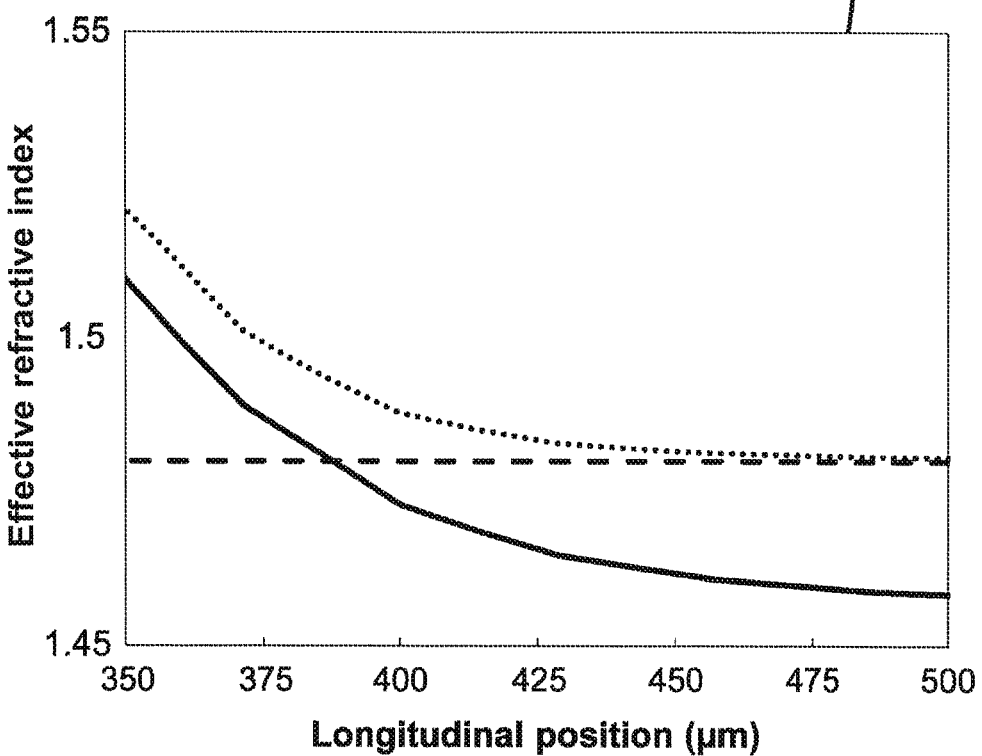
FIG. 7A is an enlargement of a portion of FIG. 7 that better illustrates the crossing of the effective refractive indices of the lower and upper waveguiding structures in the coupling region.

Meanwhile, the multi-rod upper waveguiding structure 124 has a uniform cross-sectional profile along the waveguiding axis 108 with an effective refractive index of about 1.48 (dashed curve in FIG. 7), which is slightly higher than the refractive index of the low-index surrounding medium (e.g., about 1.44 if the cladding structure is made of silica). For this particular configuration, there is a point in the coupling region 140 where the effective refractive indices of the upper and lower waveguiding structures considered separately coincide. Referring to FIG. 7A, which is an enlargement of a portion of FIG. 7, this crossing point is located at about 400 µm from the first end of the lower waveguiding structure and corresponds to the intersection of the solid and dashed curves.

FIGS. 7 and 7A depicts not only the longitudinal profile of the effective refractive indices of the lower and upper waveguiding structures considered separately, but also the effective refractive index of the spot-size converter as a whole resulting from the combination of the lower and upper waveguiding structures in order to create a single waveguiding structure (see the dotted curve in FIGS. 7 and 7A). The mode associated with the effective refractive index of the spot-size converter as a whole may be referred to as a "super-mode". By considering the longitudinal profile of the super-modes at different location along the waveguiding axis, it may be seen that the super-mode corresponds to the mode of the longitudinally tapered lower waveguiding structure at the end of the spot-size converter coupled to the first waveguide (e.g., a submicron silicon waveguide) and that it corresponds to the mode of the multi-rod upper waveguiding structure at the end of the spot-size converter coupled to the second waveguide (e.g., a standard optical fiber). In other words, the super-mode propagating in the spot-size converter gradually transfers its shape from that associated with the lower to the upper waveguiding regions along the waveguiding axis, and vice versa (see also the double-sided arrow in FIG. 6). It can thus be seen that the effective indices of the modes associated with the lower and upper waveguiding structures of the spot-size converter play an important role in the strength and enhancement of the evanescent coupling.

FIGS. 16A through 16I show the TE mode intensity distribution of an embodiment of the spot-size converter at different locations over a length of 500 µm along the waveguiding axis, going from the lower to the upper waveguiding structure up to the second waveguide. In this embodiment, the lower and upper waveguiding structures are formed respectively of a single silicon waveguide element tapering down from an initial 300-nm wide by 220-nm-high cross-section (see FIG. 16A) and of a stack of three vertically spaced high-index multi-rods layers having an MFD of about 7 µm as shown in FIG. 8A. A maximum evanescent coupling loss of 0.05 dB for the TE mode is obtained over the C-band from eigenmode-expansion (EME) simulations, which is indicative of an efficient adiabatic transfer. The coupling loss due to mode mismatch between the second end of the spot-size converter (FIG. 16H) and the second waveguide (FIG. 16I) contributes to less than 0.22 dB of the 0.27 dB total loss over the C-band for both TE and TM modes. One skilled in the art will appreciate that such values are indicative of a favorably high coupling efficiency from a standard silicon strip waveguide to an optical fiber having a large mode field diameter.

It will be understood that the provision of an upper waveguiding structure formed of a plurality of vertically spaced rows of high-index elements can allow the effective refractive index and mode size of the upper waveguiding structure to be tailored and designed by appropriately selecting the material forming the high-index elements (which may differ from one high-index element to another), their individual size and shape, as well as their relative arrangement (i.e., their relative positioning and mutual separation). In other words, the provision of multiple vertically spaced rows of high-index elements can offer more degrees of freedom than upper waveguiding structures made of a single layer of elements. In particular, this configuration of the upper waveguiding structure can provide an efficient way to form an overall waveguiding structure capable of carrying a mode whose size and effective refractive index can match those of relative large second waveguides such as, for example, optical fibers with MDF ranging from about 3 to 10 µm.

Other Configurations for the Spot-Size Converter

It will be understood that the embodiment of the spot-size converter described above with reference to FIGS. 3 to 6 was provided by way of example only, and that the spot-size converter may be provided in a variety of other possible configurations. Several examples of such possible configurations will now be discussed.

Figure 10A:
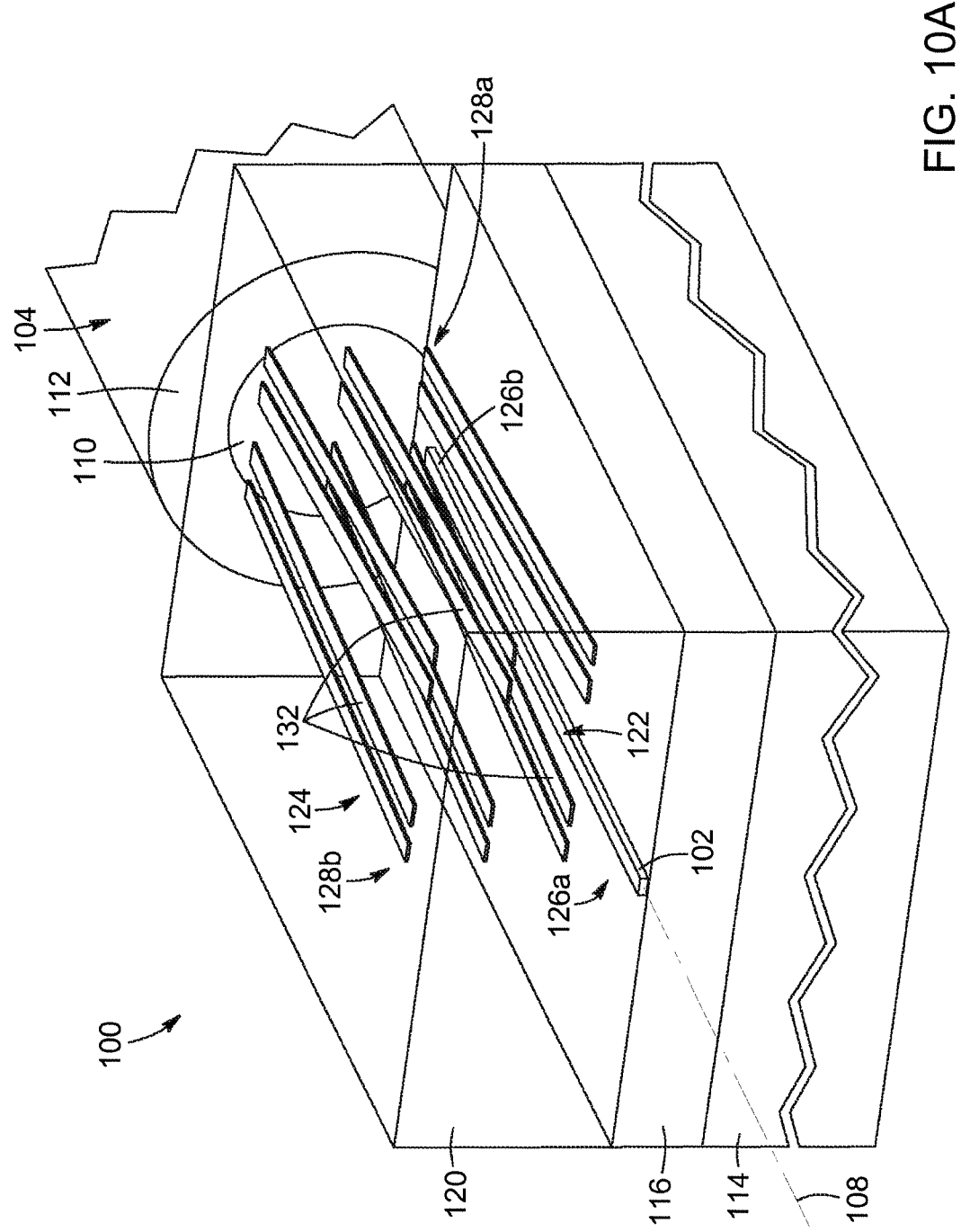
FIGS. 10A to 10C are schematic perspective views of a spot-size converter for coupling light between two dissimilar waveguides, in accordance with three other embodiments.
Figure 10B:
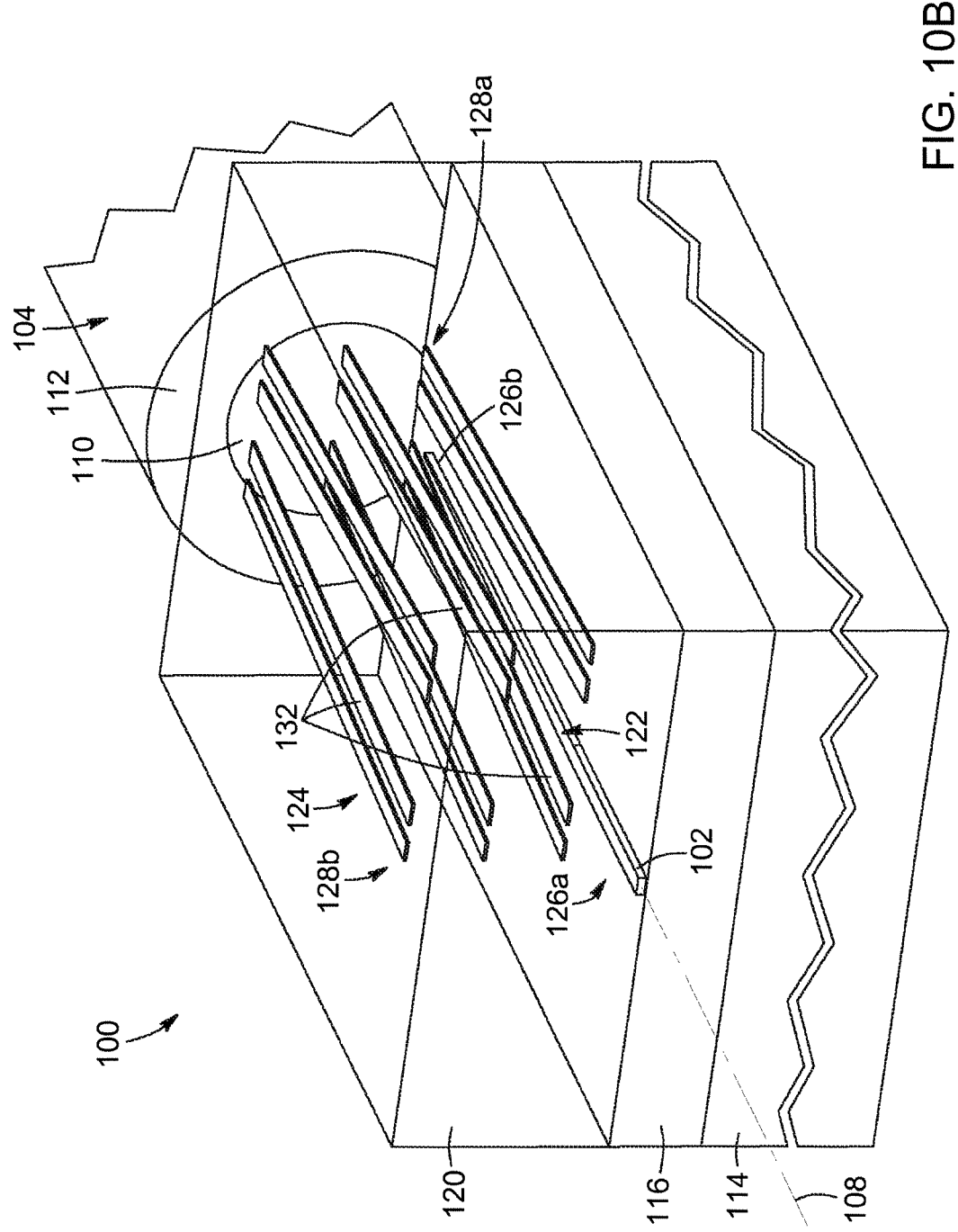
Figure 10C:
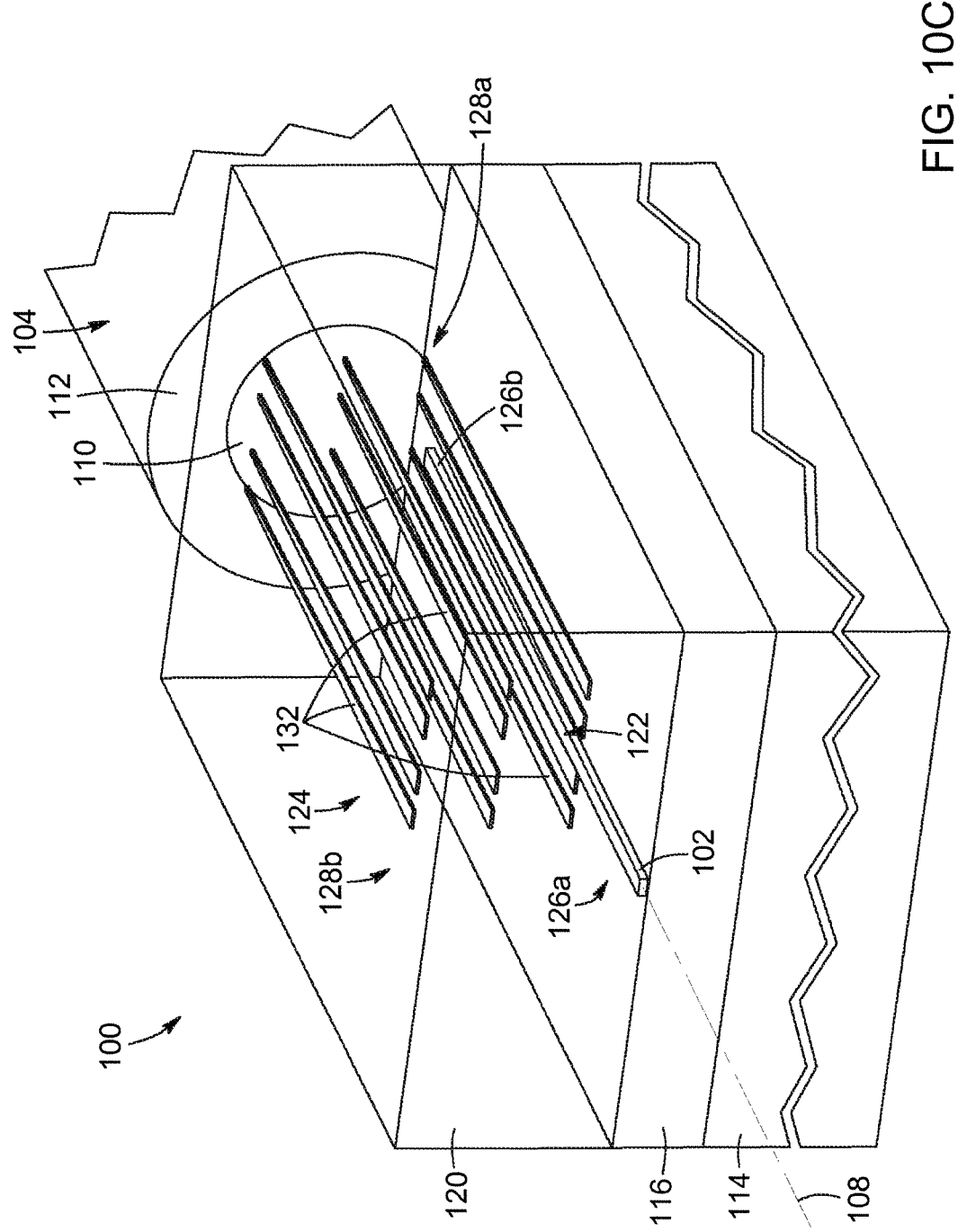

In the embodiment of the spot-size converter 100 illustrated in FIGS. 3 to 6, the lower waveguiding structure 122 is longitudinally tapered while the upper waveguiding structure 124 has a uniform cross-sectional profile along its length. However, referring to FIG. 10A, in another embodiment of the spot-size converter 100, it may be the upper waveguiding structure 124 that tapers longitudinally as a whole in the coupling region 140 while the lower waveguiding structure 122 has a uniform cross-sectional profile along its length. Similarly, referring to FIG. 10B, in a further embodiment, both the lower and upper waveguiding structures 122, 124 can taper longitudinally in the coupling region 140. Turning now to FIG. 10C, in yet another embodiment, a longitudinal variation in the effective refractive index of the upper waveguiding structure 124 can be achieved not by a longitudinal tapering of the lower or upper waveguiding structures 122, 124 as a whole, but rather by a longitudinal tapering of at least one of the plurality of high-index elements 132 of the upper waveguiding structure 124 in the coupling region 140.

It is to be noted that in other implementations, a crossing of the effective refractive indices of the lower and upper waveguiding structures need not involve a longitudinal tapering of either or both of the lower and upper waveguiding structures. Hence, in some embodiments, the effective refractive index of either or both of the lower and upper waveguiding structures can vary longitudinally due to a longitudinal variation in material composition or geometrical properties without longitudinal tapering. This could be achieved, for example, in a scenario where the lower waveguiding structure would be embodied by a subwavelength grating having a uniform cross-section profile along its length but a longitudinally varying duty cycle. More regarding subwavelength structures will be discussed further below.

In a conventional SOI structure, the insulating layer is typically 1 to 3 μm thick and is deposited on top of a significantly thicker silicon substrate. In some embodiments of the spot-size converter, using an upper waveguiding structure formed as an array of elongated high-index elements (e.g., a multi-rod array) which is large enough to provide good overlap with the mode of a standard telecommunication optical fiber may be challenging due to the presence of the thick silicon substrate. This is because, in some implementations, the light propagating in the spot-size converter may tend to leak toward the silicon substrate, thus causing unwanted losses. In some embodiments, addressing or mitigating this issue could involve reducing the length of the tapered portion of the lower waveguiding structure. In other embodiments, it could be envisioned to decrease the size of the mode carried in the upper waveguiding structure so as to avoid or mitigate losses to the substrate.

Another approach could involve increasing the thickness of the SOI insulating layer. For example, while a thickness of 2 μm generally represents a standard value for the SOI insulating layer, recent publications have reported SOI insulating layers having thicknesses in the range of 3-6 μm. A further approach could involve surrounding the upper waveguiding structure with a material that has a refractive index that is slightly higher than the refractive index of the SOI insulating layer (but preferably still less than about 1.5). In such a configuration, the optical mode carried by the upper waveguiding structure would generally remain more confined, extending less into the SOI insulating layer and thus interacting less with the silicon substrate. It is to be noted that in scenarios where the material surrounding the lower waveguiding structure is different than the material embedding the upper waveguiding structure, the material surrounding the lower waveguiding structure could have a refractive index having a value between those of the SOI insulating layer and the material embedding the upper waveguiding structure. Alternatively, the mode size could be decreased in order to avoid or mitigate losses to the substrate.

Figure 11A:
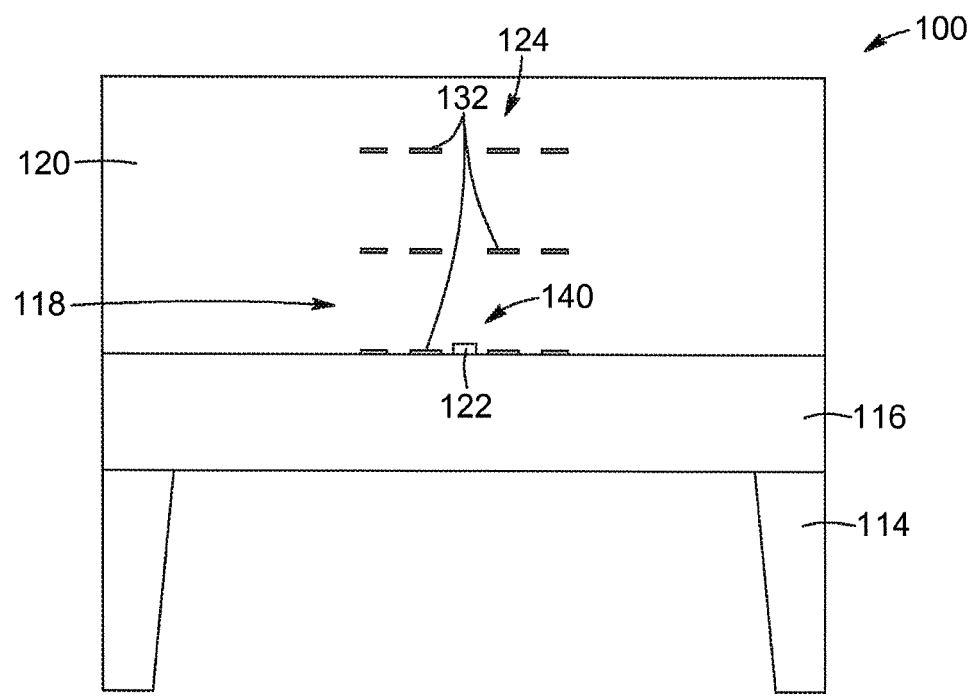
FIG. 11A is a schematic front view of a spot-size converter for coupling light between two dissimilar waveguides, in accordance with another embodiment, where the silicon substrate has been etched below the waveguiding region of the spot-size converter.
Figure 11B:
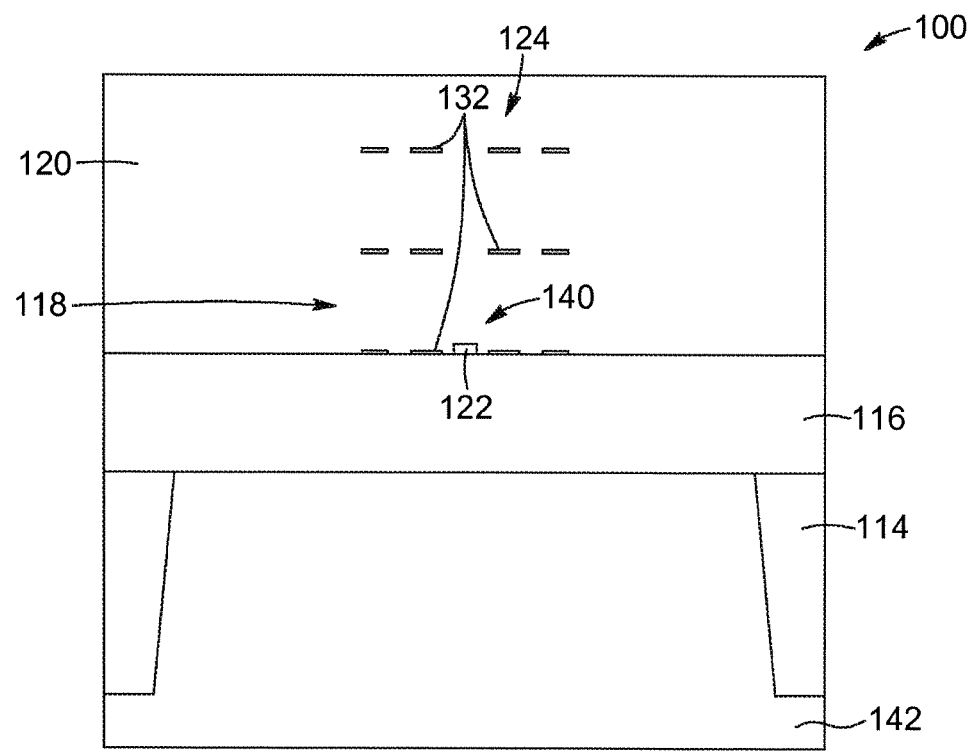
FIG. 11B is a variant of the embodiment of FIG. 11A where the etched region has been filled with non-light-absorbing material.

Referring to FIG. 11A, in yet another approach, the silicon substrate 114 may be etched underneath the waveguiding region 118 of the spot-size converter 100, in order to help reducing light leakage toward the substrate 114 and improving coupling to an optical fiber with larger mode-field diameters. Referring to FIG. 11B, a variant of the embodiment of FIG. 11A could further involve filling the etched region with a material 142 selected to avoid or reduce light absorption or leaks, such as for example silica or an adhesive. This particular variant may be advantageous in applications where it is desired or needed that the chip implementing the spot-size converter be affixed to another surface.

The tapered structures in the embodiments of the spot-size converter described so far include tapers whose tip has a width that is ideally as small as possible, which may be difficult or not possible to fabricate in practice. In some of these embodiments, subwavelength gratings may be used to help defining a structure that is more easily manufactured and that can act as a taper having a narrower tip. For example, referring to FIGS. 12A and 12B, the lower waveguiding structure 122 of the spot-size converter may be a single waveguide provided with a subwavelength composite portion 144 that defines a subwavelength pattern.

As used herein, the term "subwavelength" refers to the fact that the size of the characteristic features or inhomogeneities (typically, corrugation periodicity) of the subwavelength pattern are markedly smaller than half of the effective wavelength of the electromagnetic signal propagating there inside. When the effective wavelength of the electromagnetic signal propagating within the subwavelength composite portion is large compared to the characteristic feature size thereof, the structure can be treated as an overall homogeneous material. This condition is generally met when the characteristic feature size of the subwavelength pattern (typically the periodicity of the corrugations) is less than half the wavelength of the electromagnetic signal propagating therein.

Figure 12A:
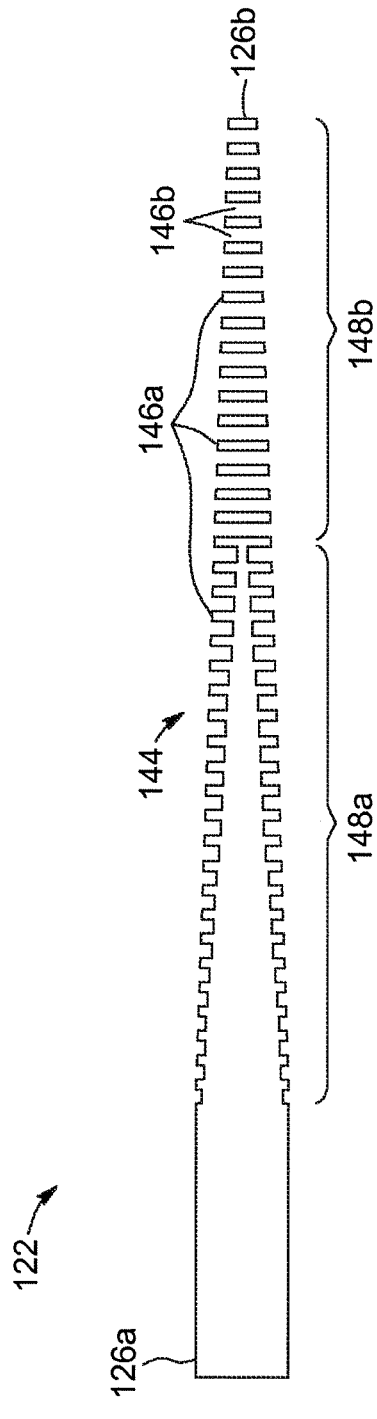
FIGS. 12A and 12B are schematic top views of other exemplary configurations of a lower waveguiding structure of a spot-size converter for coupling light between two dissimilar waveguides, in accordance with two other embodiments, both configurations of the lower waveguiding structure including a subwavelength composite portion that defines a subwavelength pattern having a characteristic size which is less than half a wavelength of light when propagating therein.

In the illustrated embodiment of FIG. 12A, the subwavelength pattern is a one-dimensional corrugated grating including a series of corrugations 146a formed from the lower waveguiding structure 122. The series of corrugations 146a is distributed along the waveguiding axis 108 and transverse thereto. The series of corrugations 146a includes a first section 148a and a second section 148b respectively proximate the first end 126a and the second end 126b of the lower waveguiding structure 122. In the first section 148a, the corrugations 146a are formed by progressively removing more and more material from the lower waveguiding structure 122 in order that the effective refractive index of the propagating mode gradually decreases toward the refractive index of the surrounding medium. Increasingly removing material from each side of the lower waveguiding structure 122 along the waveguiding axis 108 may be performed up a point where the minimum width achievable by the fabrication process used is reached. From this point, the second section 148b begins in which material from the lower waveguiding structure is removed over its entire cross-section. Hence, in the second section 148b, the corrugations 146*a* are interleaved with gaps 146*b* where portions of the lower waveguiding structure 122 are absent.

It will be understood that as long as the period of the subwavelength pattern remains smaller than half the effective wavelength of the mode propagating in the subwavelength composite portion 144, the subwavelength composite portion 144 of the lower waveguiding structure 122 can act as a homogeneous medium with an effective refractive index whose value is between those of the material forming the corrugations 146*a* and the surrounding material. Such an approach may be used for any taper whose cross-section is to be tapered down to very small values. It will also be understood that the parameters of the subwavelength pattern such as its period or lack thereof, its duty cycle (i.e., the ratio of the corrugation length to the period of the subwavelength pattern) and the like may be tailored to reduce optical losses, back reflections and other adverse effects that could occur at the junction between the first and second sections 148*a*, 148*b*.

In the configurations describe above, the lower waveguiding structure of the spot-size converter consists of a single waveguide element. However, in other configurations, the lower waveguiding structure can include a plurality of high-index elements lying in a common horizontal plane (e.g., deposited on an SOI insulation layer).

Figure 13:
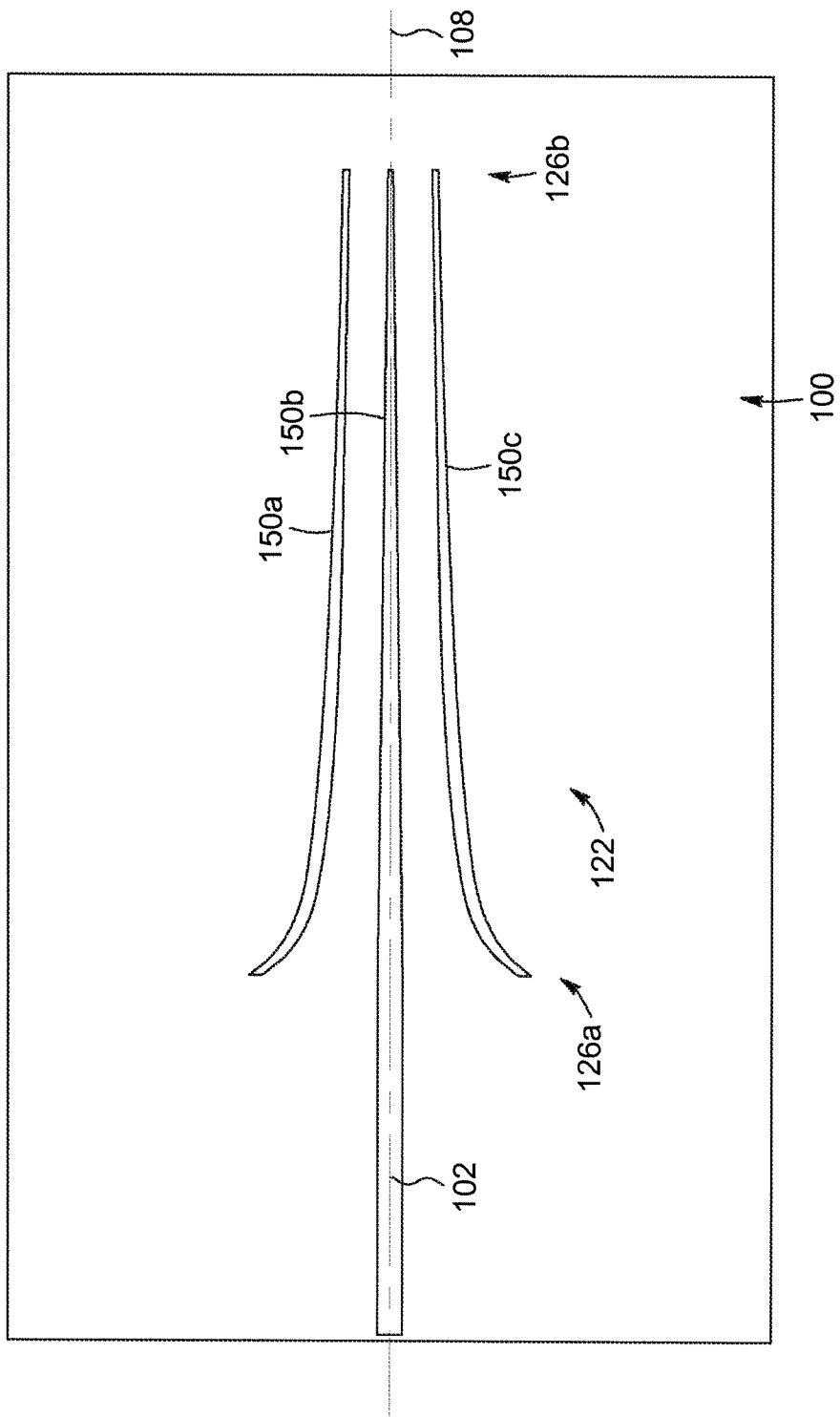
FIG. 13 is a top view of an exemplary configuration of a lower waveguiding structure of a spot-size converter for coupling light between two dissimilar waveguides, in accordance with another embodiment, the lower waveguiding structure including a plurality of high-index elements lying in a common horizontal plane.

For example, referring to FIG. 13, the lower waveguiding structure 122 includes three coplanar silicon high-index elements 150*a* to 150*c* extending substantially along the waveguiding axis. The high-index elements 150*a* to 150*c* include a central high-index element 150*b* directly coupled to the first waveguide 102 at the first end 126*a* of the lower waveguiding structure 122, and two narrower outer high-index elements 150*a*, 150*c* laterally disposed on each side of the central high-index element 150*b*. Both the central element 150*b* and the outer elements 150*a*, 150*c* can be tapered along the waveguiding axis 108 to enable vertical evanescent coupling with an upper waveguiding structure (not shown in FIG. 13), which could be embodied by the multi-rod structure of FIGS. 3 to 6 or another structure. The high-index elements 150*a* to 150*c* can be positioned and their effective refractive indices selected so as to be optically coupled together so that they can be viewed as a single overall waveguiding structure that can support the propagation of only few modes or even be single-mode. Of course, the number, size, shape, arrangement and material composition of the plurality of high-index elements 150*a* to 150*c* illustrated in FIG. 13 are provided by way of example only, and various other configurations can be envisioned in other embodiments.

It will be understood that providing a lower waveguiding structure 122 with a plurality of co-extensive high-index elements 150*a* to 150*c* can enlarge the horizontal extent of the propagating mode compared to a case where only a single waveguide element is provided. Also, in order to provide a smooth transition of light between the first waveguide 102 and the central element 150*b* of the lower waveguiding structure 122, the optical coupling between central element 150*b* and each of the outer elements 150*a*, 150*c* may be reduced near the first waveguide 102. For this purpose, the outer elements 150*a*, 150*c* in FIG. 13 are formed to gradually diverge away from the central element 150*b* near the first end 126*a* of the lower waveguiding structure 122.

Figure 12B:
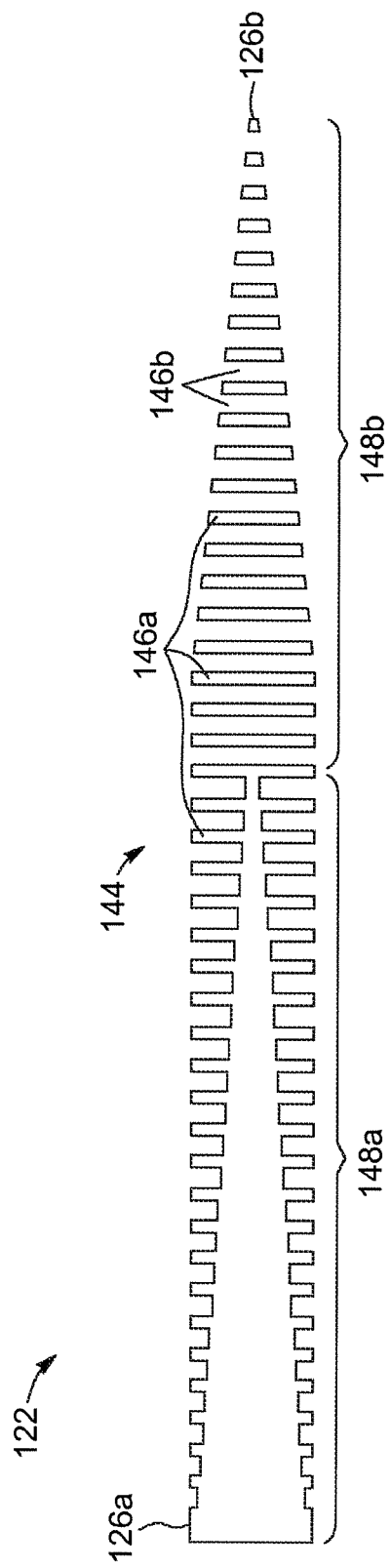

It is to be noted that a lower waveguiding structure made of multiple elongated waveguide elements such as illustrated in FIG. 13 generally behave quite differently from longitudinal subwavelength gratings such as illustrated FIGS. 12A and 12B. In longitudinal subwavelength gratings, the light must fully pass through each section and the mode propagating through the structure has an effective index roughly determined by the duty cycle of the grating. Of course, the period of the grating should be small enough to avoid the behavior of a Bragg grating. However, in a structure composed of elongated waveguide elements, the light travels mainly in the surrounding medium and the effective index is significantly lower. Furthermore, while the elongated waveguide members are generally close enough to allow a sufficient coupling therebetween and to behave as a single guiding structure, their spacing need not fulfill a subwavelength condition.

Figure 9:
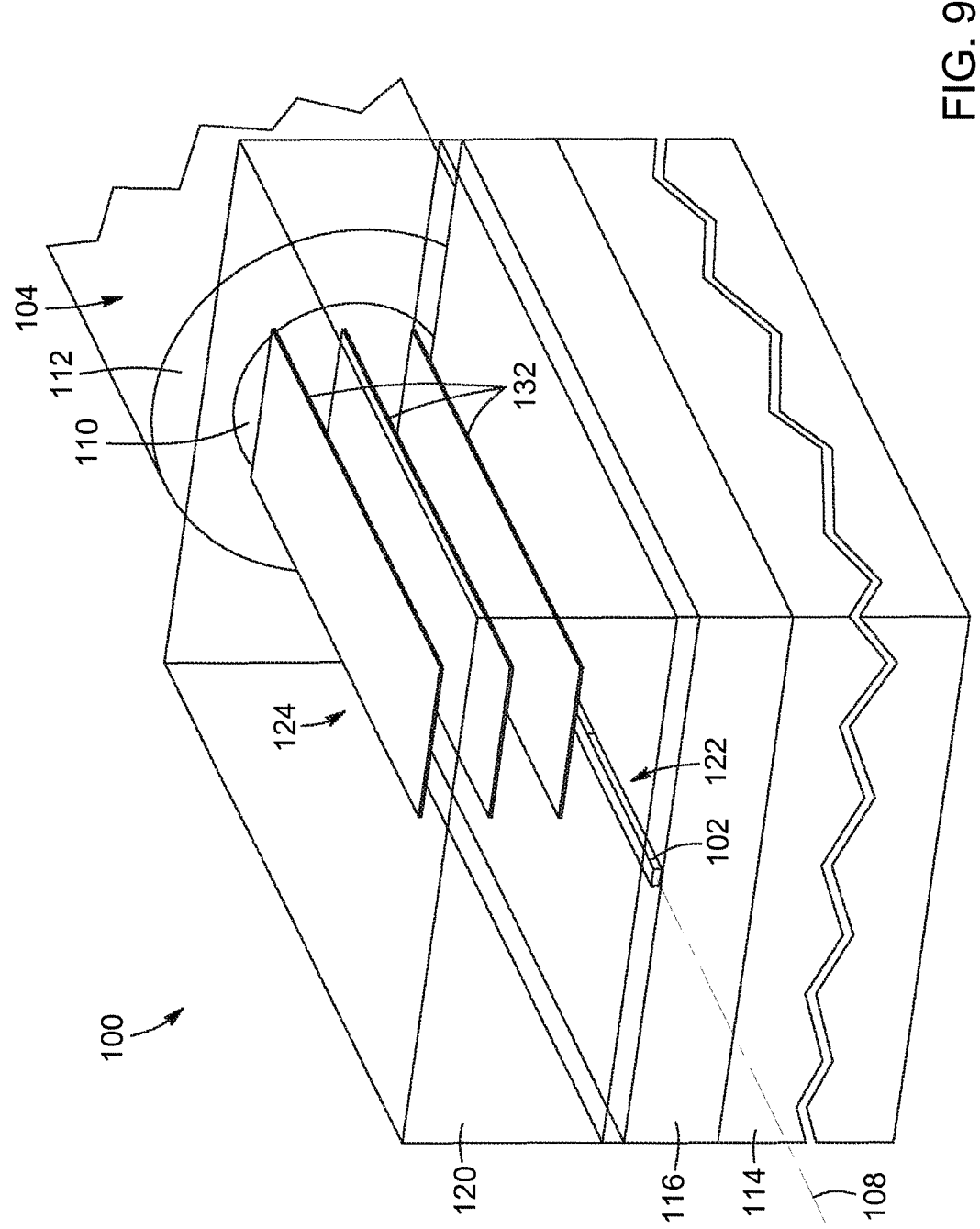
FIG. 9 is a schematic perspective view of a spot-size converter for coupling light between two dissimilar waveguides, in accordance with another embodiment, wherein the plurality of high-index elements consists of a stack of vertically spaced high-index sheets.

Turning now to FIG. 9, in another embodiment of the spot-size converter 100, the plurality of high-index elements 132 of the upper waveguiding structure 124 can consist of a stack of vertically spaced high-index sheets. As for the multi-rod array describe above in reference to FIGS. 3 to 6, the multi-sheet upper waveguiding structure 124 of FIG. 9 can form an overall single-mode waveguiding structure capable of carrying a single mode whose size and effective refractive index can match those of an optical fiber. It will be understood that the effective refractive index of the upper waveguiding structure 124 can be tailored by adjusting one or more of the number, width, thickness, longitudinal and cross-sectional profiles, vertical separation and material composition of the high-index sheets.

For example, referring to FIG. 14A, there is illustrated an end view of an upper waveguiding structure provided as a stack of four vertically spaced high-index sheets made of a material having a refractive index of 1.58, such as SU-8 polymer and embedded in a low-index surrounding medium (e.g., silica). The upper waveguiding structure in FIG. 14A supports a single TE mode and a single TM mode, respectively shown in FIGS. 14B and 14C. The overlap with the fundamental mode of a SMF-28™. single-mode optical fiber (Coming Incorporated), which is shown in FIG. 2, is larger than 99% at 1550 nm. It is to be noted that the upper waveguiding structure depicted in FIG. 14A can be quite robust to variations in sheet thicknesses and similarity. For example, variations as high as 25% have been found to have only a minor impact on the mode profile.

Figure 15A:
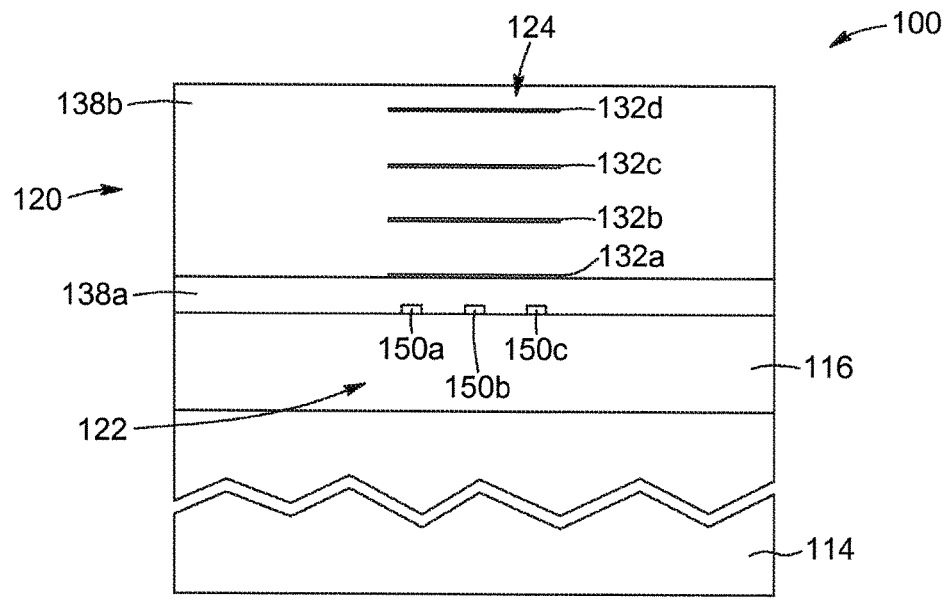
FIGS. 15A, 15B and 15C are respectively schematic front, top and side views of a spot-size converter for coupling light between two dissimilar waveguides, in accordance with another embodiment. The lower and upper waveguiding structures of the spot-size converter are vertically evanescently coupled to each other and respectively consist of three coplanar waveguide elements and a stack of four vertically spaced high-index sheets, both in a low-index surrounding medium.
Figure 15B:
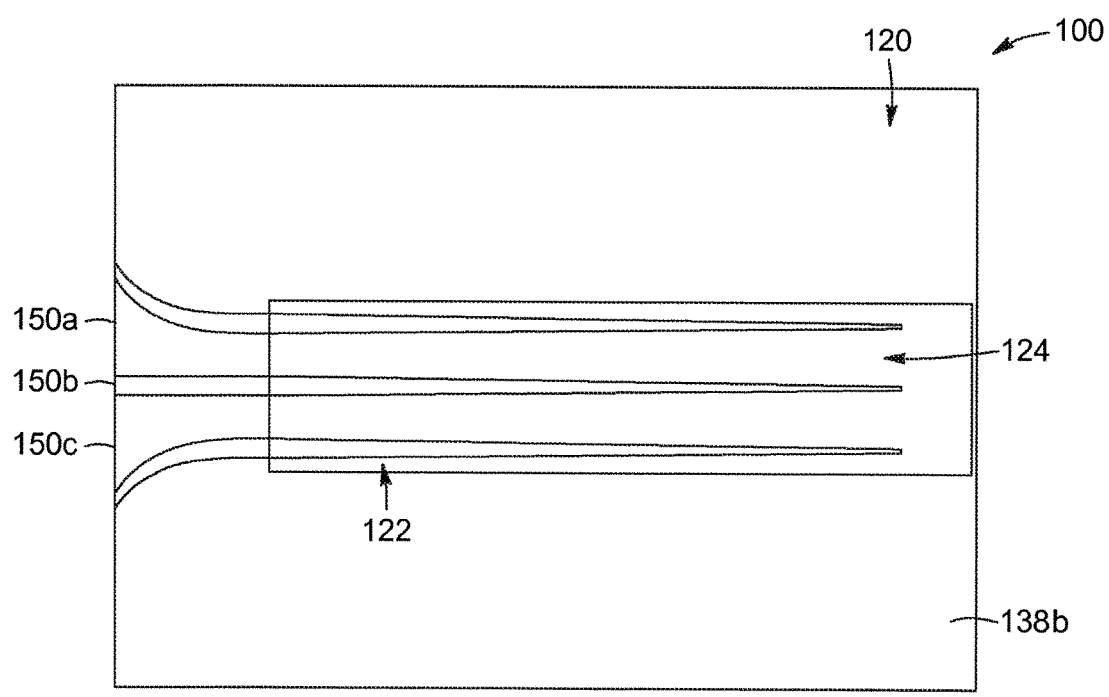
Figure 15C:
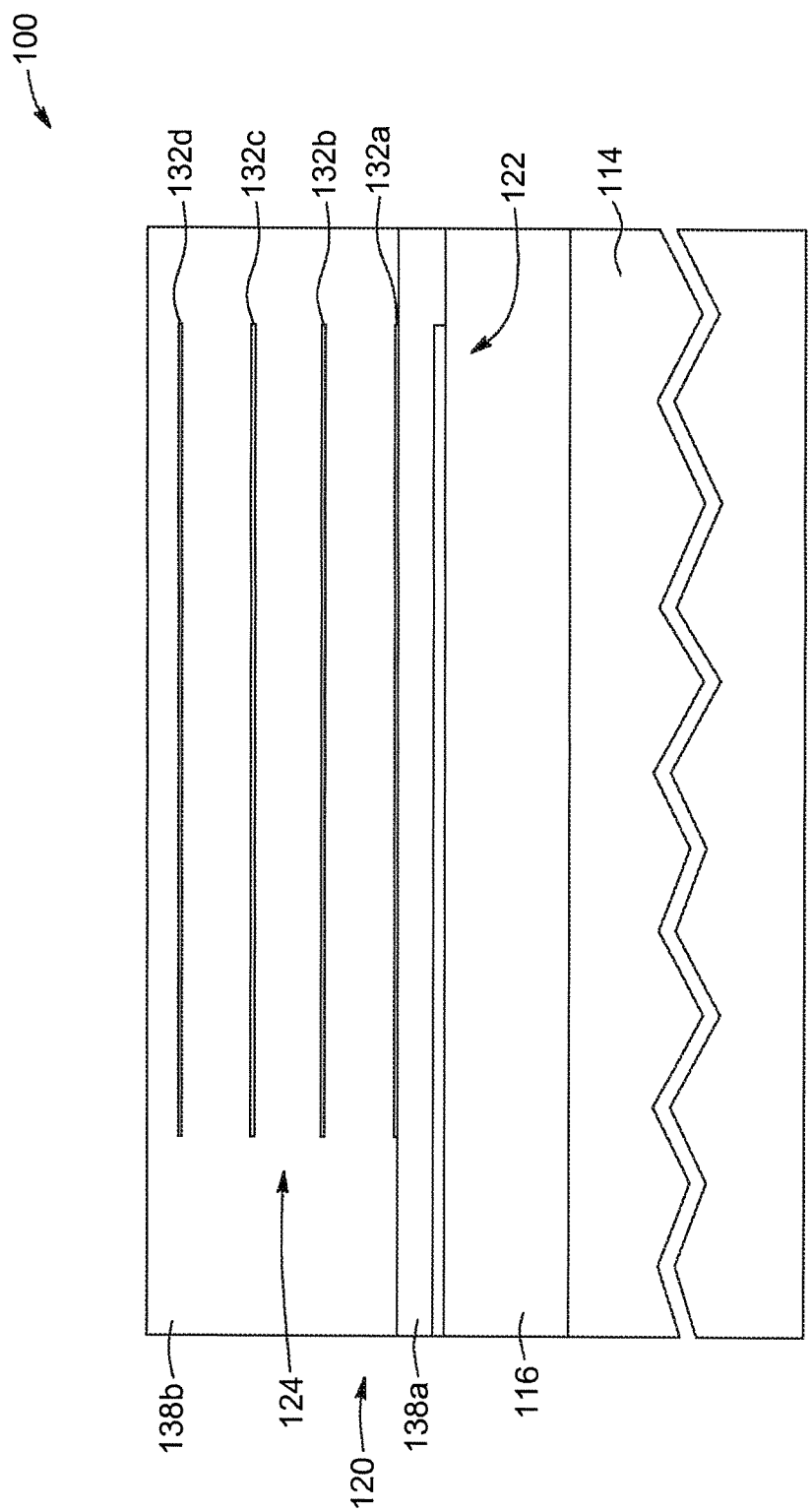

Turning now to FIGS. 15A to 15C, in accordance with another variant, the lower and upper waveguiding structures 122, 124 of the spot-size converter 100 are evanescently coupled to each other in the vertical direction and respectively consist of three coplanar tapered silicon waveguide elements 150*a* to 150*c* and a stack of four vertically spaced high-index sheets 132*a* to 132*d*. The lower and upper waveguiding structures 122, 124 are provided in a respective low-index surrounding cladding 138*a*, 138*b*. Hence, in the illustrated embodiment, the medium surrounding the lower and upper waveguiding structures 122, 124 is made of at least three different layers, namely an insulating layer 116, a first cladding 138*a* and a second cladding 138*b* (the second cladding 138*b* may itself be made of more than one sublayers). As mentioned above with reference to FIG. 8A, these three layers are typically made of pure silica, but their refraction indices may differ due to the use of different deposition techniques.

The multi-sheet upper waveguiding structure 124 can have a uniform cross-section profile and be provided with an effective index that is slightly higher than that of the surrounding cladding 138*b*. When the medium 138*b* surrounding the multi-sheet upper waveguiding structure 124 is made of the same material as the medium 138*a* surrounding the tapered waveguide elements 150*a* to 150*c* (e.g., silica), there will be a point along the waveguiding axis of the spot-size converter where the effective indices of the individual modes will cross, since the effective index of the lower waveguiding structure will vary from a high value (e.g., larger than 2 for the TE mode or larger than 1.7 for the TM mode) down to the value close to that of the surrounding cladding 138a.

It will be understood that the lower waveguiding structure provided below the multi-sheet upper waveguiding structure can be composed of many lateral high-index elements or of a single waveguide element as long as the interaction between the lower and upper waveguiding structures is sufficiently strong. It will also be understood that compared to the multi-sheet approach of FIGS. 15A to 15C, the multi-rod approach of FIGS. 3 to 6 can allow for the density of high-index material in the upper waveguiding structure to be further reduced. As a result, the effective refractive index of the upper waveguide structure can be made closer to that of the surrounding medium, thereby improving the overall light distribution within the upper waveguiding structure.

The embodiment of 15A to 15C provides an example of an efficient adiabatic evanescent transfer of the TE mode between a multi-sheet upper waveguiding structure and a longitudinally tapered silicon-based lower waveguiding structure. In implementation requiring that such a transfer be efficient for both the TE and TM modes, it can be desirable that the TE and TM modes have similar effective refractive indices. The multi-sheet upper waveguiding structure discussed above is uniform and weakly guiding. Accordingly, the effective indices of both TE and TM modes are generally similar and only slightly higher than the index of refraction of the medium surrounding the sheets.

Figure 17A:
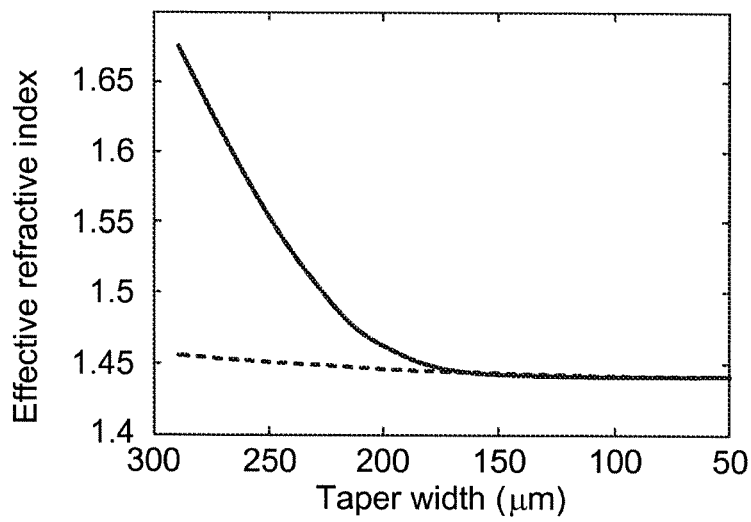
FIGS. 17A to 17C depict the TE and TM effective refractive indices (TE mode: solid curve; TM mode: dashed curve) of tapers tapering down from 300 nm to 50 nm in width and having different uniform thicknesses (FIG. 17A: 150 nm.
Figure 17B:
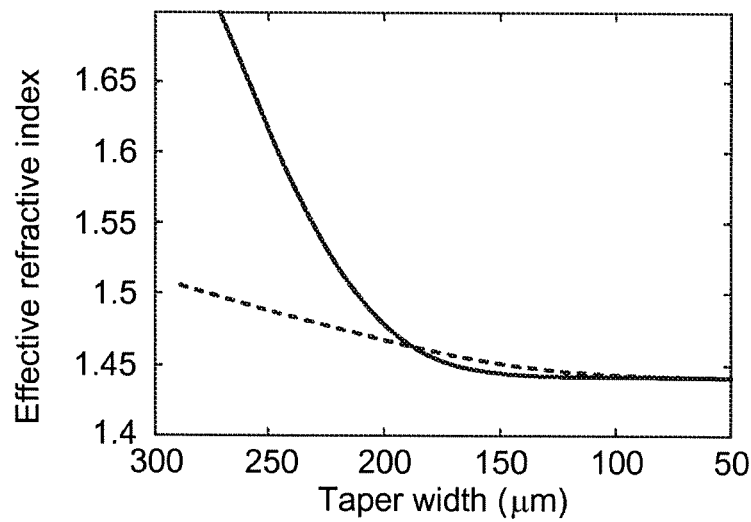
Figure 17C:
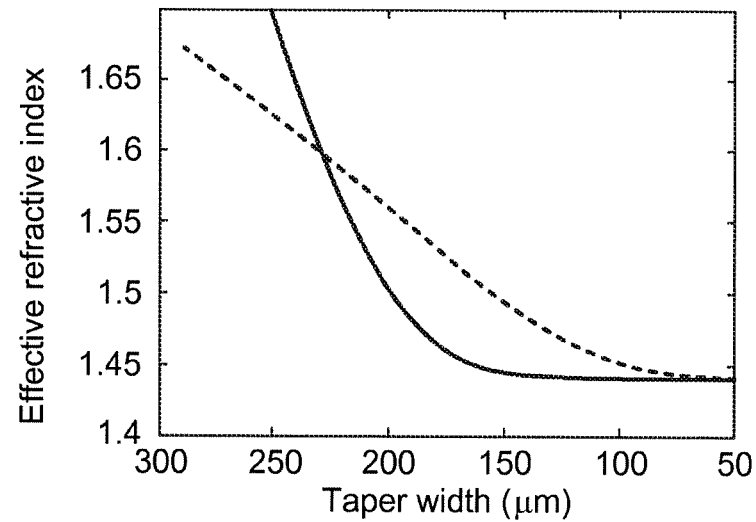

In contrast, a tapered silicon-based lower waveguiding structure such as shown in FIGS. 3 to 6 and 15A to 15C is generally characterized by spatially-dependent effective refractive indices that can be quite different for the TE and TM modes. For example, FIGS. 17A to 17C depict the TE and TM effective refractive indices around 1550 nm (TE mode: solid curve; TM mode: dashed curve) of tapers tapering from 300 nm to 50 nm in width and having different uniform thicknesses (FIG. 17A: 150 nm; FIG. 17B: 180 nm; and FIG. 17A: 220 nm). It is seen that both the TE and TM modes may have index crossing similar to what is depicted in FIGS. 7 and 7A, but that the transfer efficiency would be different. In some embodiments, it may be advantageous to have a better similarity between the TE and TM modes (e.g., in terms of their value or their slope as a function of the taper width).

Figure 18A:
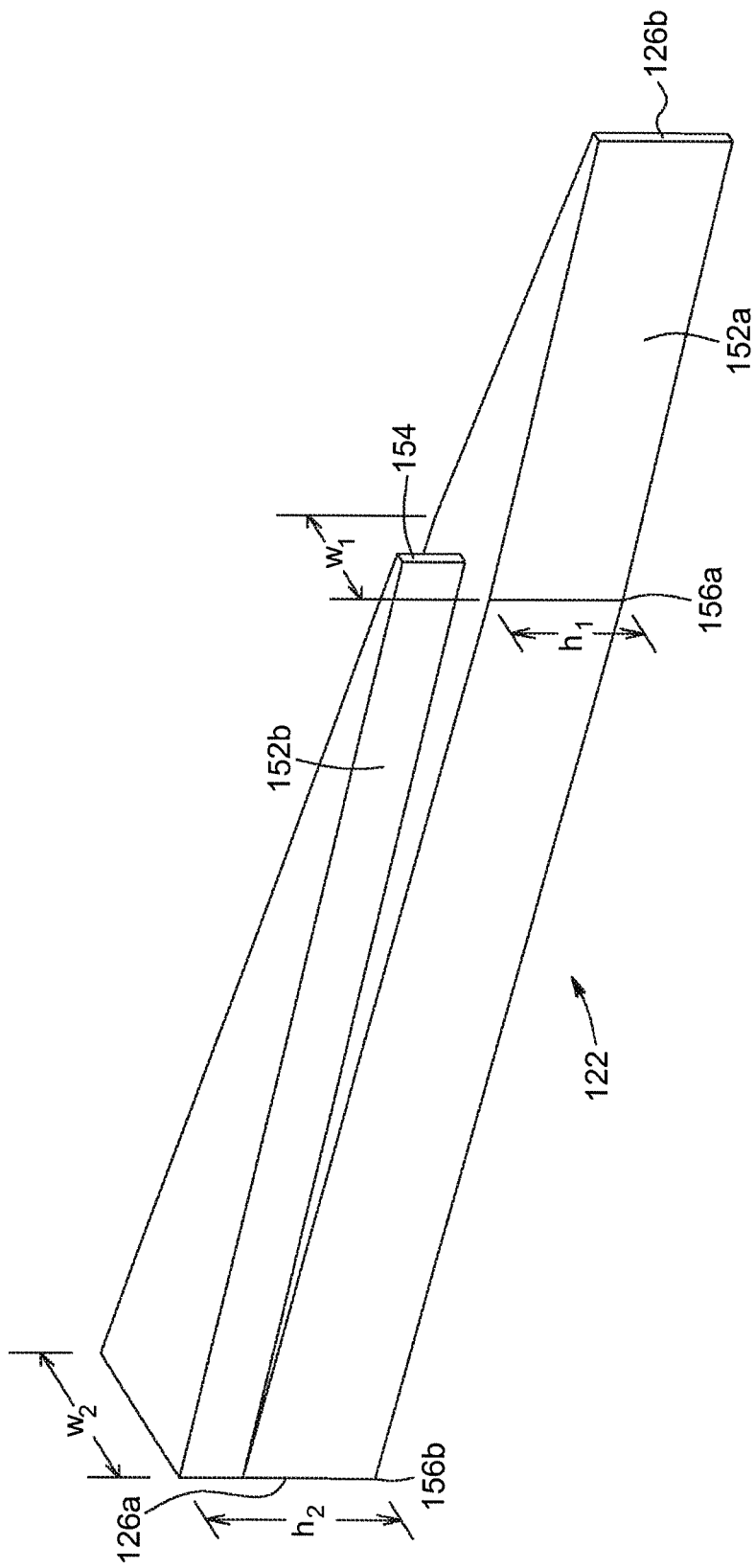
FIG. 18A is a schematic perspective view of a lower waveguiding structure of a spot-size converter for coupling light between two dissimilar waveguides, in accordance with another embodiment, wherein the lower waveguiding structure is configured as a two-level taper including a 50-.mu.m-long single-thickness portion and a 100-.mu.m-long double-thickness portion.

Referring to FIG. 18A, there is shown another possible configuration for the lower waveguiding structure 122 of the spot-size converter. In this configuration, the lower waveguiding structure 122 is provided as a single two-level taper, which includes a bottom layer 152a and a top layer 152b superposed on and coextensive with the bottom layer 152a. The bottom layer 152a extends along the waveguiding axis 108 from the first to the second end 126a, 126b of the lower waveguiding structure 122, while the top layer extends from the first end 126a to an end tip 154 located between the first and second ends 126a, 126b. The lower waveguiding structure 122 has a first height $h_1$ corresponding to the bottom layer 152a and a second height $h_2$ corresponding to a superposition of the bottom and top layers 152a, 152b.

It will be understood that if the geometrical dimensions of the top and bottom layers 152a, 152b are properly designed, the cross-section of the lower waveguiding structure 122 can have a square profile, and thus equal TE and TM effective refractive indices, apart from a slight impact due to other material such as the substrate that can slightly break the structure symmetry, at two positions 156a, 156b along the waveguiding axis 108. To achieve this, a width $w_1$ of the lower waveguiding structure 122 at the end tip 154 of the top layer 152b should be equal to the first height $h_1$ (position 156a), while a width $w_2$ of the lower waveguiding structure 122 at the first end 126a thereof should be equal to the second height $h_2$ (position 156b).

Figure 19:
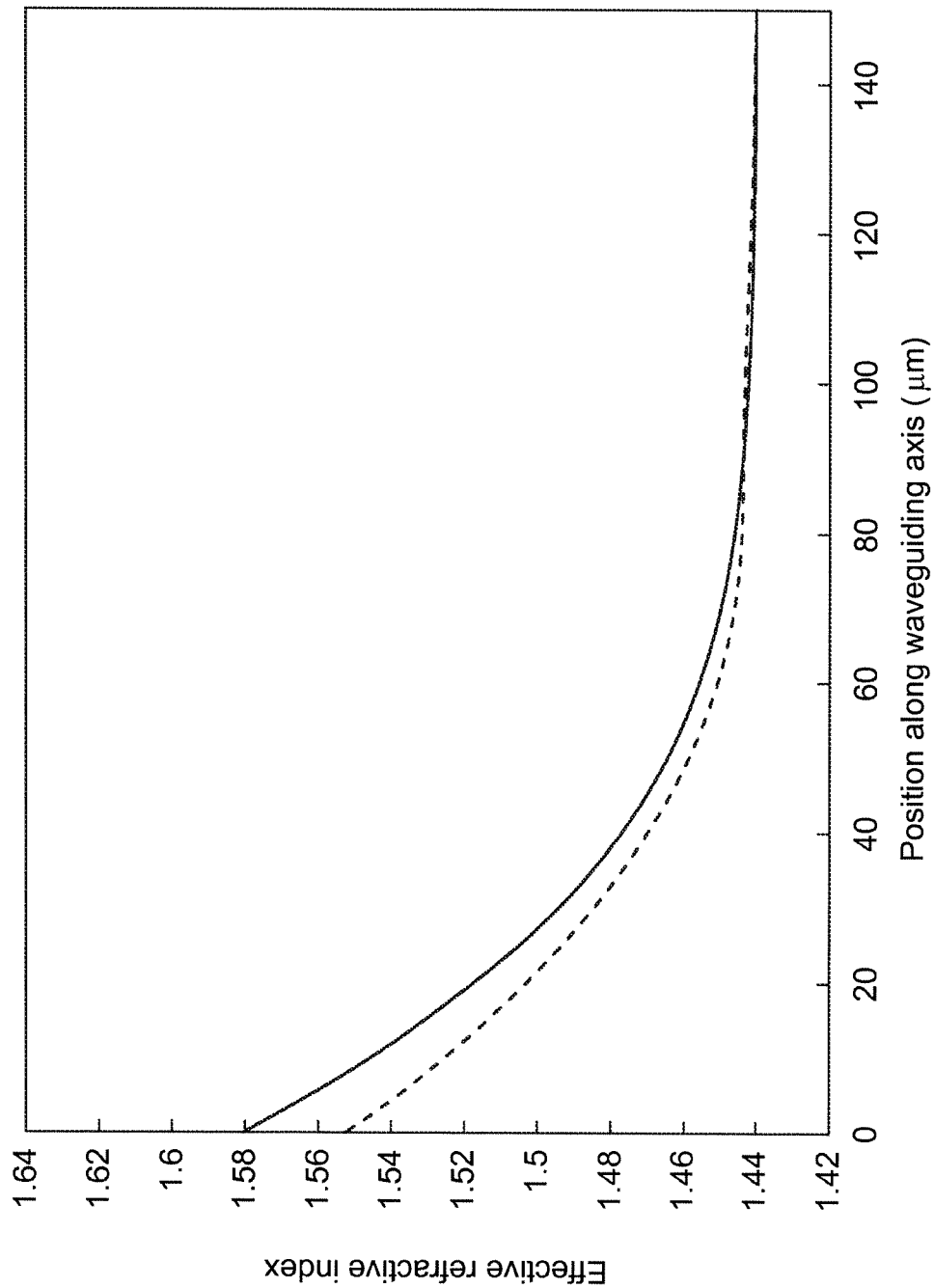
FIG. 19 depicts the TE and TM effective refractive indices (TE mode: solid curve; TM mode: dashed curve) of the lower waveguiding structure of FIG. 18A plotted as a function of its length.

Referring to FIG. 19, it can be seen that the TE and TM effective refractive indices of the lower waveguiding structure of FIG. 18A exhibit a higher degree of similarity along the waveguiding axis (TE mode: solid curve; TM mode: dashed curve). For example, at position 156a, the lower waveguiding structure 122 of FIG. 18A may have a 150 nm.times.150 nm square cross-section and a low effective refractive index (i.e., close to that of the surrounding medium) and substantially equal for the TE and TM modes. Likewise, at position 156b, the lower waveguiding structure 122 of FIG. 18A may have a 220 nm.times.220 nm square cross-section and a high effective refractive index (i.e., about 1.56 according to FIG. 19), again substantially equal for the TE and TM modes. It is to be noted that an intermediate waveguiding element may be provided between the first end 126a of the two-level taper and the first waveguide if the dimensions of the first waveguide differ from those at the first end of the two-lever taper. It will be appreciated by one skilled in the art that engineering the lower waveguiding structure such as in FIG. 19 may reduce polarization-dependent losses (PDL) in some embodiments of the spot-size converter.

Figure 18B:
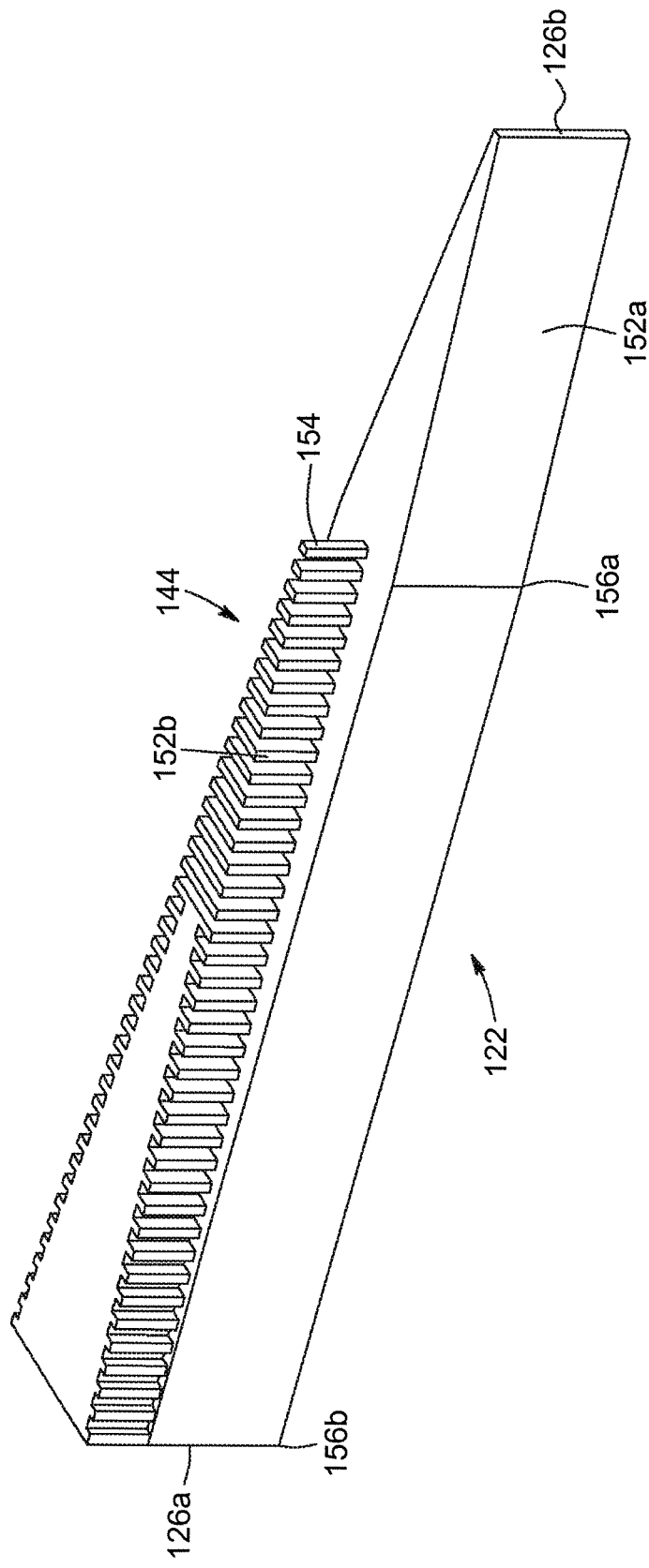
FIGS. 18B and 18C are variants of the two-level taper of FIG. 18A wherein the top layer (FIG. 18B) and both the bottom and top layers (FIGS. 18B and 18C) includes a subwavelength composite portion that defines a subwavelength pattern similar to those depicted in FIGS. 12A and 12B.
Figure 18C:
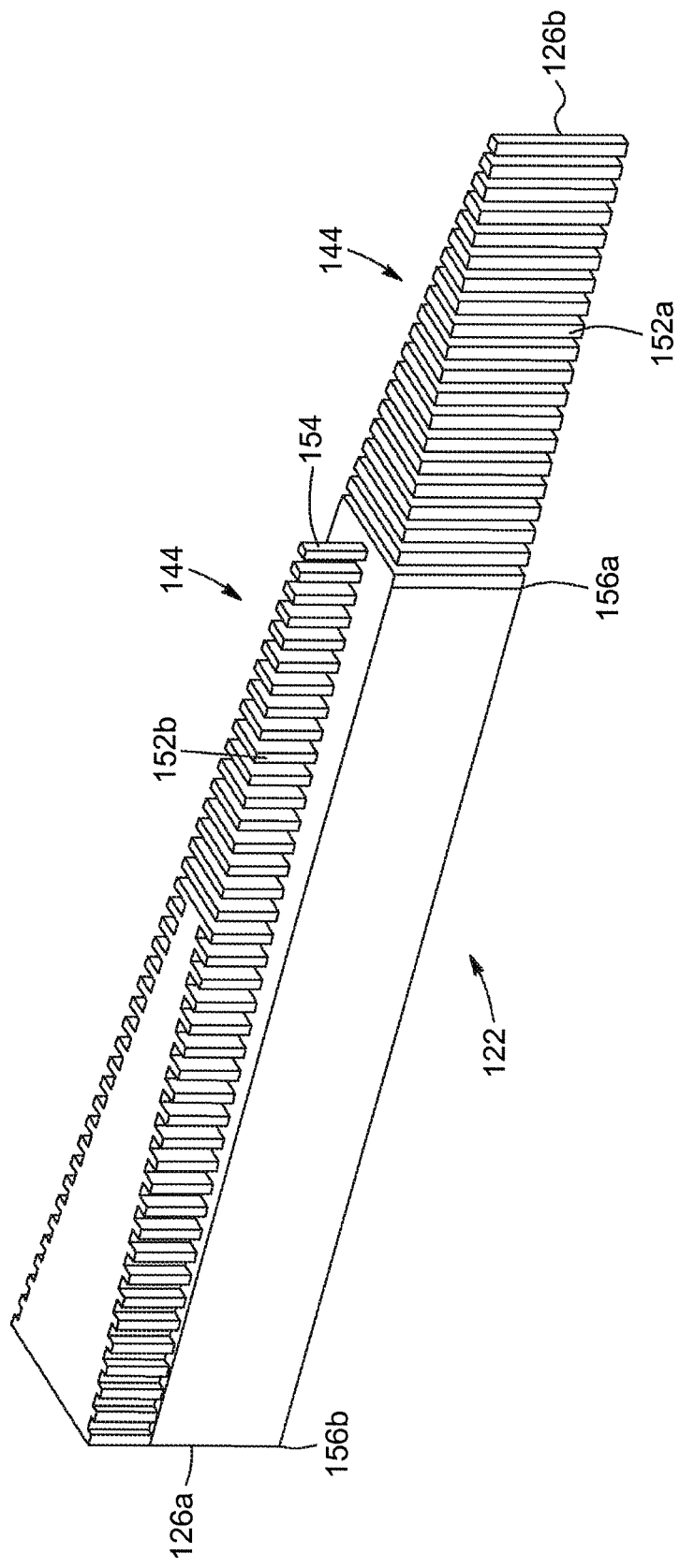

It will be understood that, in other implementations, the lower waveguiding structure may be embodied by a two-level taper that is not configured to have a square cross-section at any point along its length. Likewise, in yet other implementations, the lower waveguiding structure 122 may be embodied by a two-level taper in which either or both of the top and bottom layers 152a, 152b are provided with a subwavelength composite portion 144 that defines a subwavelength pattern, as illustrated in FIGS. 18B and 18C.

It is to be noted that the single-level tapered lower waveguiding structure 122 using subwavelength gratings introduced briefly above and illustrated in FIG. 12B could be used as an alternative to the two-level tapered lower waveguiding structure of FIG. 18A. In FIG. 12B, at the junction between the first and second sections 148a, 148b, the lower waveguiding structure 122 is a 220 nm×220 nm waveguide having a subwavelength grating with a 50% duty cycle. At this point, the effective index is found to be relatively low (i.e., close to the surrounding medium) and equal for TE and TM modes since the waveguide has a square shape. Meanwhile, at the first end 126a, the lower waveguiding structure 122 is again a 220 nm×220 nm waveguide, resulting in a larger effective index. The structure of in FIG. 12B is thus found to act very similarly to the structure shown in FIG. 18A. Again, intermediate waveguiding element may be provided between the first end 126a of the two-level taper and the first waveguide if the dimensions of the first waveguide differ from those at the first end of the two-lever taper.

Figure 20:
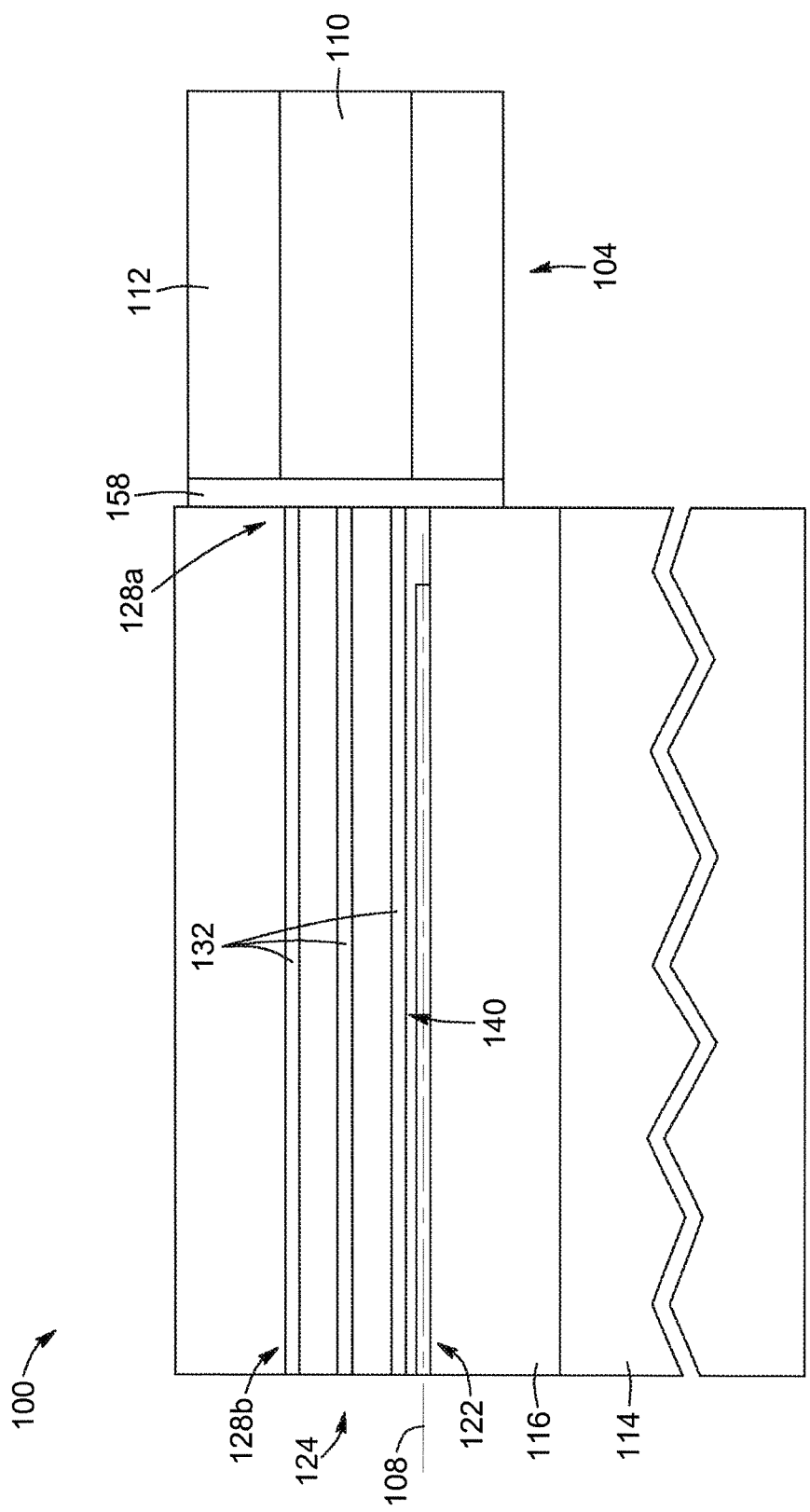
FIG. 20 is a schematic side view of an exemplary butt-coupling approach between a spot-size converter and an optical fiber.

As discussed previously, the upper waveguiding structure of the spot-size converters described herein can be designed to match an optical fiber that would be optically coupled using a thin adhesive layer 158 such as illustrated in FIG. 20 or through free space via a lens or another suitable optical component.

Figure 21:
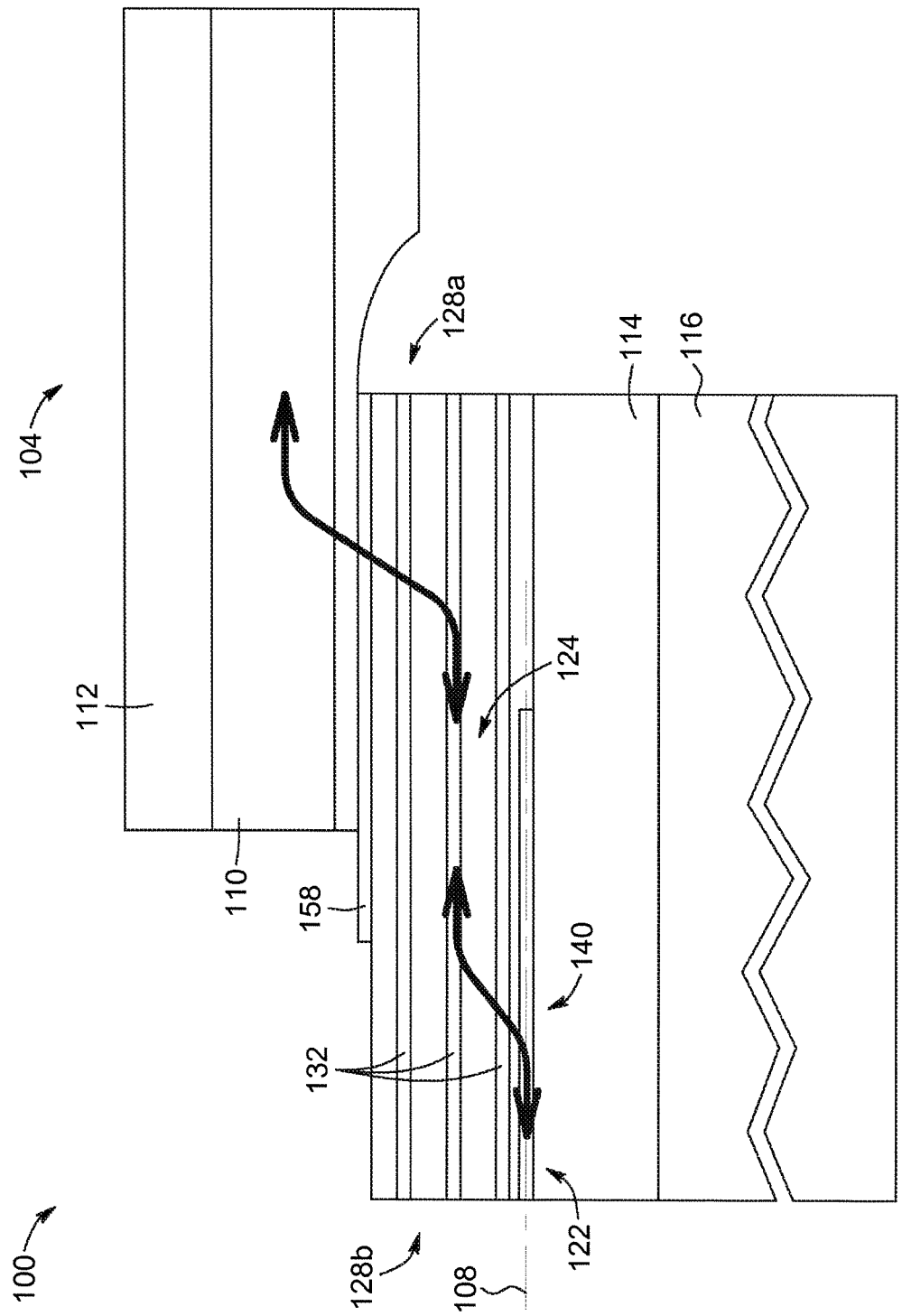
FIG. 21 is a schematic side view of an exemplary evanescent coupling approach between a spot-size converter and a side polished optical fiber.

In other implementations, the upper waveguiding structure of the spot-size converters described herein could alternatively be designed to allow an evanescent coupling from the top as illustrated in FIG. 21. In such implementations, the role of the upper waveguiding structure 124 is to increase the mode size to facilitate the evanescent coupling with a larger second waveguide 104 such as a polished fiber. Having a larger mode size allows a better compatibility with the use of an adhesive layer 158 between the chip in which the spot-size converter is implemented and the polished fiber. Such an adhesive layer could have a thickness in the range of 1 to 3 µm.

Figure 22:
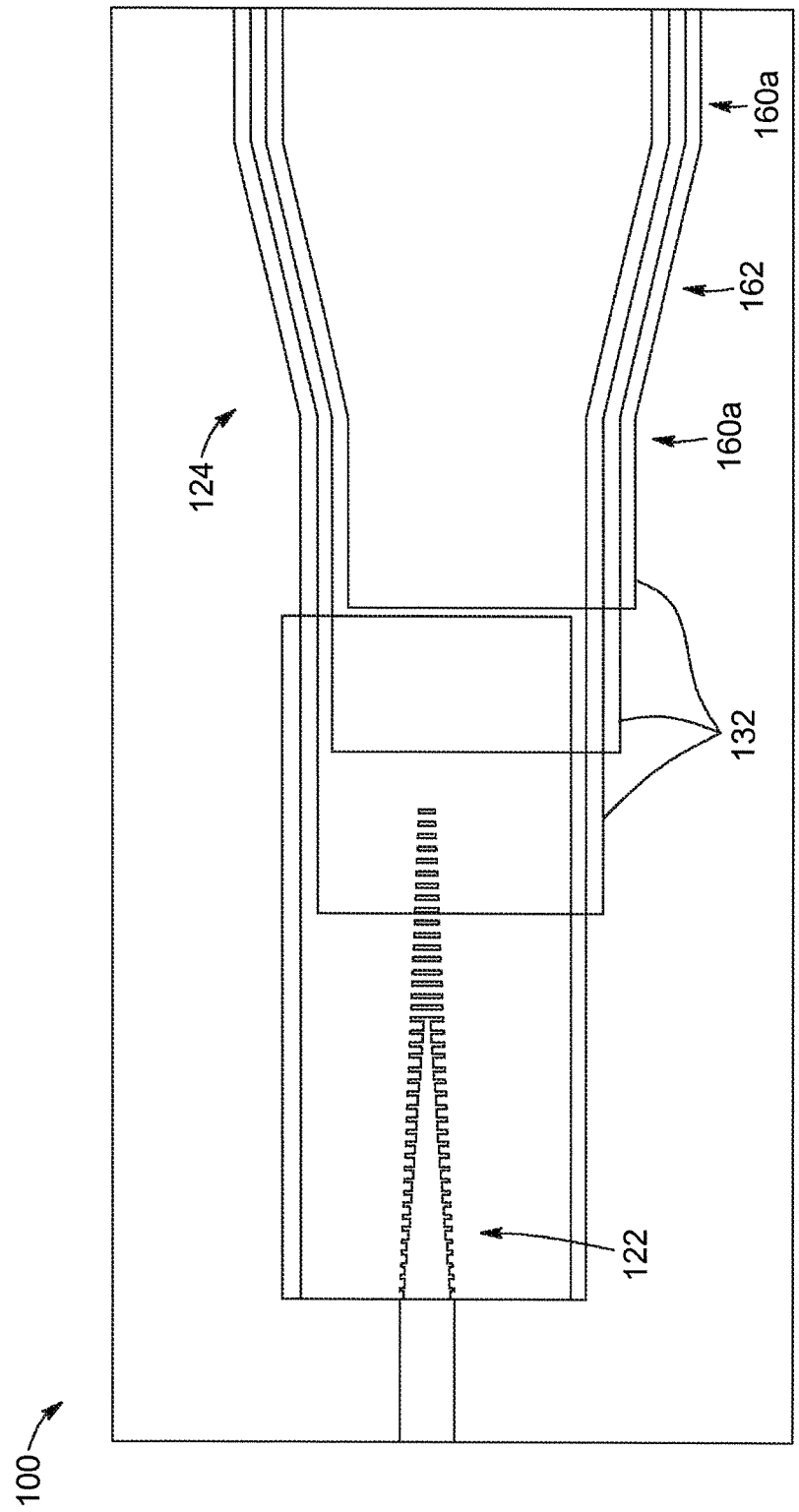
FIG. 22 illustrates an exemplary configuration of an upper waveguiding structure of a spot-size converter for coupling light between two dissimilar waveguides, in accordance with another embodiment, wherein the upper waveguiding structure has a longitudinally varying cross-sectional profile. It is noted that the rows of high-index sheets are slightly shifted laterally from one another to better illustrate the configuration of the upper waveguiding structure.

Referring now to FIG. 22, in some embodiments, the high-index elements 132 (e.g., the stack of vertically spaced high-index sheets) forming the upper waveguiding structure 124 can have a cross-section that varies longitudinally (e.g., in width). Such a design thus varies the effective refractive index of the upper waveguide structure along its length and can provide an effective index crossing point with the mode of the optical fiber. It is noted that, in FIG. 22, the rows of high-index sheets are slightly shifted laterally from one another to better illustrate the configuration of the upper waveguiding structure.

Figure 29A:
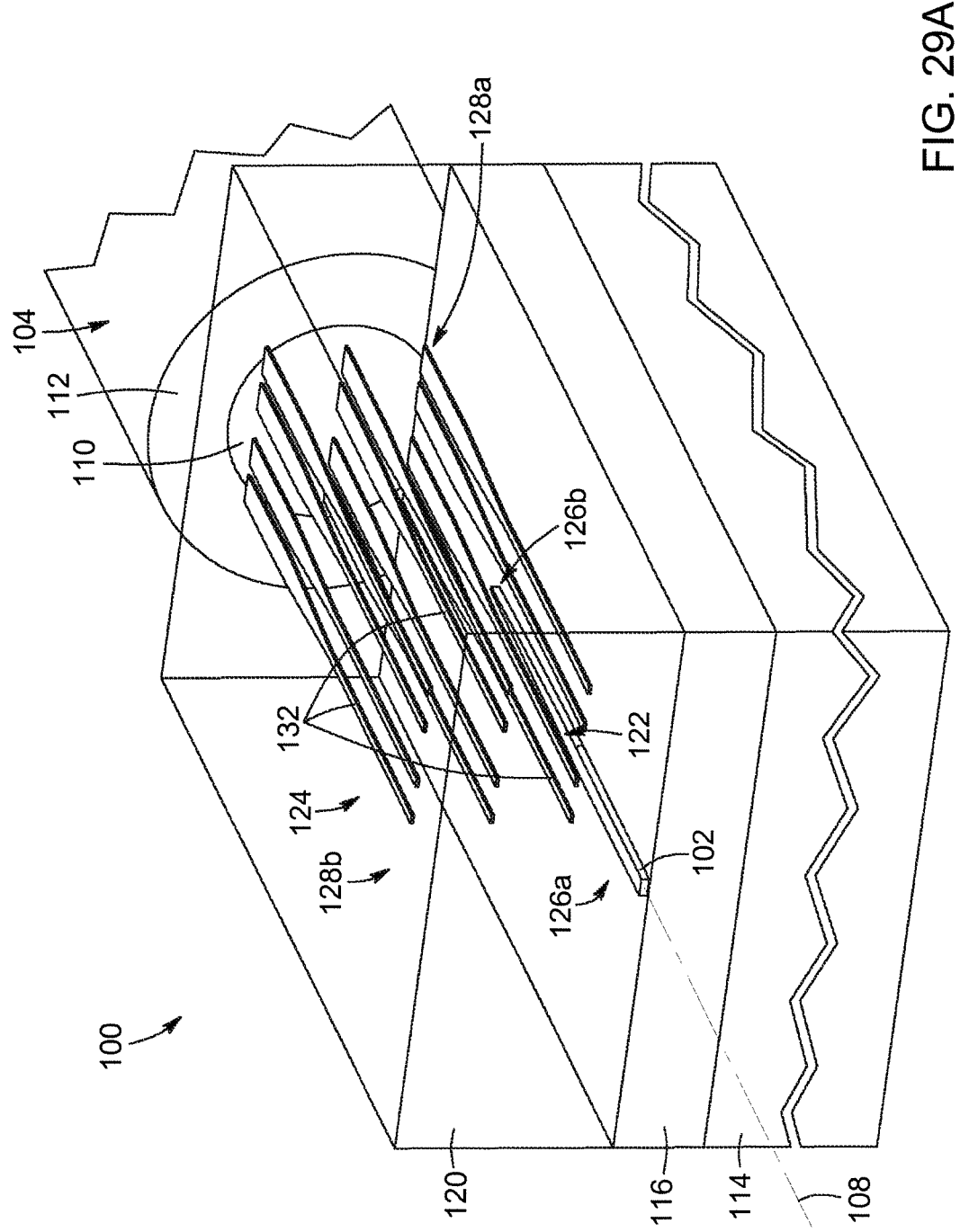
FIGS. 29A and 29B are respectively schematic perspective and top views of a spot-size converter for coupling light between two dissimilar waveguides, in accordance with another embodiment.
Figure 29B:
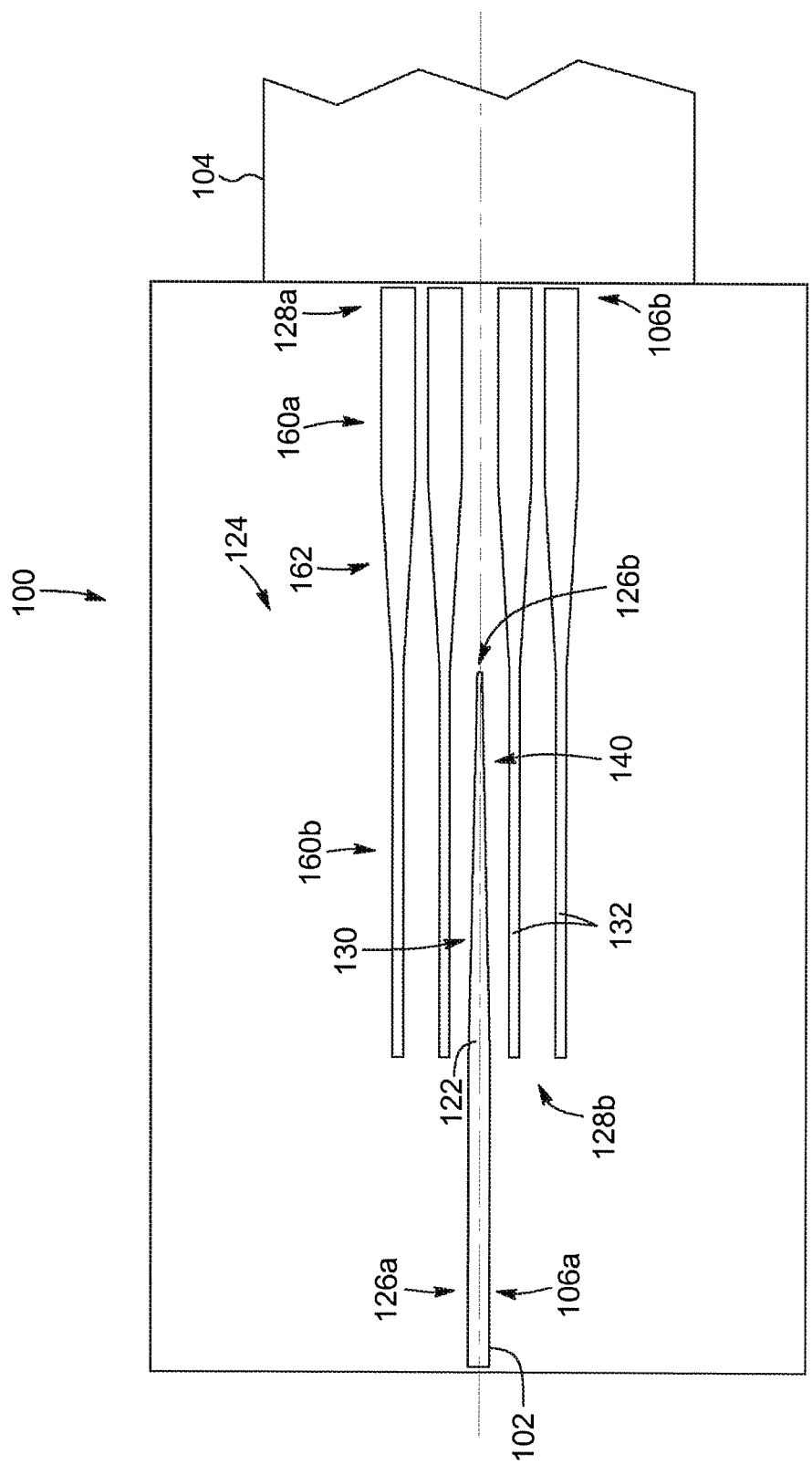

Referring now to FIGS. 29A and 29B, it will be understood that in embodiments where the upper waveguiding structure 24 of the spot-size converter 100 is evanescently coupled at its first end 128a to the second waveguide 104 (e.g., to an optical fiber) and toward its second end 128b to the lower waveguiding structure 122, it can be advantageous that the upper waveguiding structure 124 includes two end portions 160a, 160b of different cross-sectional profiles. The coupling first section 160a would be designed for optimal coupling (e.g., butt coupling) to the second waveguide 104, while the second end portion 160b would be designed for optimal evanescent coupling to the lower waveguiding structure 122. In some of these embodiments, the upper waveguiding structure 124 could further include an intermediate tapered portion 162 extending between and optically linking the first and second end portions 160a, 160b. In some implementations, the intermediate tapered portion 162 may be adiabatically tapered. In FIGS. 29A and 29B, the high-index elements 132 forming the upper waveguiding structure 124 are embodied by a two-dimensional array of "rods" where each "rod" includes two length segments of different cross-sections connected to each other by a tapered segment. It is to be noted that this concept is applied to high-index sheets in FIG. 22.

Figure 23:
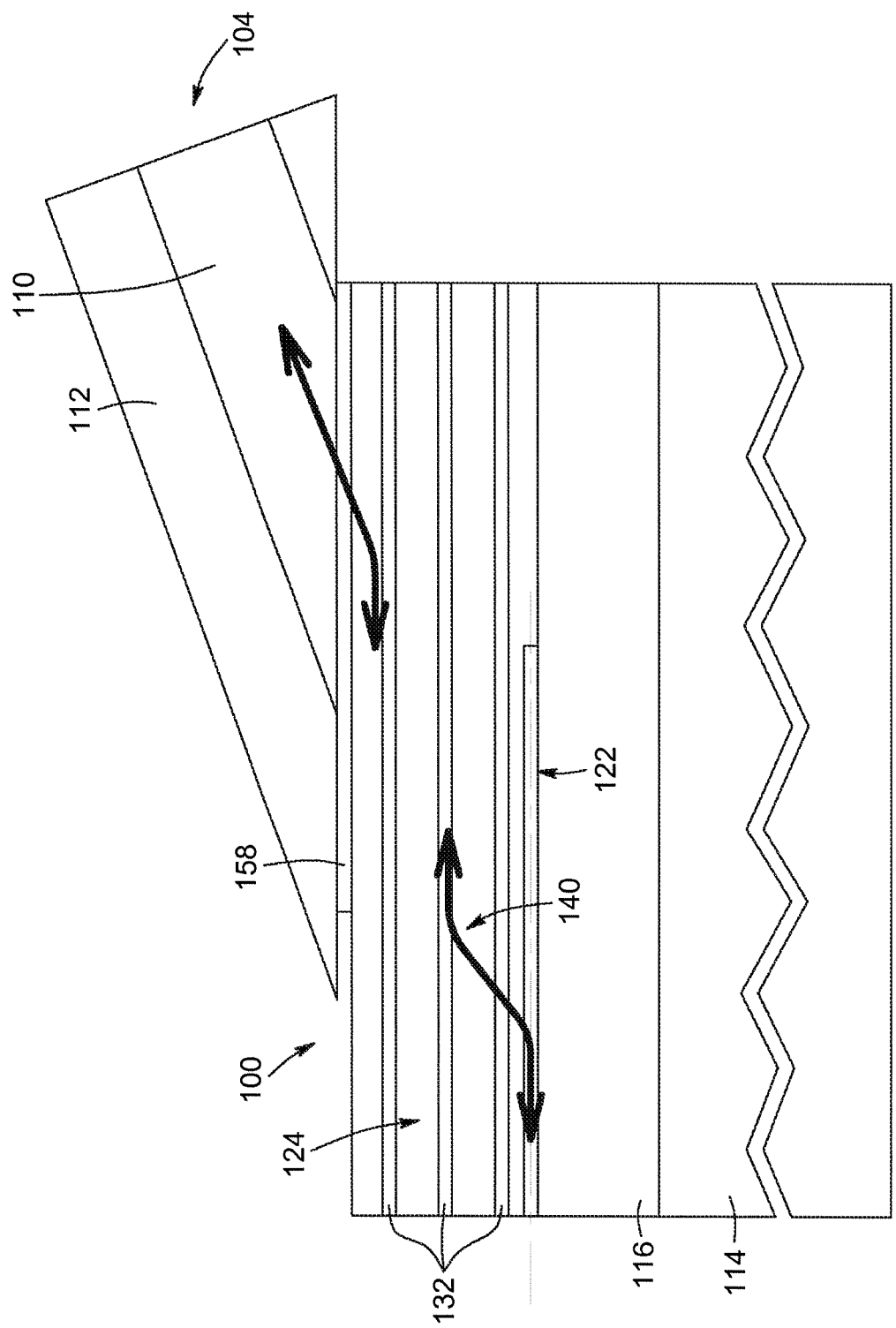
FIG. 23 is a side view of an exemplary evanescent coupling approach between a spot-size converter and an optical fiber polished at a blazing angle.

Referring to FIG. 23, an optical fiber polished at a blazing angle could be used instead of a fiber polished from the side.

The upper waveguiding structure of the spot-size converter can be varied not only longitudinally, but also in terms of the number, widths and relative positioning of the multiple vertically spaced rows (e.g., rows of high-index rods as in FIGS. 3 to 6 or high-index sheets as in FIGS. 15A to 15C). Such variations can be done to provide a mode of further increased size at the chip edge.

Figure 24A:
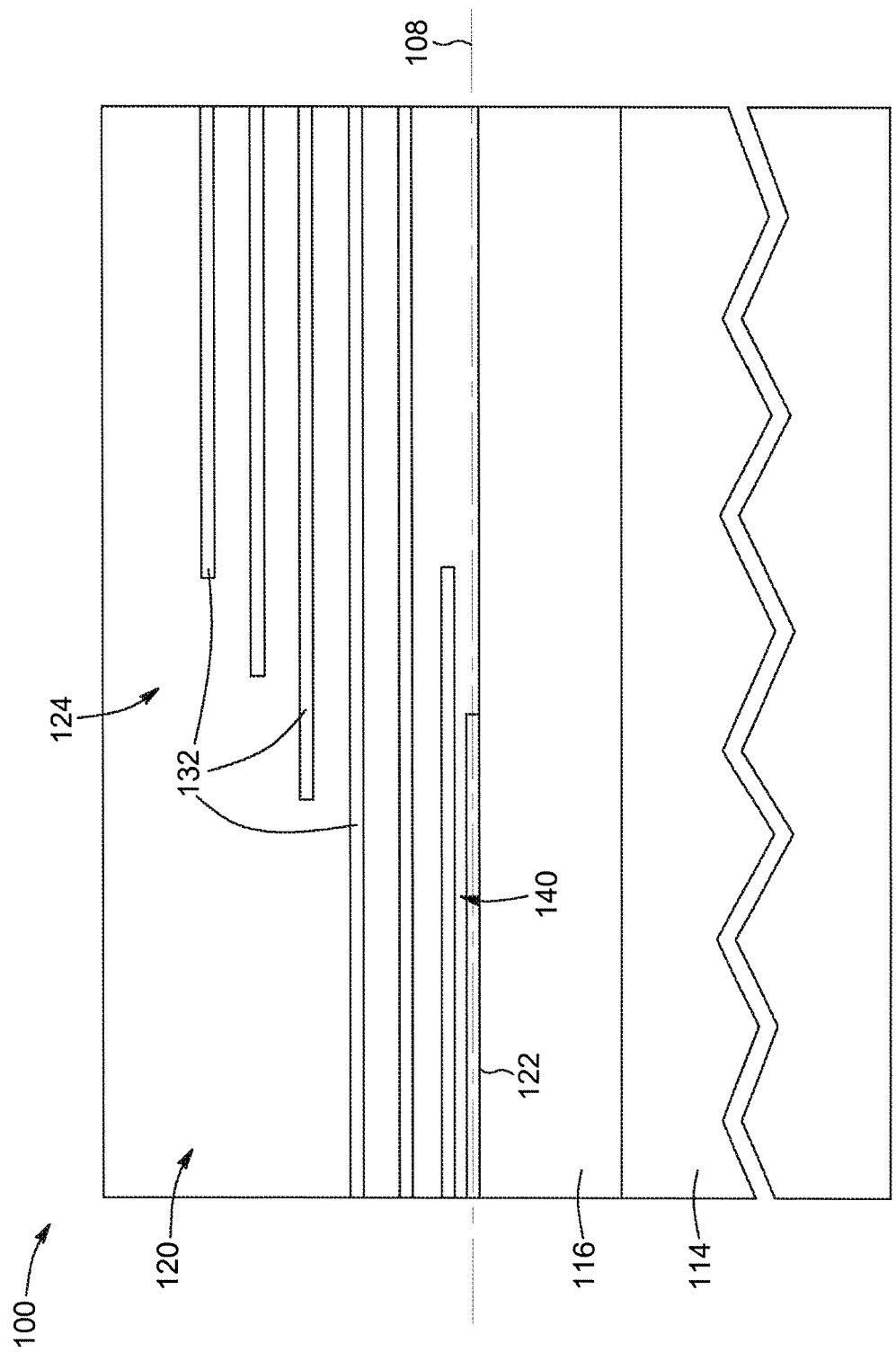
FIGS. 24A and 24B are respectively schematic side and top views of a spot-size converter for coupling light between two dissimilar waveguides, in accordance with another embodiment, wherein the rows of high-index elements of the upper waveguiding structure are staggered along the waveguide axis.
Figure 24B:
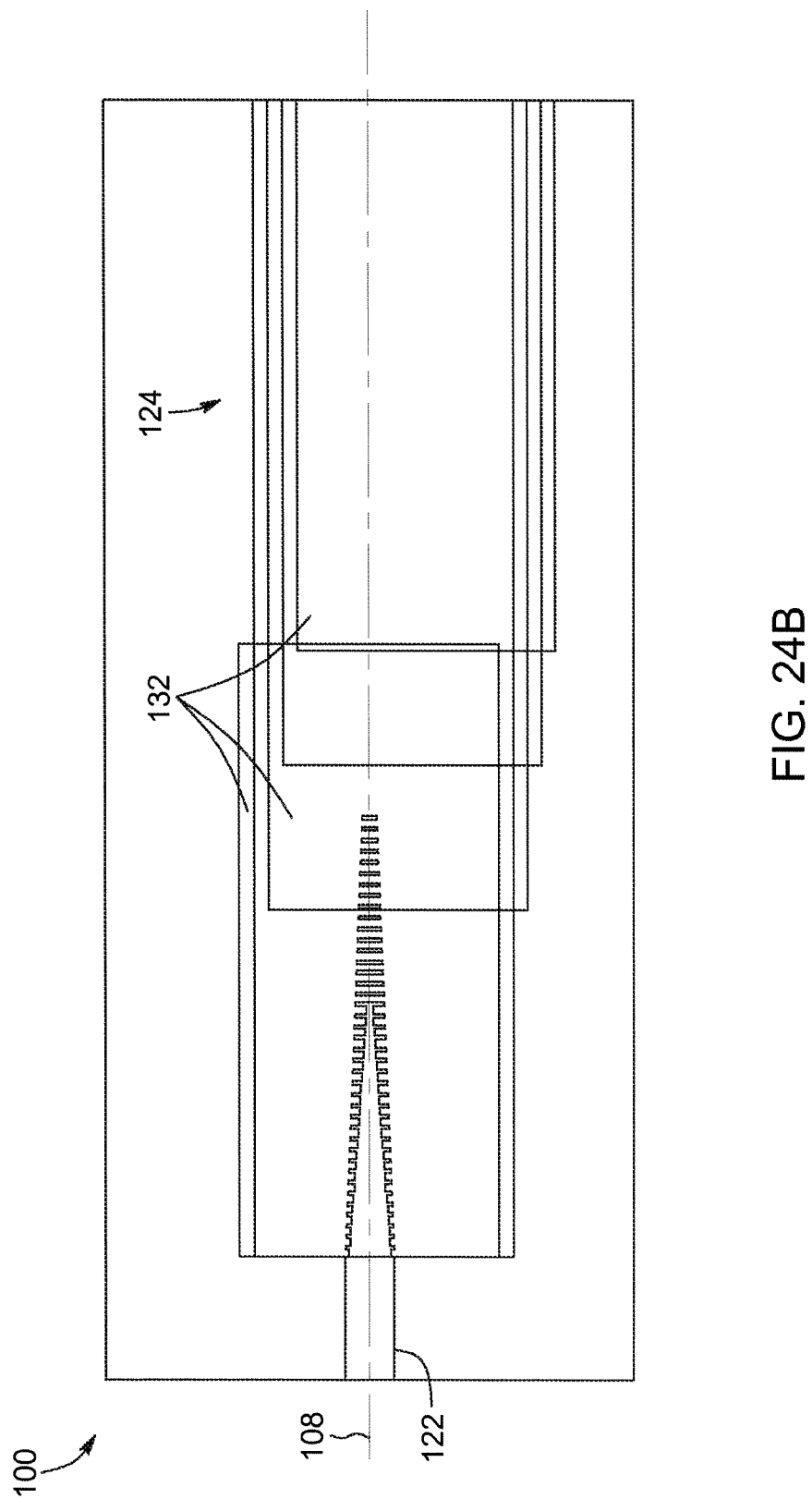

Referring to FIGS. 24A and 24B, there is illustrated an embodiment of the spot-size converter where the rows of high-index elements 132 (e.g., high-index sheets) of the upper waveguiding structure 124 are staggered along the waveguiding axis 108 (in FIG. 24B, the sheets are slightly shifted laterally to better illustrate the configuration of the upper waveguiding structure). The vertical position of the high-index elements 132 can be varied along their length, for example by providing a region of the cladding structure etched down close to the lower waveguiding structure 122 only close to the coupling region 140 where evanescent coupling between the lower and upper waveguiding structures 122, 124 occurs. Such an arrangement could serve to minimize the evanescent coupling to the substrate 114. Etching the top cladding could then be done such that the etching edges are not vertical but are at an angle, as this would provide a smooth curvature of the upper waveguiding structure 124 toward the lower waveguiding structure 122. Furthermore, while in the embodiment of FIGS. 24A and 24B, some of the high-index sheets are stopped abruptly, they could alternatively be provided with a width taper to smooth the transition such as illustrated in FIG. 25. Also, a subwavelength approach such as depicted in FIGS. 12A and 12B could be employed.

Figure 26:
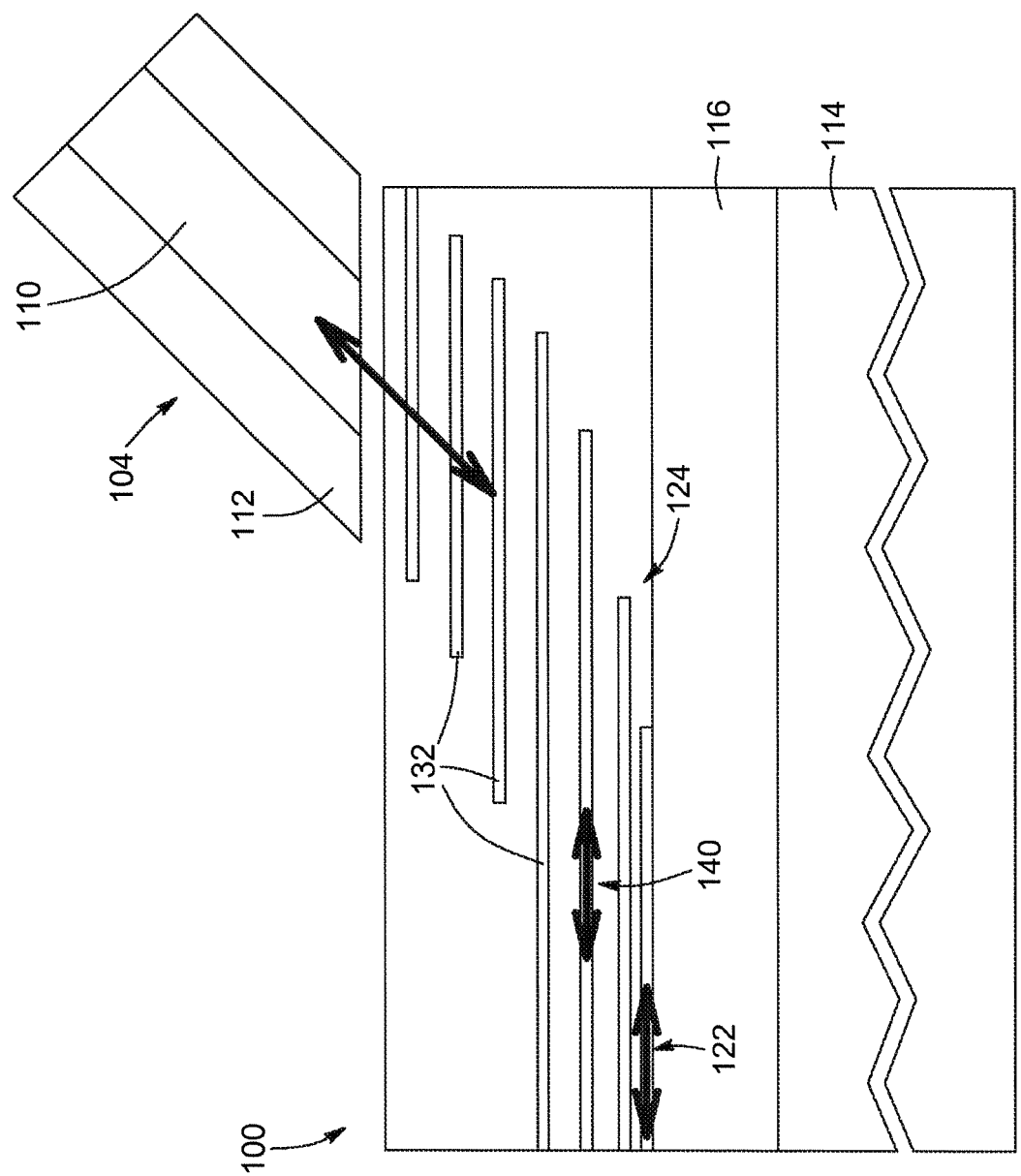
FIG. 26 is a schematic side view of an exemplary configuration of an upper waveguiding structure of a spot-size converter for coupling light between two dissimilar waveguides, in accordance with another embodiment, wherein the rows of high-index elements of the upper waveguiding structure are staggered along the waveguide axis to form a curved overall waveguiding structure in a vertical plane.

It will be understood that the rows of high-index elements of the upper waveguiding structure may be viewed as a distribution of different materials in a certain region. This distribution of different materials can be designed to be equivalent to a uniform homogeneous material from the perspective of its waveguiding property. As a result, the rows of high-index elements could be arranged such that they would form an upper waveguiding structure exhibiting a curvature allowing light to emerge out of the chip. In that case, an optical fiber located in the vicinity of the chip could collect the emerging light. Of course, injecting the light from the fiber to the chip could be performed as well. Such an embodiment is illustrated in FIG. 26.

Figure 27:
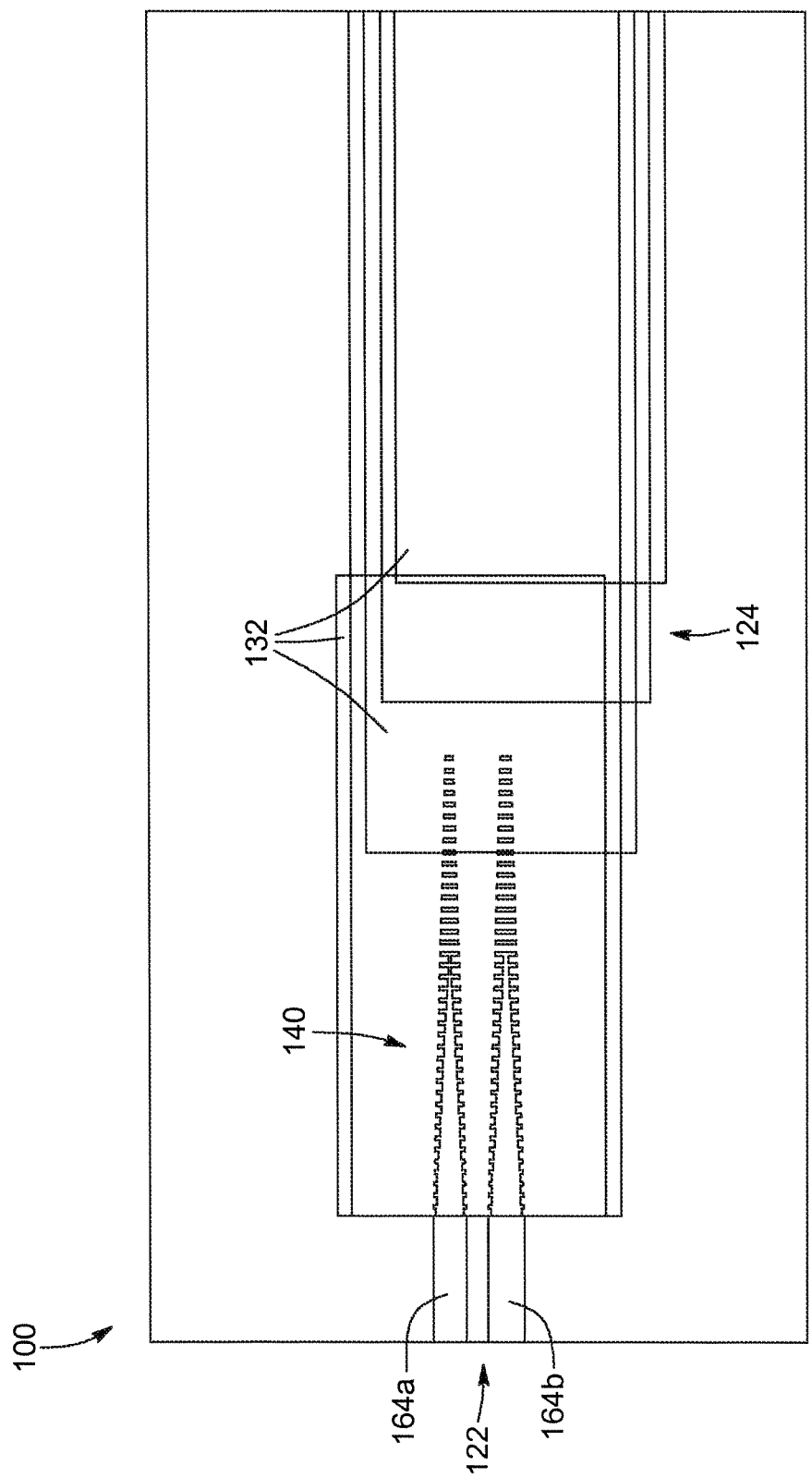
FIG. 27 is a schematic top view of a spot-size converter for coupling light between two dissimilar waveguides, in accordance with an embodiment, wherein the lower waveguiding structure includes two tapered waveguide elements tailored to couple to preferentially the TE and TM modes separately. It is noted that the rows of high-index sheets are slightly shifted laterally from one another to better illustrate the configuration of the upper waveguiding structure.

When the lower waveguiding structure is embodied by a single longitudinally tapered silicon waveguide such as in FIGS. 3 to 6, it can be designed for providing a good transfer predominantly to either the TE mode or the TM mode. Referring to FIG. 27, in some embodiments, the lower waveguiding structure 122 could include two distinct and uncoupled laterally spaced tapered waveguide elements 164a, 164b, having different effective refractive indices (due for example to a difference in height), placed under the rows of the high-index elements 132 forming the upper waveguiding structure 124. The two tapered waveguide elements 164a, 164b would be designed differently so that one waveguide element 164a is configured to preferably carry the TE mode, while the other waveguide element 164b is configured to preferably carry the TM mode. In such a configuration, TE and TM polarized modes injected into the upper waveguiding structure 124 from the second waveguide would be evanescently coupled into the two laterally spaced tapered waveguide elements 164a, 164b according to their respective polarization. In particular, it is to be noted that in this configuration, each of the TE and TM modes will be predominantly transferred into its corresponding tapered waveguide element even if they could have been transferred to the tapered waveguide element corresponding to the other polarization. In other words, each of the TE and TM modes is coupled to its corresponding tapered waveguide element before the other tapered waveguide element could have the possibility of doing so.

Figure 30:
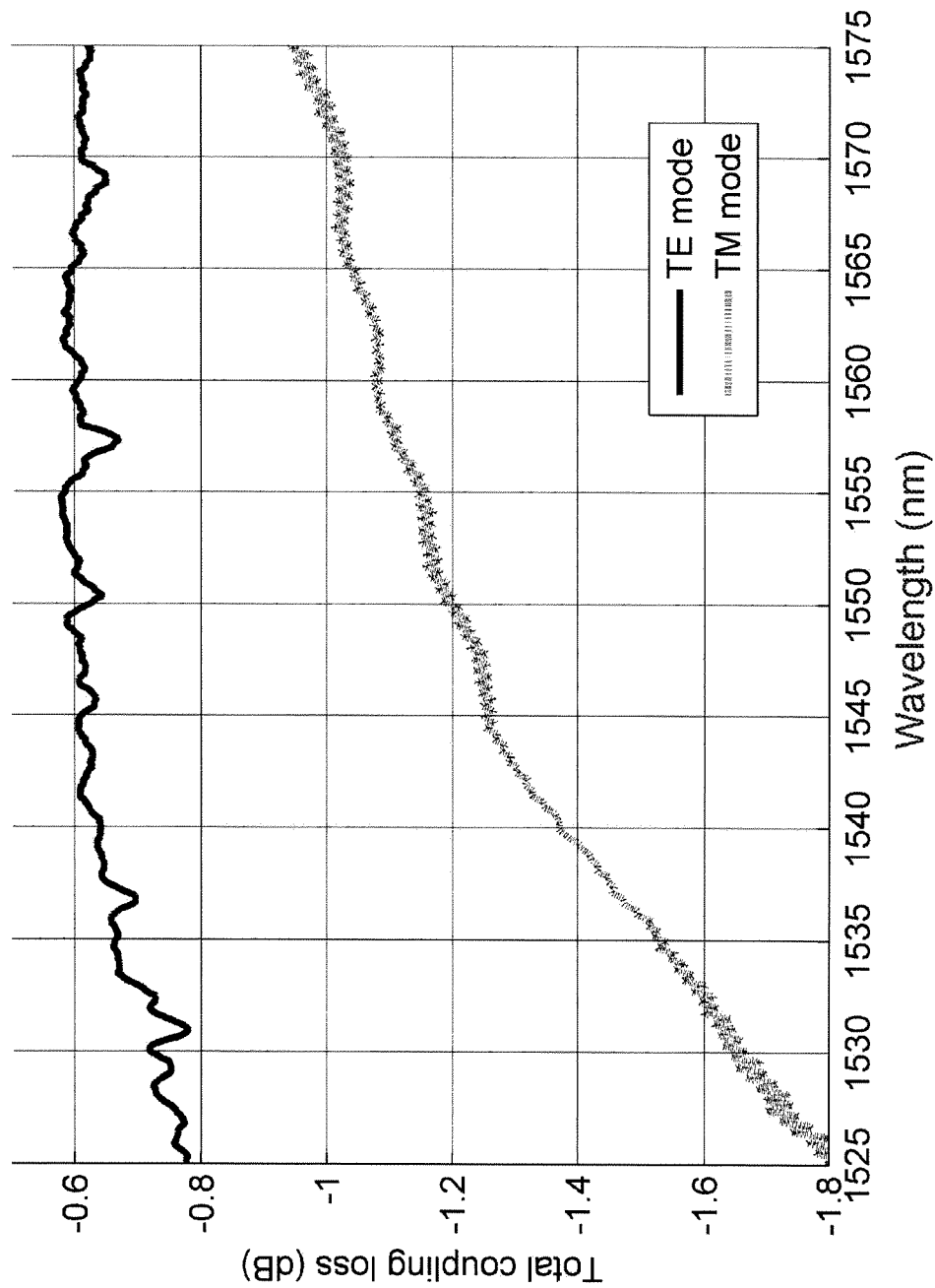
FIG. 30 is a graph illustrating experimentally measured variation of insertion loss in dB versus wavelength in the C-band for the TE and TM modes of the spot-size converter of FIG. 8A. The spot-size converter is used for coupling light between a strip silicon waveguide and a second waveguide consisting of a 6.6-µm MFD optical fiber fusion-spliced to a SMF-28™ single-mode optical fiber (Corning Incorporated). The total coupling loss includes propagation and evanescent coupling losses in the spot-size converter, the loss contribution from modal mismatch between the spot-size converter and the second waveguide as well as the fusion splice loss between the second waveguide and the SMF-28™ optical fiber.

Advantageously, the spot-size converters described herein can provide an in-line configuration through vertical evanescent coupling which can be compatible with CMOS technology. In some embodiments, the spot-size converter can provide an efficient coupling of light between a submicron silicon waveguide and another waveguide carrying a significantly large mode (e.g., an optical fiber with an MFD of up to 10 µm) while remaining substantially single-mode. For example, in some embodiments of the spot-size converter, the coupling from a submicron silicon waveguide to an HNA optical fiber having an MFD of 6.6 µm can exhibit an efficiency as high 94% (0.27 dB loss), leading to a total coupling loss of 0.37 dB between the silicon waveguide and a SMF-28™ optical fiber (Coming Incorporated) when taking into account an additional splice loss of 0.1 dB between the 6.6 um MFD HNA fiber and the SMF-28™ optical fiber. Furthermore, in some embodiments, insertion losses ranging from 0.6 to 0.8 dB for the TE mode and from 1.0 to 1.7 dB for the TM mode have been measured experimentally over the C-band including the 6.6 μm MFD HNA fiber to SMF-28 fusion splice loss, as illustrated in FIG. 30.

It is also to be noted that some embodiments of the spot-size converter have good tolerance against fabricated-induced variations in the positioning, size and shape of the waveguide elements forming the upper waveguiding structure, as well as against vertical, horizontal and longitudinal misalignments in the positioning of an optical fiber coupled at one end of the spot-size. A 1-dB bandwidth misalignment tolerance of .+−.1.7 μm between the optical fiber and the spot-size converter in the plane transverse to the waveguiding axis (i.e., along the width and height dimensions) and greater than 20 μm along the waveguiding axis was measured. Further advantageously, in some embodiments, the spot-size converter can be designed such that the TE and TM modes have similar effective refractive indices, especially in the coupling region where the lower and upper waveguiding structures are evanescently coupled to each other, so to obtain a polarization-independent operation.

FIGS. 1A-30 above describe a spot-size converter to couple light from a first waveguiding structure supporting a first propagation mode into a second waveguiding structure supporting a second propagation mode, in which the first and second propagation modes have substantially different spot-sizes. The first waveguiding structure may be a submicron strip silicon waveguide on silicon photonics chips. The second waveguiding structure may be an optical fiber used to couple light in or out of an SOI chip. Optical fibers usually have light guiding cores of dimensions of about 10 μm, which are much greater than those of typical submicron silicon photonic waveguides. For efficient coupling, a spot-size converter may be designed to have a core of a substantially similar spot-size at an end as the core of the optical fiber, leading to a large overlap with the mode of the optical fiber.

As shown in FIG. 31A, in a spot-converter, the first waveguiding structure 002 and the second waveguiding structure 004 may be placed side-by-side to allow light propagation from one waveguiding structure to the other, via a coupling between the waveguiding structures 002, 004. In one or more embodiments, one or both of the waveguiding structures 002, 004 may include a longitudinally tapered portion tapering down toward one or both ends thereof. In the configuration of FIG. 31A, the first and second waveguiding structures 002, 004 are longitudinally tapered similarly, but in one or more embodiments the first waveguiding structure 002 may be longitudinally tapered differently from the second waveguiding structure 004, where the profile (e.g., the slope) of the longitudinally tapered portions of the first waveguiding structure 002 is different (e.g., steeper) from the profile (e.g., the shape) of the longitudinally tapered portions of the second waveguiding structure 004.

Due to their mode overlap, and the crossing of their effective refractive indices $n_{eff1}$ and $n_{eff2}$, a coupling occurs between the first and second waveguiding structures 002, 004 in the coupling region (B) 006 as shown in FIG. 31B. As used herein, the term "effective refractive index" refers to a property of a waveguiding structure that quantifies the decrease in the local phase velocity of light propagating in the waveguiding structure compared to its phase velocity in vacuum. The effective refractive index represents the refractive index of a uniform material in which light would propagate with the same phase velocity as in the waveguiding structure. The effective refractive index of a waveguiding structure depends on its material properties, on the temperature, on the wavelength of light propagating therein, on its geometrical parameters (e.g., its cross-sectional profile) and, for multi-mode waveguiding structures, on the mode in which light propagates.

Below, the light propagation in an overall system as a whole is discussed, instead of in the two coupled individual waveguiding structures in the coupling region (B) 006, the overall system of the two coupled waveguides 002, 004 is no longer characterized by the individual propagation modes of the two waveguiding structures 002, 004, but rather by "super-modes" of the whole structure. As used herein, the term "super-mode" refers to a mode that is a combination of the modes of the individual waveguides which are spatially added, either in-phase ("even super-mode") or out-of-phase ("odd super-mode"). As shown in FIG. 1(c), the even super-mode 012 transitions from the propagation mode of the first waveguiding structure 002 at a first end (A) 008 of the coupling region (B) 006 to the propagation mode of the second waveguiding structure 004 at a second end (C) 010 of the coupling region (B) 006 via a shared mode of the first and second waveguiding structures 002, 004 added in-phase in the coupling region (B) 006. The odd super-mode transitions 014 from the propagation mode of the second waveguiding structure 004 at the first end (A) 008 to the propagation mode of the first waveguiding structure 002 at the second end (C) 010 of the coupling region (B) 006, via a shared mode of the first and second waveguiding structures 002, 004 added out-of-phase.

Accordingly, as shown in FIG. 31B, the effective refractive index of the even super-mode 012, $n_{eff,\ even}$, transitions from $n_{eff1}$ at the first end (A) 008 to $n_{eff2}$ at the second end (B) 006. The effective refractive index of the odd super-mode 014, $n_{eff,\ odd}$, is the same as $n_{eff2}$ at the first end (A) 008 and the same as $n_{eff1}$ at the second end C (010). In the coupling region (B) 006, both $n_{eff,\ even}$ and $n_{eff,\ odd}$ differ from $n_{eff1}$ and $n_{eff2}$. The splitting between $n_{eff,\ even}$ and $n_{eff,\ odd}$ increases as the coupling strength increases.

However, if the super-modes 012, 014 at one or both ends (A, C) 008, 010 of the coupling region (B) 006 are not the same as the propagation modes of the individual waveguides 002, 004, the odd super-mode 014 is excited, which causes mode beating and increases coupling loss. Therefore, the waveguiding structures 002, 004 may be tailored and designed by appropriately selecting the material forming the high-index elements (which may differ from one high-index element to another), their individual size and shape, as well as their relative arrangement (i.e., their relative positioning and mutual separation).

Further, for optimized operation, the individual waveguides may each support only one propagation mode for each of the TE (transverse electric) and TM (transverse magnetic) polarizations. Single mode operation over a large distance requires that the difference between the effective refractive indices of the waveguiding structures and cladding (surrounding medium) be small. The use of materials with high contrast in the refractive indices together in process of fabricating planar optic circuits may allow accurate control of the effective refractive indices. For example, a waveguiding structure may be a multi-rod structure ("MRS") made of a plurality of high-index elements in order to mimic the property of a low-index material. As used herein, the term "high-index" or "low-index" element refers to an element having a refractive index that is sufficiently higher or lower than a refractive index of the medium surrounding this element. In addition, the accurate control of the effective refractive indices may lead to the required coupling between two waveguiding structures discussed above.

The present invention adds two implementations to the original invention described in U.S. patent application Ser. No. 14/635,602, in light of the above.

The first additional implementation includes one or more embodiments in which light propagates from the first waveguiding structure into the second waveguiding structure through an "adiabatic progressive transformation," as in a simple tapered waveguiding structure, and at least one of the two waveguiding structures are or contain a multi-rod structure ("MRS") made of a plurality of high-index elements. In such a transformation, light propagates in the propagation mode of the first waveguiding structure, which is preferably single-mode, then in the coupling region which is also preferably single-mode, and then in the propagation mode of the second waveguiding structure, which is further preferably single-mode. The overall system may thus be preferably single-mode all along the propagation direction and undesirable coupling to other propagation modes may be mitigated. The same is true for each of the TE and TM polarizations. This is in direct contrast to two waveguiding structures placed side-by-side in which energy is exchanged through evanescent coupling between two individual propagation modes and in which the overall coupling region is bimodal (i.e. supporting the propagation of an even mode and an odd mode). In this last case, although the spot size converter may be designed such that only the even mode is excited, there may be potential imperfections, such as waveguide surface roughness, to cause undesired coupling to the odd.

The second additional implementation includes one or more embodiments in which dielectric material is used in the multi-rod structure as a core of the second waveguiding structure and also as an etch stop to ease the fabrication of integrated optical devices.

MRS-Based Spot-Size Converter

Figure 3:
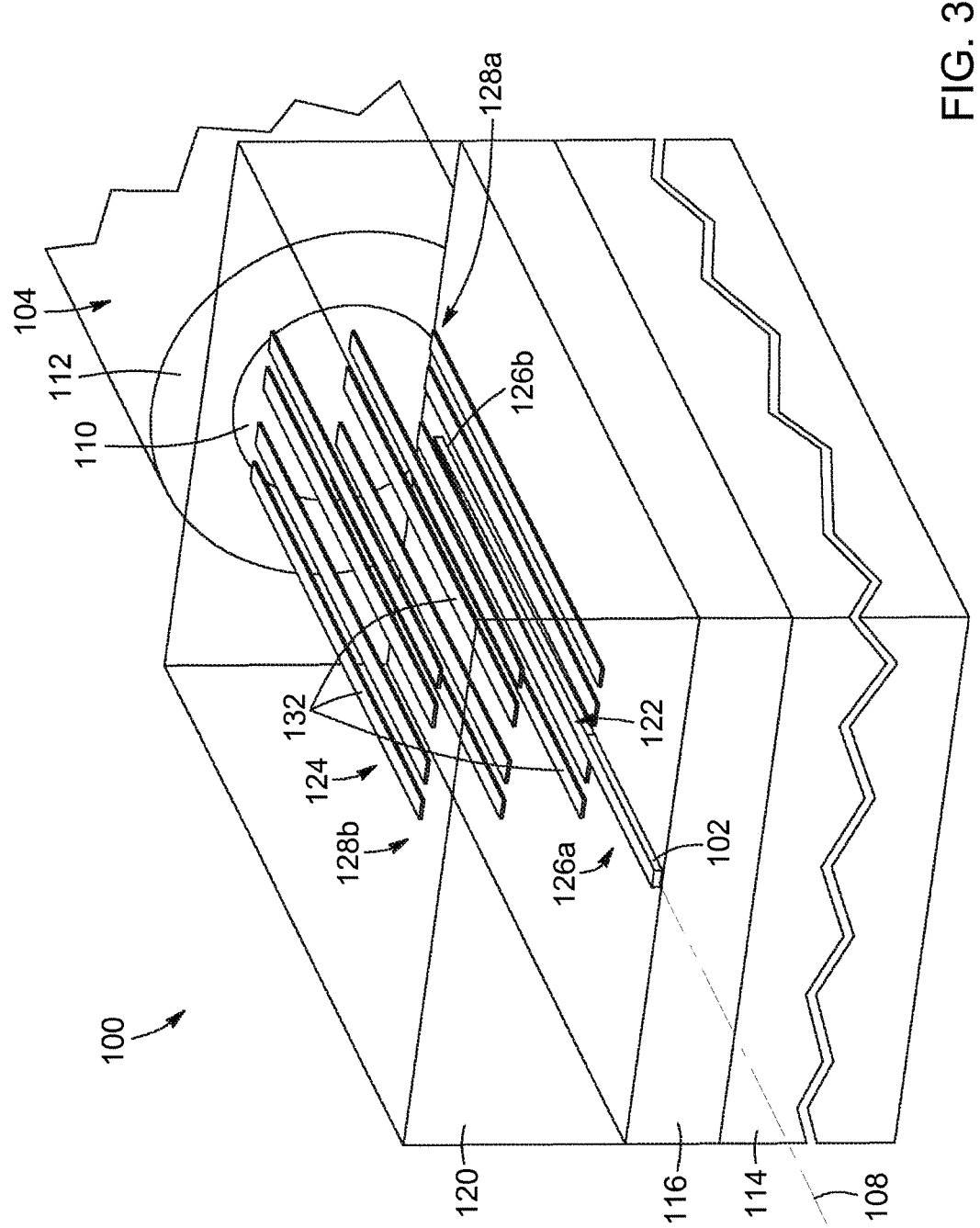
FIG. 3 is a schematic perspective view of a spot-size converter for coupling light between two dissimilar waveguides, in accordance with an embodiment.
Figure 4:
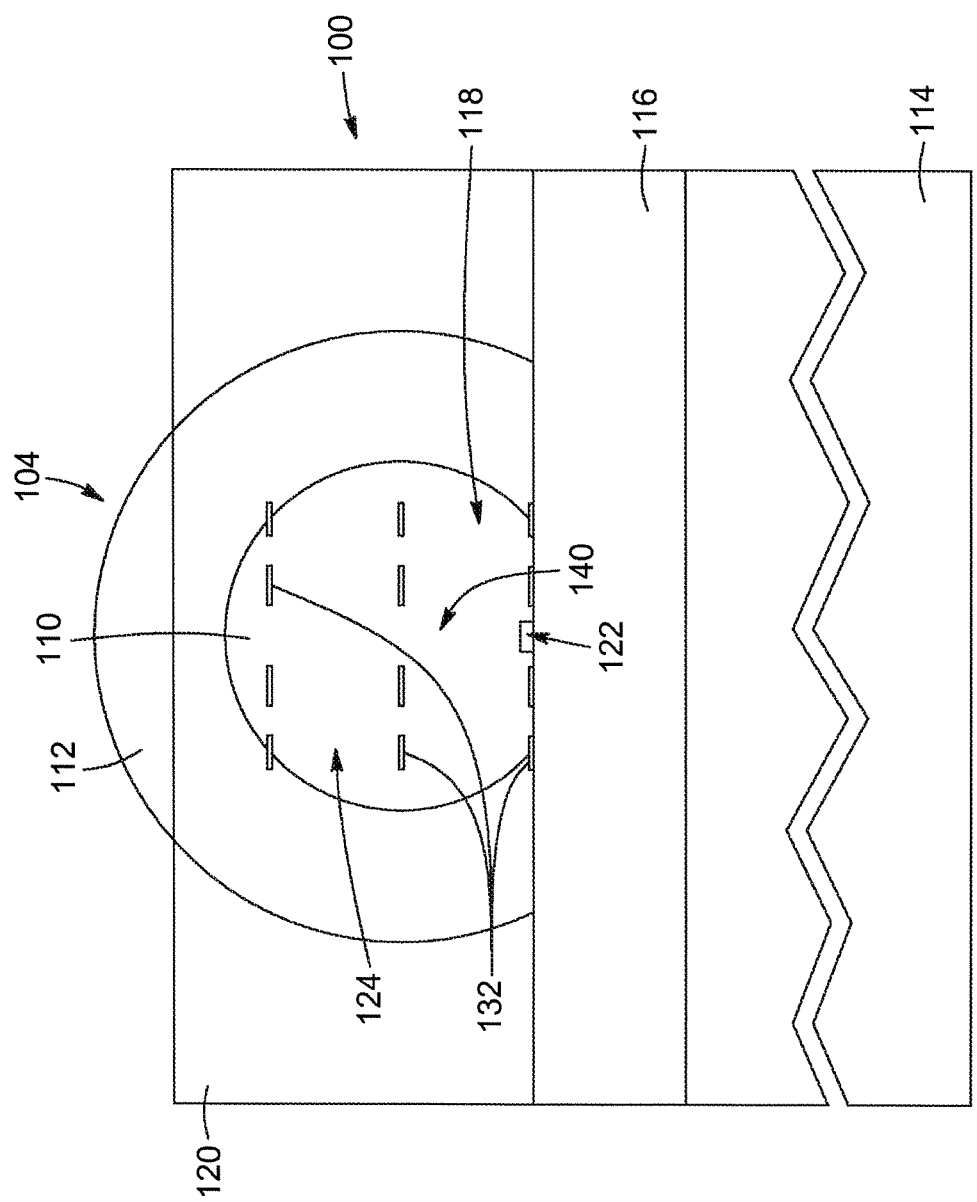
FIG. 4 is a front view of the spot-size converter of FIG. 3, taken along a plane perpendicular to the waveguiding axis of the spot-size converter.
Figure 5:
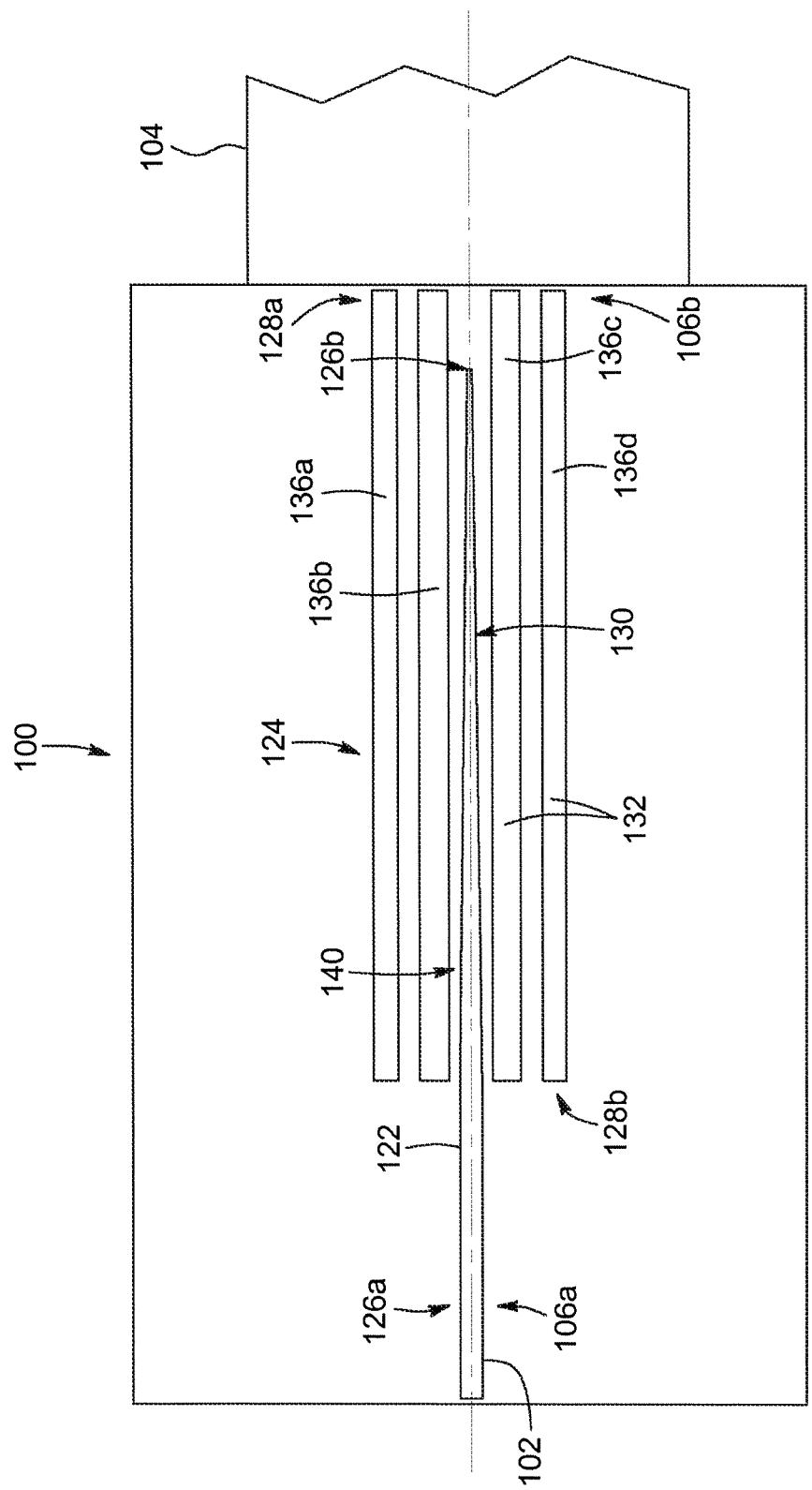
FIG. 5 is a top view of the spot-size converter of FIG. 3.
Figure 32A:
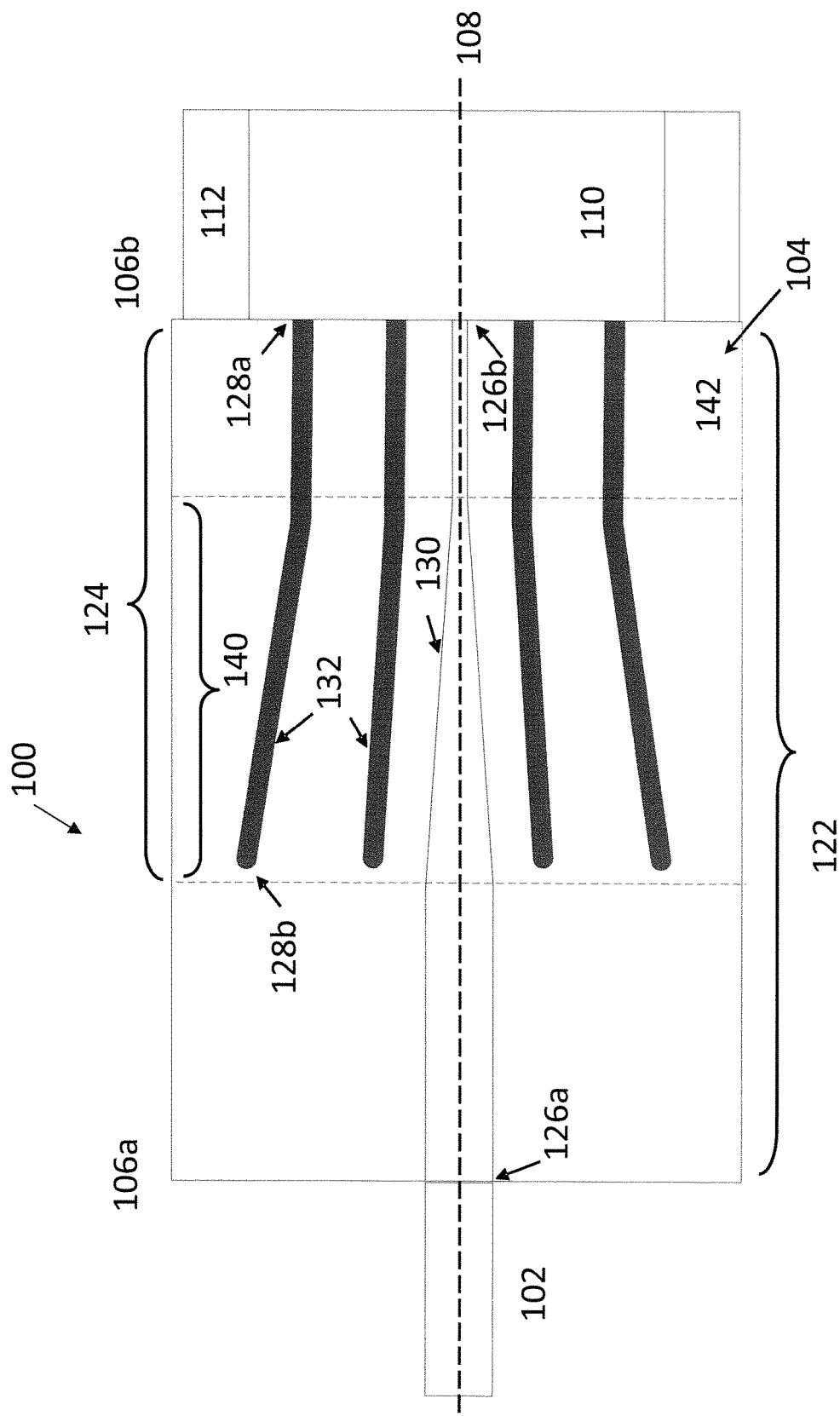
FIGS. 32A and 32B are schematic perspective views of a spot-size converter for coupling light between two waveguides.
Figure 32B:
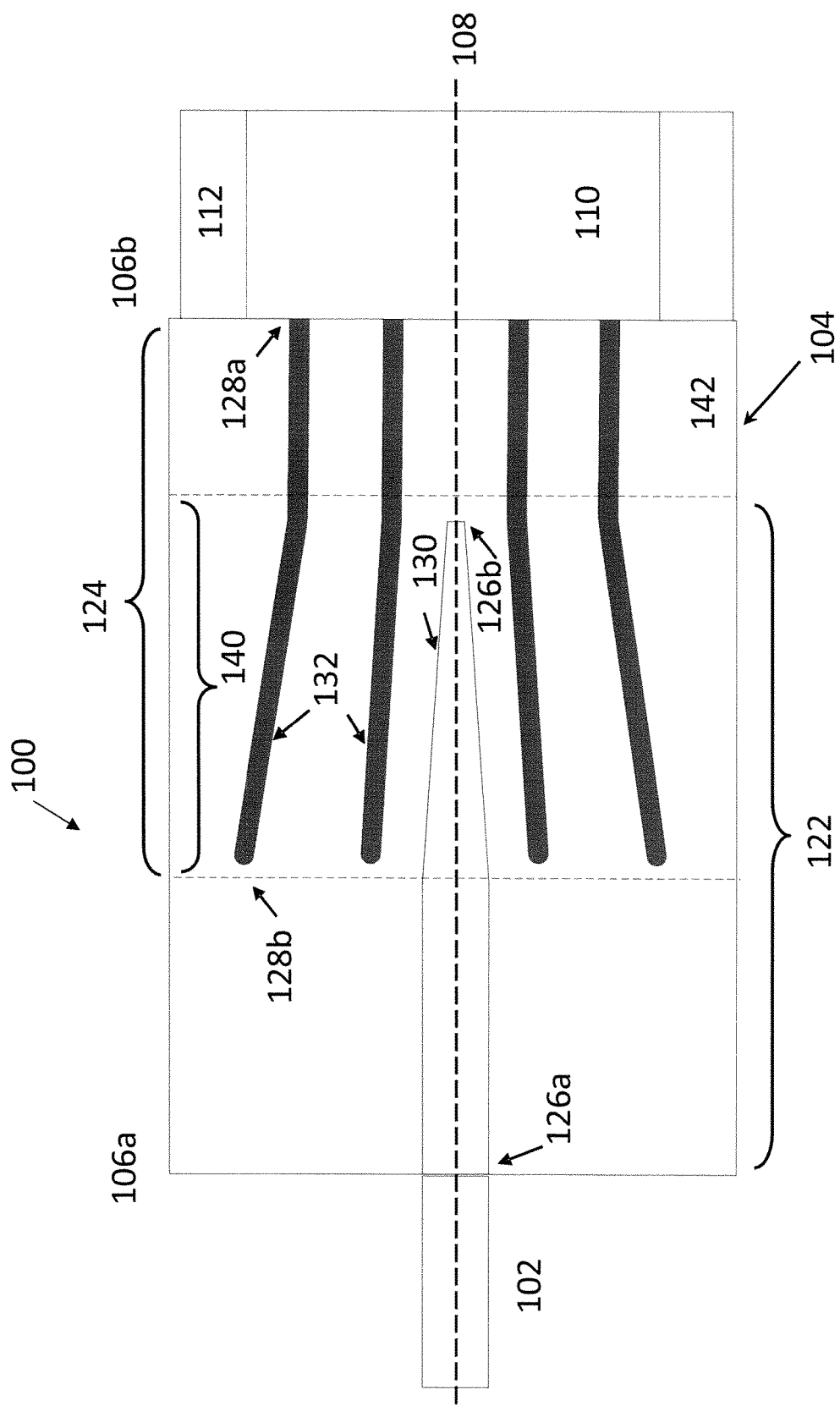

FIGS. 32A, 32B, and 3 show exemplary configurations of a spot-size converter 100 for coupling light between a first waveguide 102 (i.e. an input of the spot-size converter 100) and a second waveguide 104 (i.e. an output of the spot-size converter 100), respectively supporting a first and a second propagation modes. The first and second waveguides 102, 104, as well as the respective propagation modes carried thereby, may have substantially different dimensions. The spot-size convertor 100 extends between a first end 106a and an opposite second end 106b along a longitudinal waveguiding axis 108 so as to define a light path between the first and second waveguides 102, 104.

In one or more embodiments, the first waveguide 102 may be a conventional silicon strip waveguide having a width of 300 nm to 600 nm and a height of 100 to 350 nm. The first waveguide 102 is optically connected to the first end 106a of the spot-size converter 100. In this configuration, the first waveguide 102 is single-mode for both TE and TM polarizations. This configuration for the first waveguide 102 is provided by way of example only, since various other structures, geometrical dimensions and coupling arrangement to the spot-size converter may be used. For example, in one or more embodiments, the first waveguide 102 may be embodied by any other appropriate types of single-mode or multi-mode planar waveguides including, but not limited to, a rib waveguide, a slot waveguide and a ridge waveguide. The first waveguide 102 may also be embodied by any other appropriate materials including, but not limited to, silicon, silicon nitride, silicon oxy-nitride and silicon-rich oxide.

The second waveguide 104 is optically connected to a third waveguide which may be a single-mode optical fiber at the second end 106b of the spot-size converter 100. The optical fiber includes a fiber core 110 having a mode field diameter (MFD) of about 3 to 12 μm and defining a light-guiding path of the second waveguide 104. The fiber core 110 is surrounded by a fiber cladding 112. Embodiments of the present invention are not limited to a particular type or size of optical fiber. In particular, the optical fiber may be made of plastic, glass, quartz, silica or the like, and may include, without being limited to single-mode fibers, multi-mode fibers, polarization-maintaining fibers, microstructured fibers, multicore fibers, single-cladding fibers, multi-cladding fibers, doped fibers, high or ultra-high numerical aperture fibers, fiber arrays, or any other non-typical or customized fibers.

In one or more embodiments of the invention, the spot-size converter 100 shown in FIG. 3 is a spot-size converter including the first waveguide 102, the second waveguide 104, a silicon substrate 114, an insulating layer 116 made of silica or another suitable material deposited on the silicon substrate 114, and a waveguiding region 118 provided on top of the insulating layer 116 and embedded in a cladding structure 120.

While the insulating layer 116 and the cladding structure 120 may both be made of the same material (e.g., silica), their refractive indices may differ slightly due to the use of different deposition techniques. In the illustrated configuration, the spot-size converter 100 and the first waveguide 102 are formed from the same SOI wafer, so that they share the same silicon substrate 114, insulating layer 116 and cladding structure 120. As mentioned above, in one or more embodiments, the spot-size converter 100 may not be based on SOI technology.

The waveguiding region 118 of the spot-size converter 100 is responsible for converting the spot size of light propagating along the longitudinal waveguiding axis 108 between the first and second waveguides 102, 104. The waveguiding region 118 generally includes a first part of waveguiding structure 122 and a second part of waveguiding structure 124. The first part of waveguiding structure 122 has a first end 126a and an opposed second end 126b, the first end 126a being coupled to the first waveguide 102 to receive light therefrom or transmit light thereto in the first propagation mode. Similarly, the second part of waveguiding structure 124 has a first end 128a and an opposed second end 128b, the first end 128a being coupled to the third waveguide 110 to receive light therefrom or transmit light thereto. In one or more embodiments, the first part of the waveguiding structure 122 extends over the second waveguide 104, as shown in FIG. 32A. In one or more embodiments, the first part of the waveguiding structure 122 does not overlap with the second waveguide 104, as shown in FIG. 32B. Depending on the application, each of the first and second parts of waveguiding structures 122, 124 may be made of various materials including, but not limited to, silicon, silicon oxynitride, silicon oxide, silicon nitride, silicon carbide, indium phosphide, gallium arsenide, a polymer or a combination thereof.

First Part of the Waveguiding Structure

Referring still to FIGS. 32A, 32B, and 3, the first part of waveguiding structure 122 may consist of a single waveguide element made of silicon or silicon nitride and extending along the longitudinal waveguiding axis 108. The first part of waveguiding structure 122 is formed on the insulating layer 116 of the SOI wafer and is patterned from the same thin silicon layer as the first waveguide 102. In the illustrated configuration, the first part of waveguiding structure 122 is single-mode for both TE and TM modes, but this may not be the case in one or more embodiments.

In one or more embodiments, the first part of waveguiding structure 122 may include a longitudinally tapered portion 130 tapering down toward the second end 126b thereof. In FIGS. 32A, 32B, and 3, the first part of waveguiding structure 122 has a length of few hundreds of µm, a constant height of 150 to 750 nm and a width that tapers from few hundreds of nm at the first end 126a to about 100 nm or less at the second end 126b. In one or more embodiments, the width of the first part of waveguiding structure 122 at the second end 126b may be as small as possible by the manufacturing process.

In one or more embodiments, the first part of waveguiding structure 122 may have a first longitudinally tapered portion tapering from the first end 126a down to an intermediate location of the first part of waveguiding structure 122 and a second longitudinally tapered portion tapering from the intermediate location down to the second end 126b, where the profile (e.g., the slope) of the first longitudinally tapered portion is different (e.g., steeper) from the profile (e.g., the shape) of the second longitudinally tapered portion. Such an arrangement may contribute to reduce the overall length of the first part of waveguiding structure 122. A more complicated longitudinal variation may also be determined to further reduce the overall length.

As used herein, the terms "length" and variants thereof refer to a dimension of a waveguide or waveguiding structure in the light propagation direction and along the longitudinal waveguiding axis 108. The terms "width" and variants thereof are herein to refer to a dimension of a waveguide perpendicular to the longitudinal waveguiding axis 108 and parallel the conventional plane or surface of the substrate on which the waveguide is formed. The terms "height" and variants thereof refer to a dimension of a waveguide perpendicular to both the length and width and also to the conventional plane or surface of the substrate. In some instances, the term "height" may be used substituted by the term "thickness". In this regard, the terms "vertical" and variants thereof refer to a direction perpendicular to a plane parallel to the conventional plane or surface of the substrate, that is, along the "height" (or "thickness") direction. Likewise, the terms "horizontal" and variants thereof are used to refer to directions lying in a plane which is perpendicular to the vertical direction as defined, that is, encompassing the "width" and "length" directions.

Continuing with FIGS. 32A, 32B, and 3, in order to ensure good mode overlap between the first part of waveguiding structure 122 and the first waveguide 102, it is desirable that the spot size of the first part of waveguiding structure 122 at the first end 126a thereof substantially coincide with those of the first propagation mode carried in the first waveguide 102.

In the configuration of FIGS. 32A, 32B and 3, as the first part of waveguiding structure 122 tapers down 130 toward the second end 126b thereof, the mode guided in the first part of waveguiding structure 122 becomes less confined so as to gradually expand in the cladding structure 120. In the illustrated configuration, the mode evolution of light propagating along the first part of waveguiding structure 122 is preferably adiabatic, or close to adiabatic. As known in the field of optical waveguides, the term "adiabatic" is intended to mean that variations in the cross-sectional profile of a waveguide are sufficiently slow and smooth to render coupling to other modes and radiative losses negligible or below some operationally acceptable level.

The configurations for the first part of waveguiding structure 122 illustrated in FIGS. 32A, 32B and 3 provided by way of example only, as various other structural arrangements, optical properties, geometrical dimensions and materials may be used in one or more embodiments. For example, the longitudinally tapered portion 130 in FIGS. 32A, 32B and 3 is a taper having a constant height profile, but may alternatively or additionally have a height profile that tapers longitudinally down toward the second end 126b of the first part of waveguiding structure 122. Also, the slope of the longitudinally tapered portion 130 may be constant or not along its length (i.e., the longitudinally tapered portion 130 may form a linear or a non-linear taper), and may or may not form an adiabatic taper. More regarding other possible configurations for the first part of waveguiding structure 122 will be discussed further below.

Second Part of the Waveguiding Structure

Figure 33:
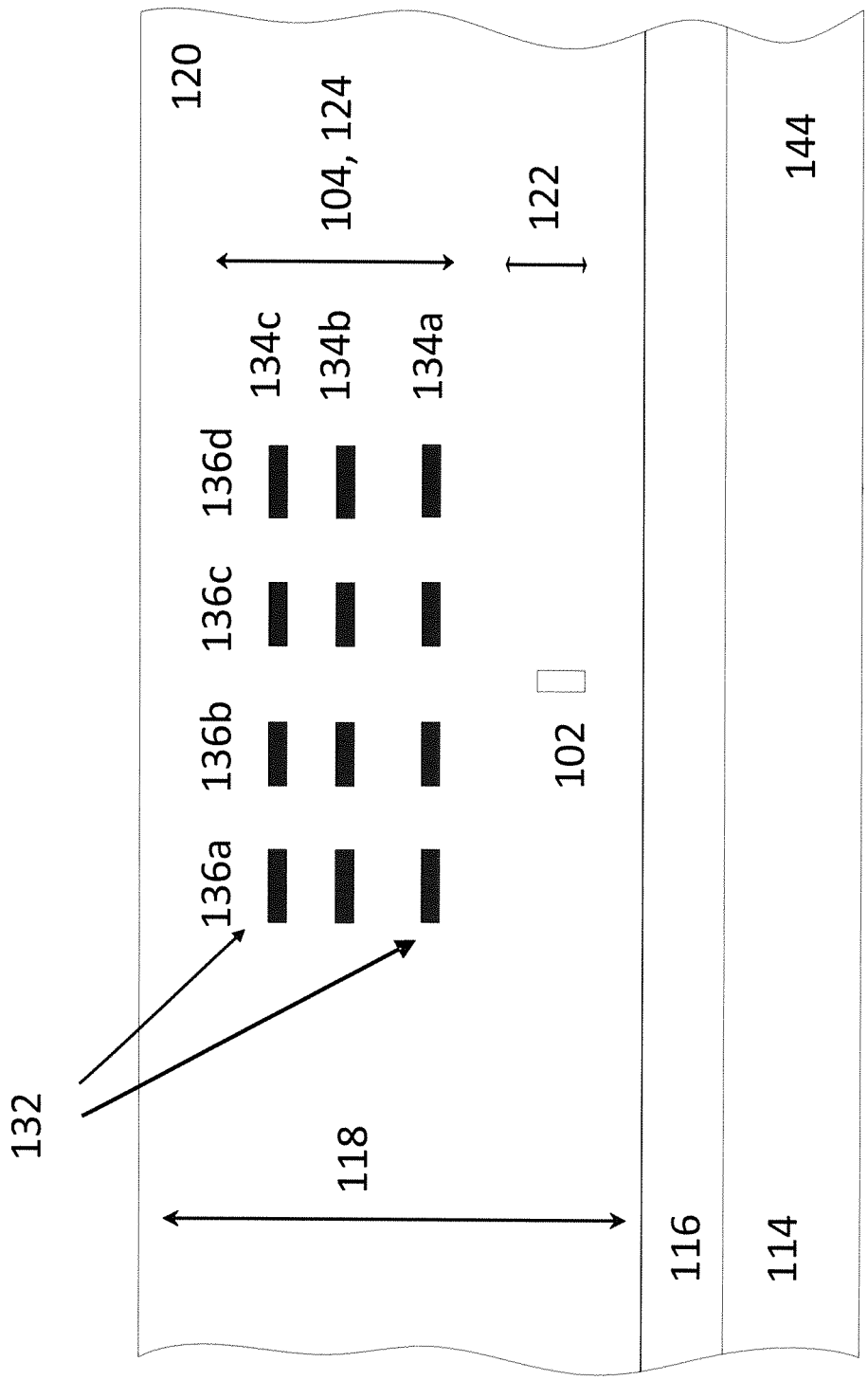
FIG. 33 is a front view of the spot-size converter of FIGS. 32A and 32B.

Referring still to FIGS. 32A, 32B and 33, in the illustrated configuration the second part of waveguiding structure 124 includes a region that extends over the first part of waveguiding structure (an overlap region) 140 and the second waveguide 104 including a multi-rod structure (MRS) region 142. Within MRS region 142, a multi-rod structure 132 exists, which is embodied by a plurality of optically coupled high-index elements extending along the longitudinal waveguiding axis 108 and arranged in a two-dimensional array in a plane transverse to the longitudinal waveguiding axis 108. The multi-rod structure 132 may, for example, be made of various materials including, but not limited to, silicon nitride, silicon, silicon oxynitride, silicon oxide, silicon carbide, indium phosphide, gallium arsenide, a polymer, a combination thereof or other suitable materials. In one or more embodiments, the multi-rod structure may include an arbitrary number of rods arranged in a way that that, together, they mimic a low-index material. Thus, although twelve rod layers arranged in multiple vertically spaced rows and horizontally spaced columns (in a Cartesian arrangement where the rows and columns are arranged along two orthogonal axes, respectively) are shown in FIGS. 32A and 32B, there may be any suitable number of rods and/or rod layers in any suitable positioning, including a non-Cartesian arrangement (where the rows and columns are not arranged along the two orthogonal axes, respectively), in the multi-rod structure 132 to facilitate such an arrangement that achieves mimicking of a low-index material.

The multi-rod structure 132 is embedded in the cladding structure 120 and includes, by way of example, three vertically spaced rows 134a to 134c and four horizontally spaced columns 136a to 136d of high-index elements. The high-index elements 132 may have a height of about 50 nm, a width of few hundreds of nm, a length of several hundreds of microns, and a longitudinally uniform cross-section. The vertical spacing between adjacent rows may be between 300 nm and 3000 nm while the horizontal spacing between adjacent columns may be about 200 to 2000 nm. These dimensions are provided by way of example only and may be varied in one or more embodiments. In the illustrated configuration, the separation between the high-index elements is substantially larger than their corresponding heights, but this may not be the case in one or more embodiments.

A second part of waveguiding structure 124 such as in FIGS. 32A, 32B and 3, which has relatively large lateral dimensions and is formed of the multi-rod structure 132, may provide an efficient way to form an overall waveguiding structure capable of carrying a mode whose size and effective refractive index may match, for example, those of a standard or high numerical aperture (HNA) optical fiber.

The configurations for the second part of waveguiding structure 124 illustrated in FIGS. 32A, 32B and 33 are provided by way of example only, as various other structural arrangements, optical properties, geometrical dimensions and materials may be used in one or more embodiments. For example, while the multi-rod structure 132 forms a two-dimensional linear array of high-index rods in FIGS. 32A, 32B and 33, this may not be the case in one or more embodiments as long as the multi-rod structure 132 are arranged in multiple vertically spaced rows and/or columns. Indeed, in one or more embodiments, the multi-rod structure 132 may form of a stack of vertically spaced high-index sheets. Also, while in FIGS. 32A, 32B and 33 the second part of waveguiding structure 124 is arranged symmetrically with respect to the longitudinal waveguiding axis 108, this may not be the case in one or more embodiments.

The multi-rod structure 132 as illustrated in FIGS. 32A, 32B and 33 is positioned above the first part of waveguiding structure 122. Other configurations may be used. For example, the first part of waveguiding structure 122 may be located on top of the multi-rod structure 132 or even in between.

Figure 34:
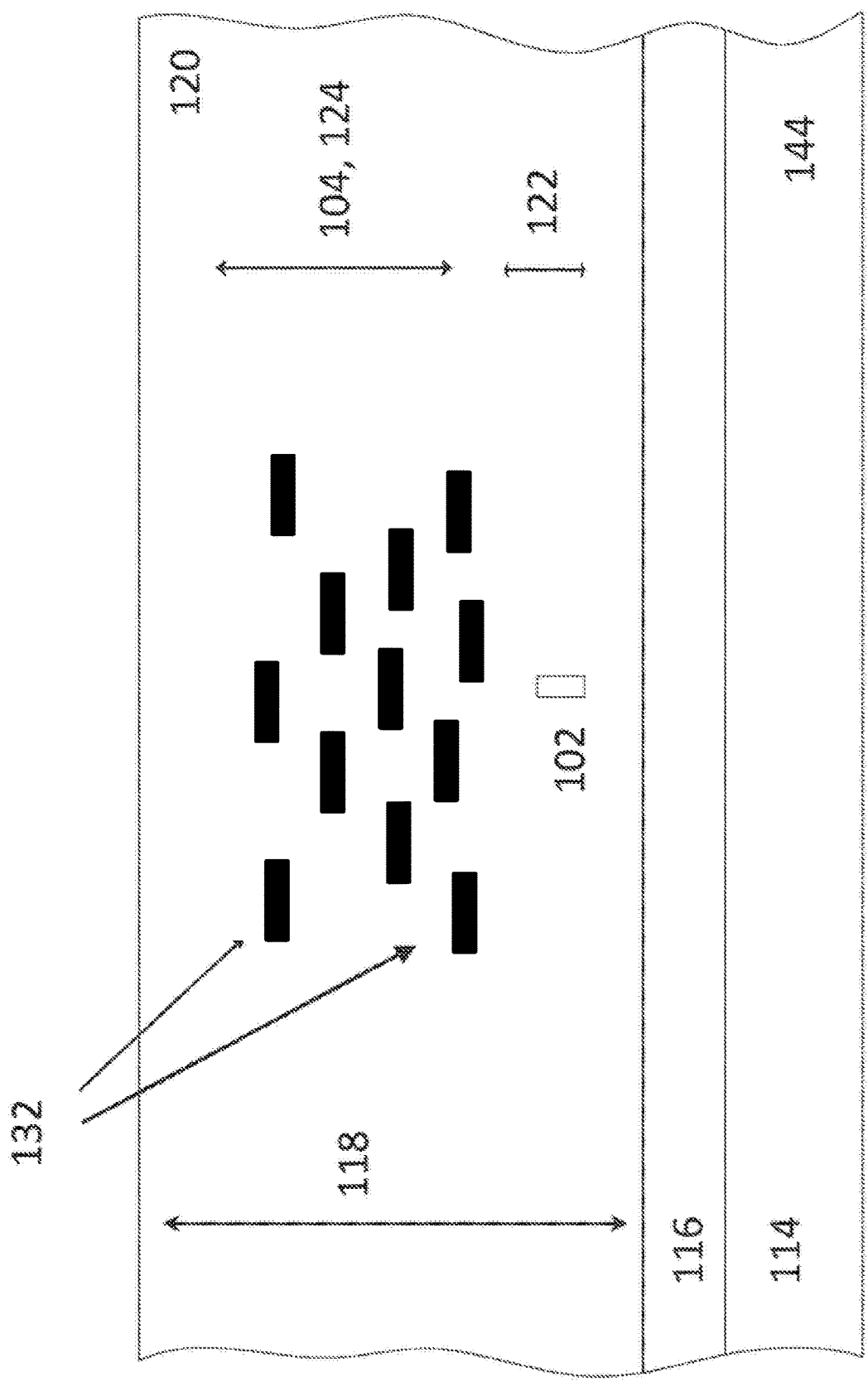
FIG. 34 is a front view of the spot-size converter with rods at arbitrary locations that do not conform to a specific pattern.

The multi-rod structure 132 may not be configured as a linear array but may be provided at arbitrary locations that do not conform to a specific pattern as illustrated in FIG. 34. Likewise, the cross-sectional profile of the individual high-index elements may not be rectangular and may vary in size and/or shape along the longitudinal waveguiding axis 108. Also, while the effective refractive index of the second part of waveguiding structure 124 is substantially constant along its length in the configuration of FIGS. 32A, 32B and 33, this may not be the case in one or more embodiments.

Spot-Size Converter

In one or more embodiments, the multi-rod structure 132 together with the longitudinally tapered portion 130 of the first part of waveguiding structure 122 may provide a low-index region in the overlap region 140, in which the first waveguiding structure 122 is progressively added to the second part of waveguiding structure 124. Therefore, a combined system of the first part of waveguiding structure 122 and the second part of waveguiding structure 124 as a whole may effectively form a single tapered waveguiding structure that converts the spot-size. In the combined system, light propagates from the first waveguide 102 to the second waveguide 104 via a propagation mode of the combined system, without causing the coupling to other propagation modes.

A spot-size converter as shown in FIGS. 32A, 32B and 33 may be fabricated on commercially available standard silicon photonic platforms, which contain high-index material layers. Thickness and position of such high-index material layers may be similar to those required for high-index elements in one or more embodiments of the spot-size converter. The elements required for a spot-size converter may be defined on such a commercially available silicon photonic platform by standard etching processing. Accordingly, fabrication process of a spot-size converter may be simplified, and associated time and cost may be reduced.

Additionally, such high-index material layers may be used as markers in an etching process. Specifically, other material deposited on top of a silicon nitride (high-index material) layer may be etched and when the etching reaches the silicon nitride layer, its presence at the surface may be detected and the etching process may be stopped. The use of the silicon nitride layers may further simplify the fabrication process because there is no need for separate optimization and fabrication of the inter-metallic materials and the materials used for making the spot-size converter.

Figure 35:
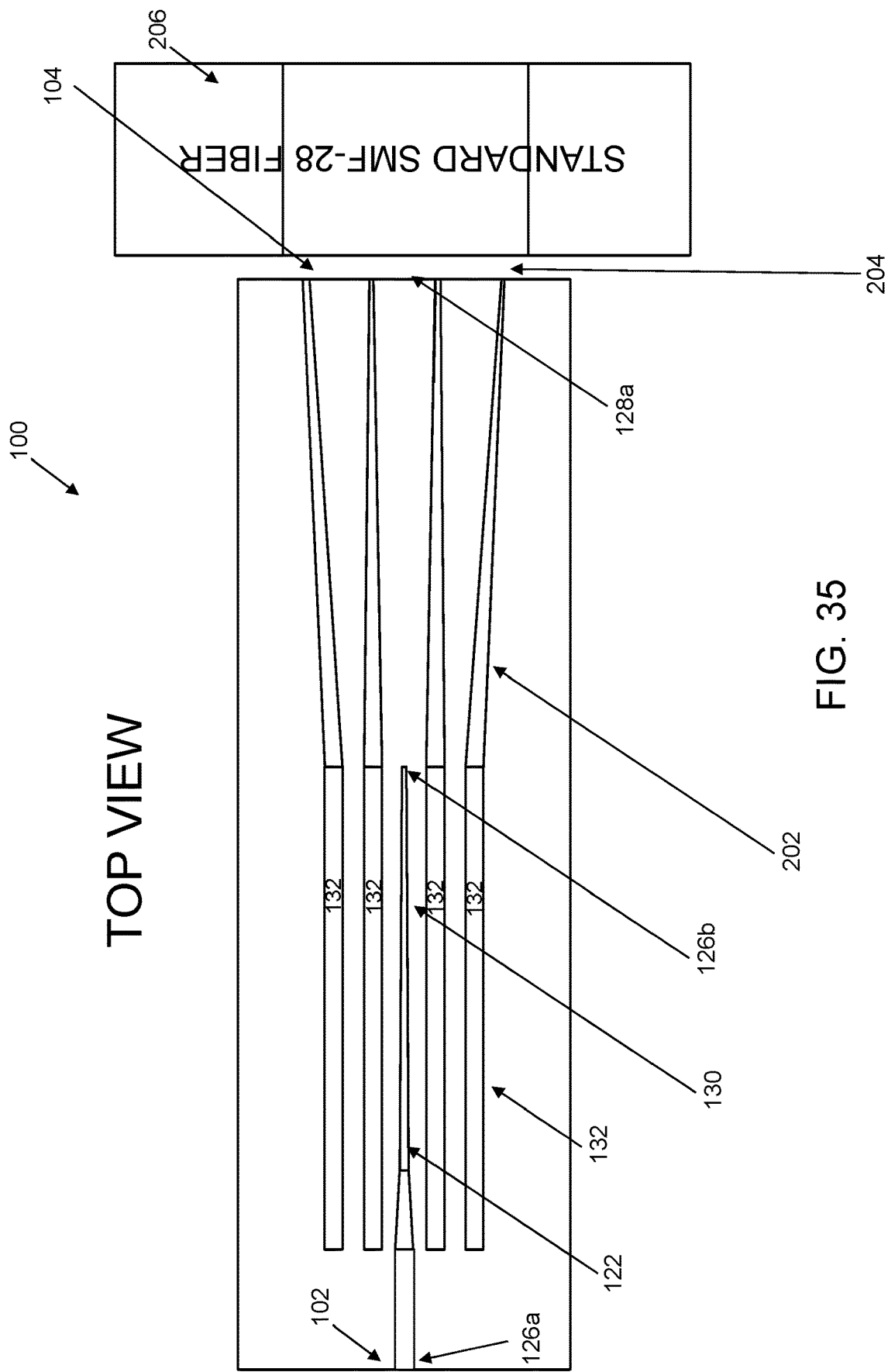
FIG. 35 is a top view of an embodiment of a spot-size converter.
Figure 36:
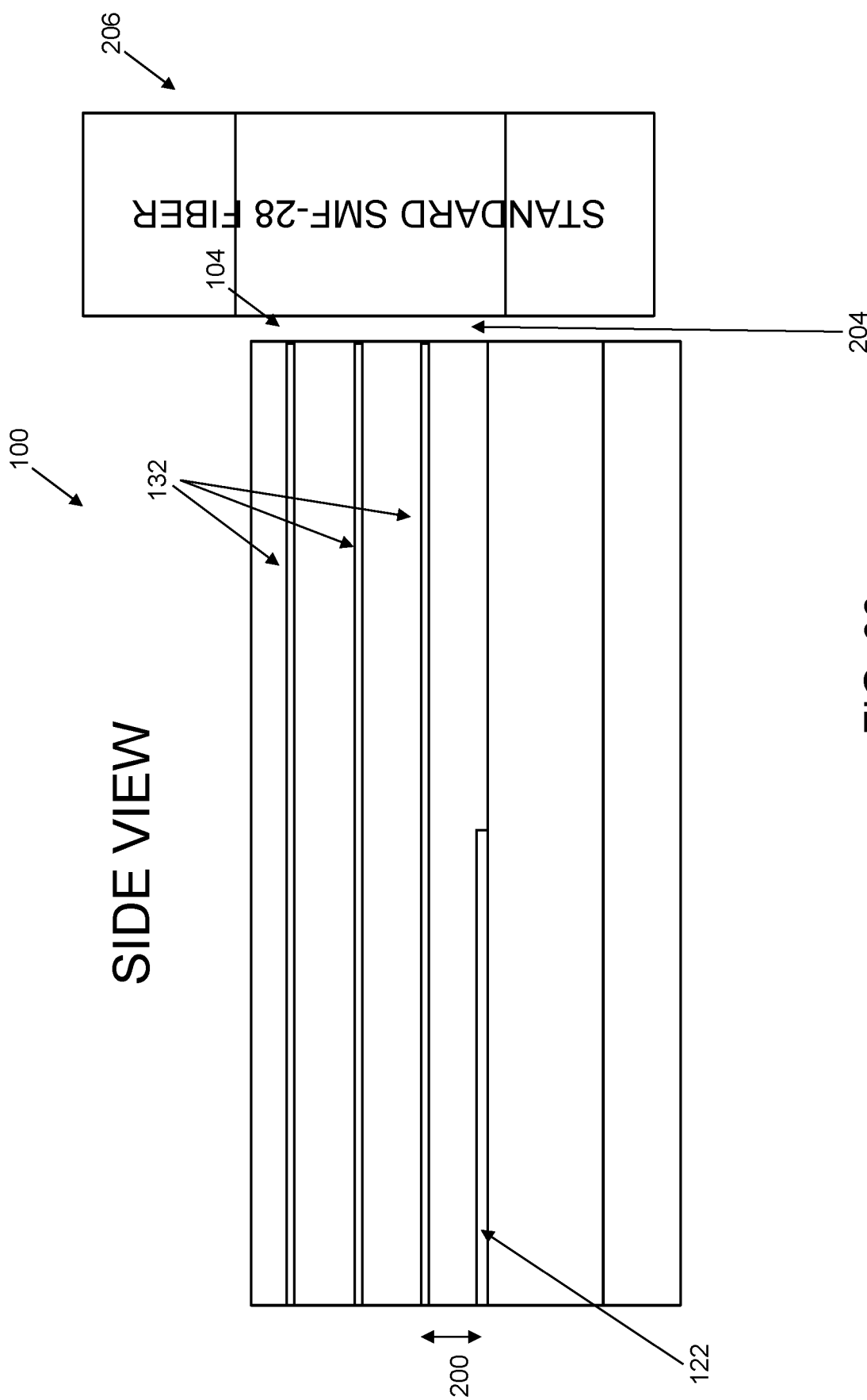
FIG. 36 is a side view of the spot-size converter of FIG. 35.

Spot-Size Converter with a Gap and with Tapers on the High-index Elements and the Lower Waveguiding Structure FIG. 35 is a top view and FIG. 36 is a side view of an embodiment of a spot-size converter 100 that has a gap 200 between the lower waveguiding structure 122 and the plurality of high-index elements 132 and tapers 130, 202 on both the lower waveguiding structure 122 and the plurality of high-index elements 132. The gap 200 is chosen to have low Polarization Dependent Loss (PDL) operation to support both a TE and TM mode. In an embodiment, the gap 200 length can be 1.5 µm to provide the best TE and TM mode performance. Also, the taper 130 can be greater than 500 µm to provide good coupling efficiency (adiabatic behavior).

In an embodiment, in FIGS. 35 and 36, the plurality of high-index elements 132 can have a width around 250 nm and there can be a gap 204 between the spot-size converter 100 and an optical fiber 206 with a size of about 1.2 µm, to maximize edge coupling to standard SMF-28 fiber. Also, in FIG. 35, various different lengths of the taper 202 were examined for the plurality of high-index elements 132. In an embodiment, it was determined that a linear taper transition for the taper 202 needs to be greater than 300 µm for good transfer efficiency.

In an embodiment, a spot-size converter includes a first part of a waveguiding structure configured to couple to a first waveguide to receive light from or transmit light to the first waveguide in a first propagation mode, wherein the first part of the waveguiding structure has a lower waveguiding structure with a varying effective refractive index that decreases away from the first waveguide; and a second part of the waveguiding structure configured to couple to a second waveguide to transmit light to or receive light from the second waveguide in a second propagation mode, wherein the second part of the waveguiding structure includes an upper waveguiding structure with a plurality of high-index elements arranged therein, wherein an overlap region is located between the first part of the waveguiding structure and the second part of the waveguiding structure, wherein the first propagation mode progressively transforms into the second propagation mode in the overlap region, and wherein there is a gap between the lower waveguiding structure and one or more of the plurality of high-index elements.

The first waveguide can have a spot-size of 0.3-0.7 µm and the second waveguide can have a spot size of 5-10 µm. The lower waveguiding structure can include a taper in the overlap region. The plurality of high-index elements each can include a taper outside of the overlap region in the second part of the waveguiding structure. The plurality of high-index elements can further linearly spread out from one another to the second waveguide outside of the overlap region in the second part of the waveguiding structure. The second waveguide can be SMF-28 fiber.

While the invention has been described with respect to a limited number of embodiments, those skilled in the art, having benefit of this disclosure, will appreciate that one or more embodiments may be devised without departing from the scope of the invention as disclosed herein. Accordingly, the scope of the invention should be limited only by the attached claims.

What is claimed is:

1. A spot-size converter comprising:
   a first part of a waveguiding structure configured to couple to a first waveguide to receive light from or transmit light to the first waveguide in a first propagation mode, wherein the first part of the waveguiding structure has a lower waveguiding structure with a varying effective refractive index that decreases away from the first waveguide; and
   a second part of the waveguiding structure configured to couple to a second waveguide to transmit light to or receive light from the second waveguide in a second propagation mode, wherein the second part of the waveguiding structure includes an upper waveguiding structure with a plurality of high-index elements arranged therein,
   wherein an overlap region is located between the first part of the waveguiding structure and the second part of the waveguiding structure, wherein the first propagation mode progressively transforms into the second propagation mode in the overlap region, and wherein the lower waveguiding structure includes a taper in the overlap region, and
   wherein the plurality of high-index elements further spread out from one another to the second waveguide outside of the overlap region in the second part of the waveguiding structure.

2. The spot-size converter of claim 1, wherein the first waveguide has a spot-size of 0.3-0.7 μm and the second waveguide has a spot size of 5-10 μm.

3. The spot-size converter of claim 1, wherein there is a gap between the lower waveguiding structure and one or more of the plurality of high-index elements.

4. The spot-size converter of claim 1, wherein the plurality of high-index elements each include a taper outside of the overlap region in the second part of the waveguiding structure.

5. The spot-size converter of claim 1, wherein the second waveguide is SMF-28 fiber.

6. The spot-size converter of claim 1, wherein the first waveguide is a semiconductor waveguide and the second waveguide is optical fiber.

7. The spot-size converter of claim 1, wherein the first part of the waveguiding structure and the second part of the waveguiding structure form a combined single-mode waveguiding structure along a longitudinal waveguiding axis.

8. The spot-size converter of claim 1, wherein the first part of the waveguiding structure and the second part of the waveguiding structure include silicon.

9. The spot-size converter of claim 1, wherein the first part of the waveguiding structure is a part of a silicon-on-insulator (SOI) arrangement including a silicon substrate, an insulating layer formed on the silicon substrate, and a silicon layer formed on the insulating layer and patterned to form the first part of waveguiding structure.

10. A silicon photonic spot-size converter comprising
    a silicon substrate;
    an insulating layer formed on the silicon substrate;
    a silicon core formed on the insulating layer and configured to couple to a first waveguide to receive light from or transmit light to the first waveguide in a first propagation mode, the silicon core being characterized by a longitudinally varying effective refractive index that decreases away from the first waveguide; and
    a plurality of high-index rods configured to couple to a second waveguide to transmit light to or receive light from the second waveguide in a second propagation mode,
    wherein an overlap region is located between the first part of the waveguiding structure and the second part of the waveguiding structure, wherein the first propagation mode progressively transforms into the second propagation mode in the overlap region, and wherein the lower waveguiding structure includes a taper in the overlap region, and
    wherein the plurality of high-index elements further spread out from one another to the second waveguide outside of the overlap region in the second part of the waveguiding structure.

11. The silicon photonic spot-size converter of claim 10, wherein the first waveguide has a spot-size of 0.3-0.7 μm and the second waveguide has a spot size of 5-10 μm.

12. The silicon photonic spot-size converter of claim 10, wherein there is a gap between the lower waveguiding structure and one or more of the plurality of high-index elements.

13. The silicon photonic spot-size converter of claim 10, wherein the plurality of high-index elements each include a taper outside of the overlap region in the second part of the waveguiding structure.

14. The silicon photonic spot-size converter of claim 10, wherein the second waveguide is SMF-28 fiber.

15. The silicon photonic spot-size converter of claim 10, wherein the first waveguide is a semiconductor waveguide and the second waveguide is optical fiber.

16. The silicon photonic spot-size converter of claim 10, wherein the first part of the waveguiding structure and the second part of the waveguiding structure form a combined single-mode waveguiding structure along a longitudinal waveguiding axis.

17. The silicon photonic spot-size converter of claim 10, wherein the first part of the waveguiding structure and the second part of the waveguiding structure include silicon.

18. The silicon photonic spot-size converter of claim 10, wherein the first part of the waveguiding structure is a part of a silicon-on-insulator (SOI) arrangement including a silicon substrate, an insulating layer formed on the silicon substrate, and a silicon layer formed on the insulating layer and patterned to form the first part of waveguiding structure.

* * * * *